(12) United States Patent
Liles et al.

(10) Patent No.: US 9,971,070 B2
(45) Date of Patent: May 15, 2018

(54) ARTICLE HAVING A PLURALITY OF OPTICAL STRUCTURES

(71) Applicant: NIKE, Inc., Beaverton, OR (US)

(72) Inventors: Timothy K. Liles, Portland, OR (US); Todd W. Miller, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days. days.

(21) Appl. No.: 15/798,101

(22) Filed: Oct. 30, 2017

(65) Prior Publication Data

US 2018/0052258 A1 Feb. 22, 2018

Related U.S. Application Data

(63) Continuation of application No. 15/431,358, filed on Feb. 13, 2017, now Pat. No. 9,804,301, which is a
(Continued)

(51) Int. Cl.
| | | |
|---|---|---|
| G02B 3/00 | (2006.01) |
| A41B 1/08 | (2006.01) |
| A41B 11/00 | (2006.01) |
| A41D 1/06 | (2006.01) |
| A41D 19/00 | (2006.01) |

(Continued)

(52) U.S. Cl.
CPC .............. *G02B 3/0056* (2013.01); *A41B 1/08* (2013.01); *A41B 11/001* (2013.01); *A41D 1/06* (2013.01); *A41D 19/0051* (2013.01); *A41D 27/08* (2013.01); *A42B 1/004* (2013.01); *A43B 1/0027* (2013.01); *A43B 1/0072* (2013.01); *A43B 3/0078* (2013.01); *A43B 23/0245* (2013.01);
(Continued)

(58) Field of Classification Search
CPC ...... G02B 3/00; G02B 3/0006; G02B 3/0012; G02B 3/0037; G02B 3/005; G02B 3/02; G02B 3/06; G02B 1/12; A43B 1/00
See application file for complete search history.

(56) References Cited

U.S. PATENT DOCUMENTS

| 4,712,314 A | 12/1987 | Sigoloff |
|---|---|---|
| 4,944,572 A | 7/1990 | Young |
| (Continued) | | |

FOREIGN PATENT DOCUMENTS

| EP | 0570806 | 11/1993 |
|---|---|---|
| GB | 2133273 | 7/1984 |
| (Continued) | | |

OTHER PUBLICATIONS

International Search Report and Written Opinion for related International Application No. PCT/US2017/017324, 14 pages, dated May 8, 2017.
(Continued)

*Primary Examiner* — Joseph P Martinez
(74) *Attorney, Agent, or Firm* — Klarquist Sparkman, LLP

(57) ABSTRACT

An article has optical structures disposed on a base material element. The optical structures include lenticular lens structures and discrete coloring elements having distinct color regions. The lenticular lens structure has several lens layers. The lenticular lens structure may have any of a variety of cross-sectional shapes. The article has a different appearance when an observer views the article at various angles. The appearance may differ in terms of coloring scheme.

20 Claims, 47 Drawing Sheets

Related U.S. Application Data continuation of application No. 15/154,533, filed on May 13, 2016, now Pat. No. 9,575,229, which is a continuation-in-part of application No. 14/219,430, filed on Mar. 19, 2014, now Pat. No. 9,348,069.

(51) Int. Cl.

| | | |
|---|---|---|
| *A42B 1/00* | (2006.01) | |
| *A43B 1/00* | (2006.01) | |
| *A43B 3/00* | (2006.01) | |
| *A43B 23/02* | (2006.01) | |
| *A41D 27/08* | (2006.01) | |
| *B29D 11/00* | (2006.01) | |

(52) U.S. Cl.
CPC .. *B29D 11/00298* (2013.01); *B29D 11/00442* (2013.01); *G02B 3/0031* (2013.01)

(56) References Cited

U.S. PATENT DOCUMENTS

| | | | |
|---|---|---|---|
| 5,896,230 | A | 4/1999 | Goggins |
| 6,450,540 | B1 | 9/2002 | Kim |
| 6,856,462 | B1 * | 2/2005 | Scarbrough ........ G02B 27/2214 359/619 |
| 7,230,764 | B2 | 6/2007 | Mullen et al. |
| 7,443,592 | B2 | 10/2008 | Raymond et al. |
| 7,683,926 | B2 | 3/2010 | Schechterman et al. |
| 7,965,961 | B2 | 6/2011 | Priebe et al. |
| 7,984,517 | B2 | 7/2011 | Goodson |
| 8,035,897 | B2 | 10/2011 | Spiro |
| 8,115,997 | B1 | 2/2012 | Chien |
| 2006/0285215 | A1 | 12/2006 | Wu |
| 2008/0124497 | A1 | 5/2008 | Huang |
| 2009/0115939 | A1 | 5/2009 | Ikuta et al. |
| 2009/0202800 | A1 | 8/2009 | Huang |
| 2010/0003472 | A1 | 1/2010 | Lien |
| 2011/0116152 | A1 * | 5/2011 | Guigan ............ B29D 11/00365 359/242 |
| 2012/0019607 | A1 | 1/2012 | Dunn et al. |
| 2012/0105928 | A1 | 5/2012 | Camus et al. |
| 2012/0129096 | A1 | 5/2012 | Miles |
| 2012/0274998 | A1 | 11/2012 | Holmes et al. |
| 2013/0019506 | A1 | 1/2013 | Shiao |
| 2013/0057608 | A1 | 3/2013 | Yamamoto et al. |
| 2013/0094080 | A1 | 4/2013 | Fujishiro et al. |
| 2015/0268393 | A1 | 9/2015 | Liles et al. |

FOREIGN PATENT DOCUMENTS

| | | |
|---|---|---|
| GB | 2299537 | 10/1996 |
| JP | S44-18203 | 8/1969 |
| JP | 48-046842 | 10/1971 |
| JP | H-1055149 | 2/1998 |
| JP | H-1076690 | 3/1998 |
| JP | 2000-227506 | 8/2000 |
| JP | 2001-005102 | 1/2001 |
| JP | 2002-169234 | 6/2002 |
| JP | 2003-240911 | 8/2003 |
| JP | 2006-150751 | 6/2006 |
| JP | 2007-269022 | 10/2007 |
| JP | 2009-113392 | 5/2009 |
| JP | 2011-002489 | 1/2011 |
| JP | 2011-028073 | 2/2011 |
| WO | WO 2005/052650 | 6/2005 |
| WO | WO 2015/142587 | 9/2015 |

OTHER PUBLICATIONS

Notification of Reasons for Refusal for related Japanese Application No. JP 2016-557111, dated Sep. 21, 2017, 7 pages.
Studt, "3D-Printed Optic Breakthroughs," http://www.rdmag.com/article/2015/04/3d-printed-optic-breakthroughs, 10 pages, Apr. 16, 2015.
International Search Report and Written Opinion for related International Application No. PCT/US2015/019972, dated May 22, 2015.
Notification of Reasons for Refusal for related JP Application No. 2016-557111, dated Jan. 10, 2018, 11 pages.
Office Action for related Taiwan Application No. 106105227, dated Jan. 4, 2018, 23 pages.

\* cited by examiner

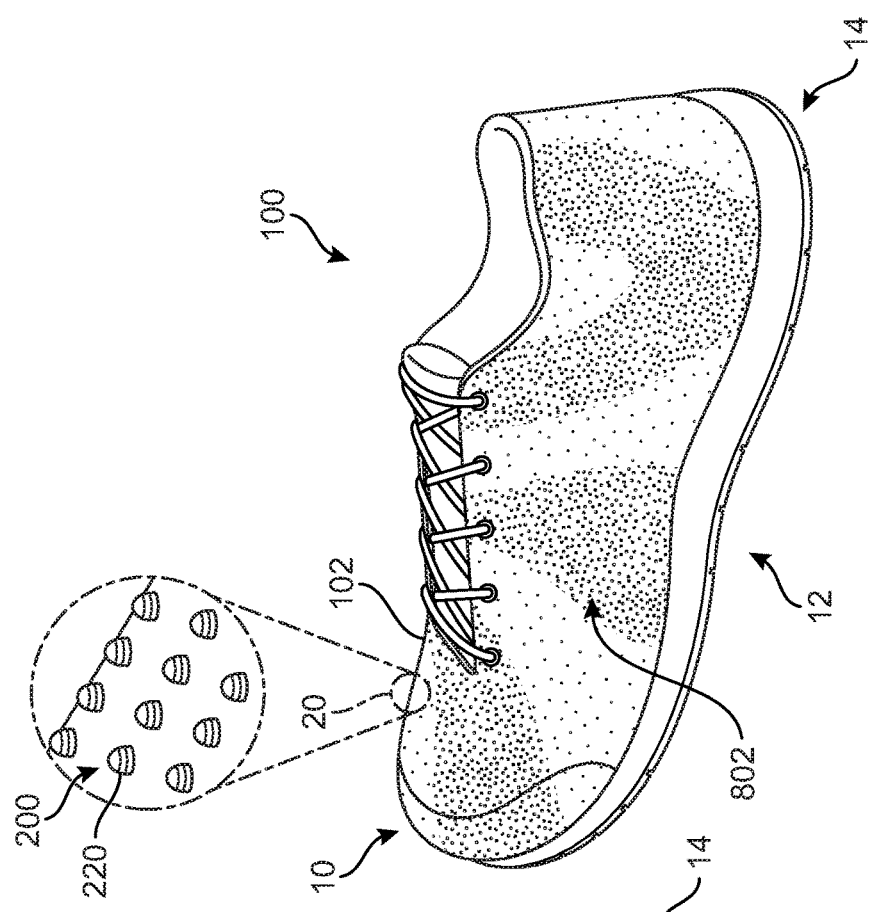
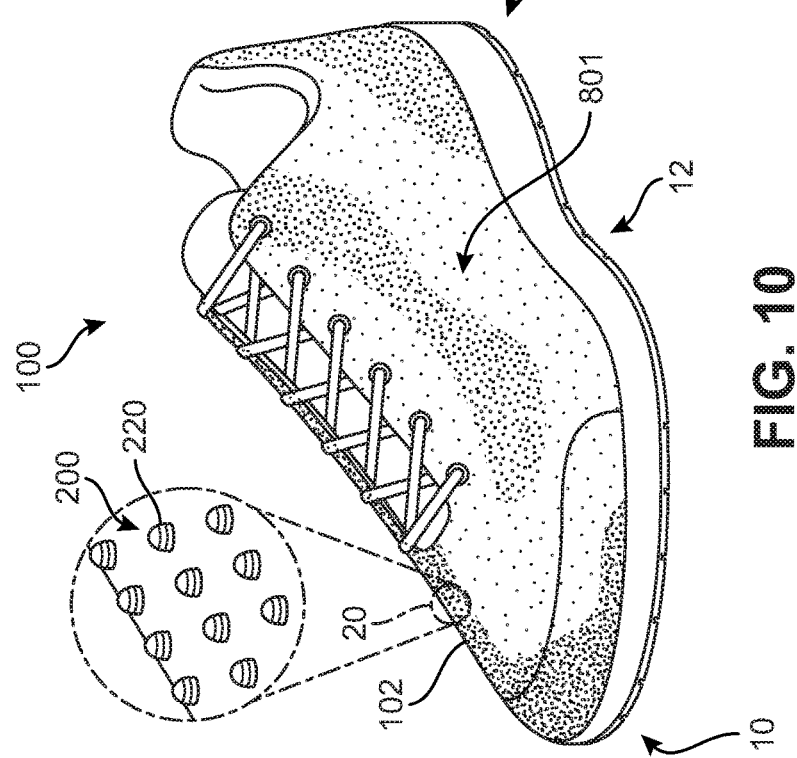

ARTICLE HAVING A PLURALITY OF OPTICAL STRUCTURES

CROSS-REFERENCE TO RELATED APPLICATIONS

This application is a continuation of U.S. patent application Ser. No. 15/431,358, filed Feb. 13, 2017, which is a continuation of U.S. patent application Ser. No. 15/154,533, filed May 13, 2016, now U.S. Pat. No. 9,575,229, issued Feb. 21, 2017, which is a continuation-in-part of U.S. patent application Ser. No. 14/219,430, filed Mar. 19, 2014, now U.S. Pat. No. 9,348,069, issued May 24, 2016, all of which are hereby incorporated by reference in their entireties.

BACKGROUND

The present embodiments relate generally to articles of footwear and apparel, and in particular to articles of footwear and apparel capable of changing their appearance.

Articles, including articles of footwear and articles of clothing or apparel may include design elements or other kinds of structures that are intended to create a desired optical effect. The desired optical effects can include specific coloring, images and/or designs.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

Other systems, methods, features and advantages of the embodiments will be, or will become, apparent to one of ordinary skill in the art upon examination of the figures and detailed description. It is intended that all such additional systems, methods, features and advantages be included within this description be within the scope of the embodiments and be protected by the following claims.

FIGS. 10 and 11 are isometric views of an article of footwear shown at different viewing angles, according to an embodiment;

DETAILED DESCRIPTION

Figure 1:
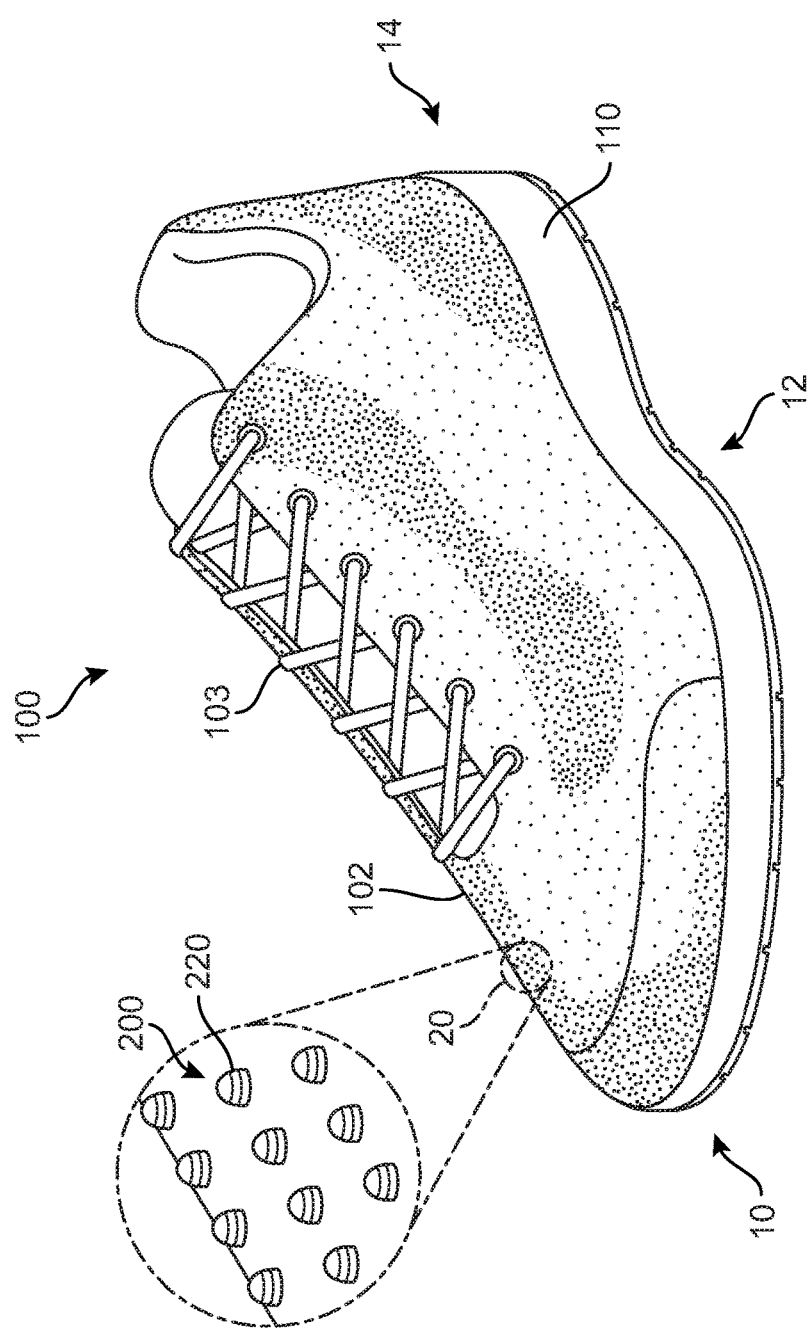
FIG. 1 is an isometric view of an embodiment of an article of footwear having several optical structures.

FIG. 1 illustrates an isometric view of an embodiment of an article of footwear 100, or simply article, having several optical structures 200 on the article of footwear 100. Although the embodiments throughout this detailed description depict articles configured as athletic articles of footwear, in other embodiments the articles may be configured as various other kinds of footwear including, but not limited to: hiking boots, soccer shoes, football shoes, sneakers, running shoes, cross-training shoes, rugby shoes, basketball shoes, baseball shoes as well as other kinds of shoes. Moreover, in some embodiments, articles may be configured as various kinds of non-sports related footwear, including, but not limited to: slippers, sandals, high heeled footwear, loafers as well as any other kinds of footwear.

Articles are generally made to fit various sizes of feet. In the embodiments shown, the various articles are configured with the same footwear size. In different embodiments, the articles could be configured with any footwear sizes, including any conventional sizes for footwear known in the art. In some embodiments, an article of footwear may be designed to fit the feet of a child. In other embodiments, an article of footwear may be designed to fit the feet of an adult. Still, in other embodiments, an article of footwear may be designed to fit the feet of a man or a woman.

In some embodiments, article of footwear 100 may include upper 102 and sole system 110. Generally, upper 102 may be any type of upper. In particular, upper 102 may have any design, shape, size and/or color. For example, in embodiments where article 100 is a basketball shoe, upper 102 could be a high top upper that is shaped to provide high support on an ankle. In embodiments where article 100 is a running shoe, upper 102 could be a low top upper. In some embodiments, upper 102 could further include provisions for fastening article 100 to a foot, such as a hook and look system (Velcro, for example) and may include still other provisions found in footwear uppers. In the embodiment shown in FIG. 1, a lacing system 103 is used for fastening article 100.

Sole system 110 is secured to upper 102 and extends between the foot and the ground when article 100 is worn. In different embodiments, sole system 110 may include different components. For example, sole system 110 may include an outsole, a midsole, and/or an insole. In some cases, one or more of these components may be optional.

Sole system 110 may provide one or more functions for article 100. For example, in some embodiments, sole system 110 may be configured to provide traction for article 100. In addition to providing traction, sole system 110 may attenuate ground reaction forces when compressed between the foot and the ground during walking, running or other ambulatory activities. The configuration of sole system 110 may vary significantly in different embodiments to include a variety of conventional or non-conventional structures. In some cases, the configuration of sole system 110 can be selected according to one or more types of ground surfaces on which sole system 110 may be used. Examples of ground surfaces include, but are not limited to: natural turf, synthetic turf, dirt, as well as other surfaces.

Referring to FIG. 1, for purposes of reference, upper 102 may be divided into forefoot portion 10, midfoot portion 12 and heel portion 14. Forefoot portion 10 may be generally associated with the toes and joints connecting the metatarsals with the phalanges. Midfoot portion 12 may be generally associated with the arch of a foot. Likewise, heel portion 14 may be generally associated with the heel of a foot, including the calcaneus bone. In addition, upper 102 may include lateral side 16 and medial side 18. In particular, lateral side 16 and medial side 18 may be opposing sides of article 100. Furthermore, both lateral side 16 and medial side 18 may extend through forefoot portion 10, midfoot portion 12 and heel portion 14. It will be understood that forefoot portion 10, midfoot portion 12 and heel portion 14 are only intended for purposes of description and are not intended to demarcate precise regions of upper 102. Likewise, lateral side 16 and medial side 18 (not shown) are intended to represent generally two sides of upper 102, rather than precisely demarcating upper 102 into two halves. As shown in FIG. 1, article of footwear is intended to be used with a left foot; however, it should be understood that the following description may equally apply to a mirror image of article of footwear that is intended for use with a right foot (not shown).

For consistency and convenience, directional adjectives are employed throughout this detailed description corresponding to the illustrated embodiments. The term "lateral" as used throughout this detailed description and in the claims refers to a direction extending along a width of a component. For example, the lateral direction of upper 102 may extend between medial side 18 and lateral side 16 of upper 102.

The term "multi-layered lens structure" is used throughout this detailed description and in the claims to refer to any structure comprised of two or more lenses. The lenses of a multi-layered lens structure may be layered or stacked.

Furthermore, the term "lenticular lens structure" is used throughout the detailed description and in the claims to describe a multi-layered lens structure that is designed so that when viewed from different angles, different regions beneath the lenticular lens structure are magnified differently. For example in FIG. 3, a lenticular lens structure 220 is shown as comprising five distinct lenses, or lens layers.

In addition, the phrase "discrete coloring element" as used throughout this detailed description and in the claims refers to a two-dimensional or three-dimensional image having at least one color. In some embodiments, the discrete coloring element may be comprised of one or more colors including, but not limited to: red, green, purple, brown, black, blue, yellow, white, or a combination of thereof. Also, the phrase "optical structure" as used throughout this detailed description and in the claims refers to any multi-layered lens structure, for example a lenticular lens structure, in combination with a discrete coloring element, both of which will be described in further detail below. Specifically, in an optical structure, a discrete coloring element is partially or fully covered by a multi-layered lens structure, such as a lenticular lens.

As shown in FIG. 1, article 100 may be configured with a plurality of optical structures 200, which may be arranged on an exterior of upper 102. For purposes of illustration, a small region 20 of upper 102 is shown in an enlarged view within FIG. 1 so that several individual optical structures from the plurality of optical structures 200 may be clearly seen.

In some embodiments, plurality of optical structures 200 may be disposed on a majority, or even a substantial entirety, of the exterior surface of upper 102. In other embodiments, optical structures 200 may only be disposed on forefoot portion 10, midfoot portion 12, heel portion 14, as well as on lateral side 16, and/or medial side 18. Moreover, other embodiments may include optical structures 200 disposed in any combination of these portions and/or sides of article 100.

In different embodiments, the arrangement of optical structures, including both pattern and density, could vary. In some embodiments, such as the embodiment illustrated in FIG. 1, plurality of optical structures 200 may be arranged such that optical structures 200 are spread approximately evenly over most portions of upper 102. In other words, in an exemplary embodiment, the density of optical structures over upper 102 may remain approximately constant. However, the spacing and density of optical structures could vary in other embodiments to achieve desired visual effects. For example, in another embodiment, plurality of optical structures 200 could be configured into various kinds of patterns such as stripes, checkered patterns or other arrangements in which some regions of the pattern are associated with a higher density of optical structures. In still another embodiment, the density of optical structures could vary in a continuous and/or irregular manner over some portions of upper 102.

For purposes of illustration, the figures in this disclosure may show various regions of articles (such as an article of apparel or an article of footwear 100) with different shading. These differences in shading are intended to indicate differences in color and/or appearance of the regions. For example, one region of an article may have a darker shading (or denser stippling), than another region or regions to indicate a difference in color between the regions. Moreover, the color and/or appearance of articles may appear to change when an observer sees the articles from different viewing angles. Accordingly, the figures in this disclosure may show a change in shading in regions to reflect a change in color and/or appearance of the article when an observer views the article at different angles. This will be explained in further detail below.

Figure 2:
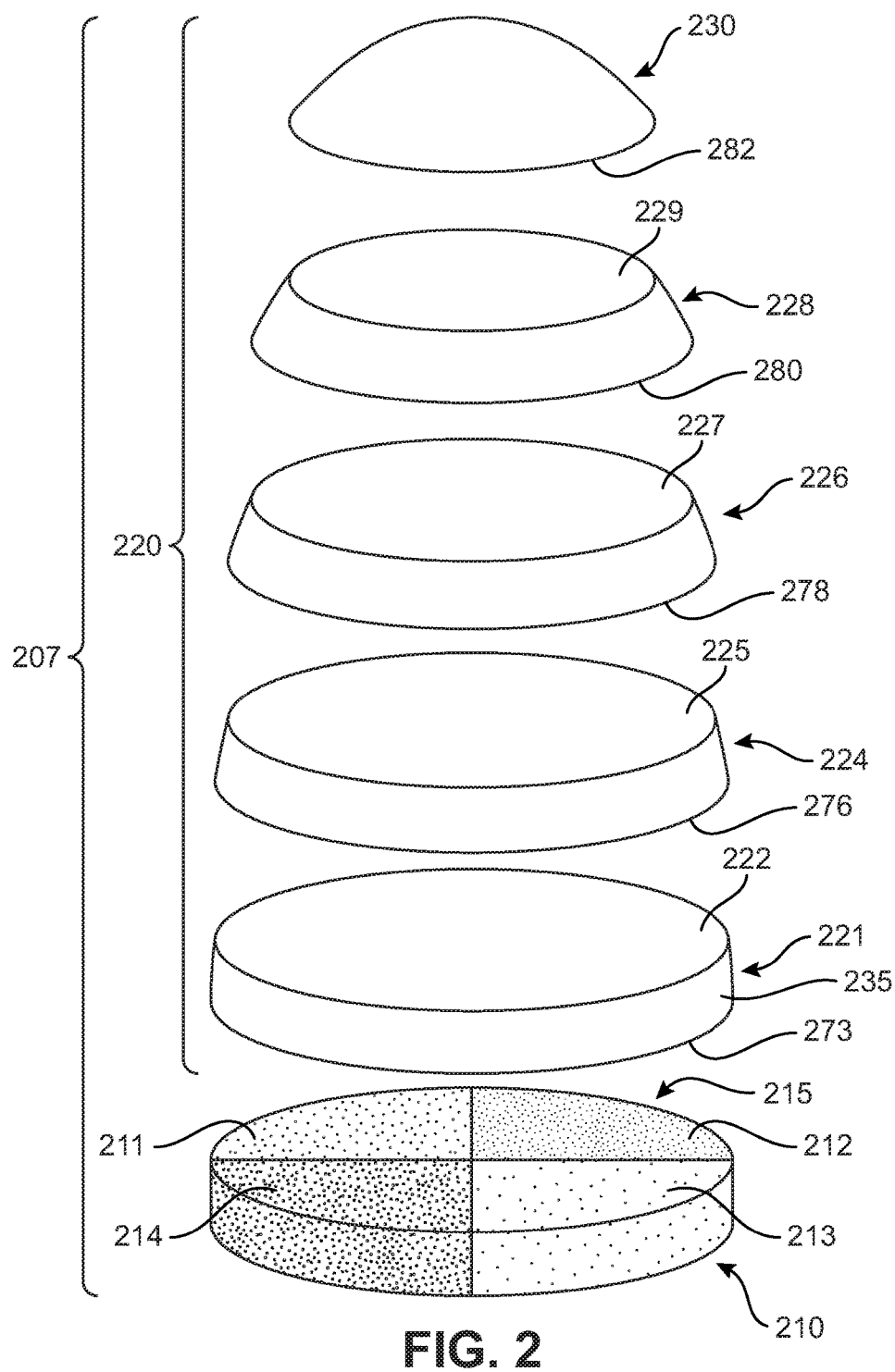
FIG. 2 is an exploded view of an embodiment of an optical structure.
Figure 3:
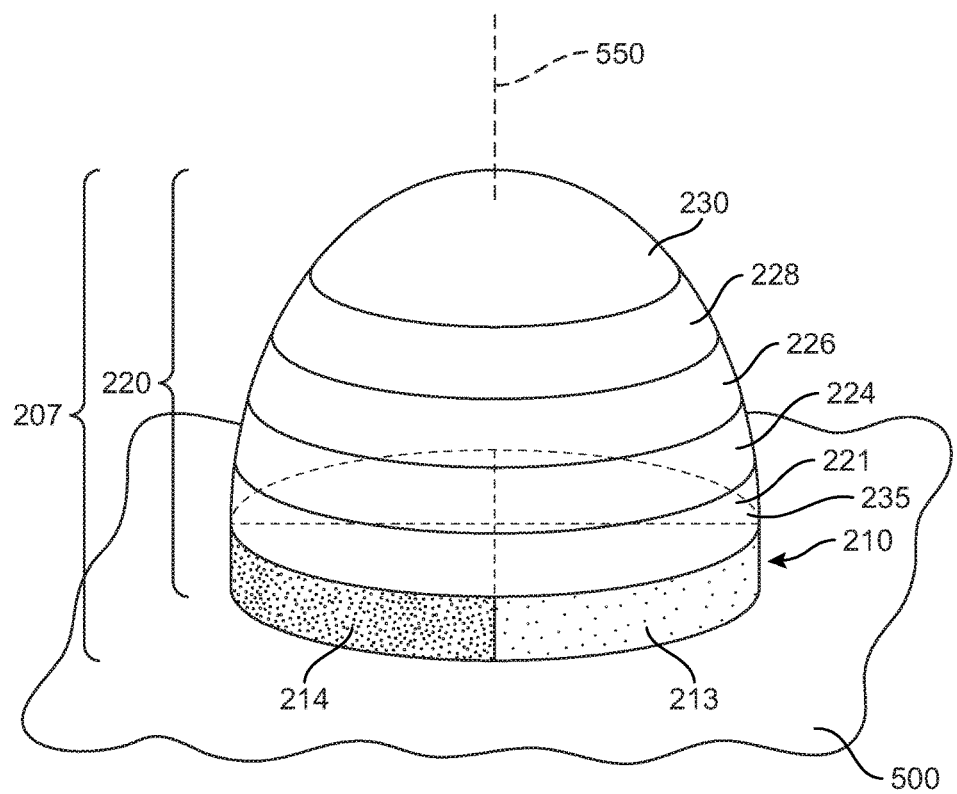
FIG. 3 is the embodiment of the optical structure shown in FIG. 2, with lens layers connected together to form lenticular lens structure, and lenticular lens structure is disposed over a discrete coloring element.

FIGS. 2 and 3 illustrate an isometric view an embodiment of an optical structure 207, which may be representative of plurality of optical structures 200. Optical structure 207 may be further comprised of a multi-layered lens structure. Specifically, optical structure 207 may be further comprised of a lenticular lens structure 220, as well as discrete coloring element 210. For purposes of illustration, lenticular lens structure 220 and discrete coloring element 210 are shown schematically, and therefore it should be understood that various dimensions of one or more components may not be drawn to scale. Thus, for example, the relative thicknesses of the lower most lens layer 221 of lenticular lens structure 220 and discrete coloring element 210 may differ substantially from the depicted embodiment.

Lenticular lens structure 220 may comprise any number of lenses. In the exemplary embodiments in FIGS. 2 and 3, lenticular lens structure 220 is comprised of five lenses (also referred to here as lens layers): a first lens layer 221, a second lens layer 224, a third lens layer 226, a fourth lens layer 228, and a fifth lens layer 230. However, it should be understood that lenticular lens structure 220 may include more than five lenses in other embodiments. In still other embodiments, lenticular lens structure 220 may include less than five lenses.

In different embodiments, lenticular lens structure 220 may configured as a variety of three-dimensional shapes, such as a parallelogram (having several rectangular surface areas), a cube (having several square surfaces), a semi-cylindrical shape, a semi-spherical shape, or a semi-ellipsoid shape. Accordingly, first lens layer 221, second lens layer 224, third lens layer 226, fourth lens layer 228, and fifth lens layer 230 are designed to achieve the desired shape for lenticular lens structure 220.

Referring to FIG. 2, first lens layer 221, second lens layer 224, third lens layer 226, and fourth lens layer 228 each have a top portion and bottom portion. For example, first lens layer 221 has first top portion 222 and first bottom portion 273. In some embodiments, any lens layer may include a top portion with a diameter and surface area substantially identical to bottom portion. In other embodiments, the dimensions of the top portion and the bottom portion could differ. In FIGS. 2 and 3, first top portion 222 has a diameter and surface smaller than the diameter of first bottom portion 273. Second lens layer 224 has second top portion 225 and second bottom portion 276, with second top portion 225 having a smaller diameter and surface area than second bottom portion 276. Similarly, third lens layer 226 has a third top portion 227 and third bottom portion 278, and fourth lens layer 228 has fourth top portion 229 and fourth bottom portion 280. Third top portion 227 has a smaller diameter and surface area than third bottom portion 278, and fourth top portion 229 has a smaller diameter and surface area than fourth bottom portion 280.

Generally, the shape and/or size of the upper most lens layer of a lenticular lens structure may vary according to the overall lenticular lens structure. In FIGS. 2 and 3, fifth lens layer 230, having fifth bottom portion 282, is convex in order to achieve an overall dome like shape of lenticular lens structure 220.

In some embodiments, successive lens layers of lenticular lens structure may be similar or larger, in terms of volume, diameter, and/or surface area. The phrase "successive lens layers" as used throughout this detailed description and in the claims refers to lens layers of a lenticular lens structure, beginning in order from the first lens layer (that is, the bottom most layer in contact with discrete coloring element) to the uppermost lens layer. In the embodiment in FIGS. 2 and 3, lenticular lens structure 220 has successively smaller lens layers. In other words, second bottom portion 276 and second top portion 225 are smaller in both diameter and surface area than first bottom portion 273 and first top portion 222, respectively; third bottom portion 278 and third top portion 227 are smaller in both diameter and surface area than second bottom portion 276 and second top portion 225, respectively; and, fourth bottom portion 280 and fourth top portion 229 are smaller in both diameter and surface area than third bottom portion 278 and third top portion 227, respectively.

In some embodiments, the dimensions of each lens layer can be selected so that portions of adjacent lens layers that are in contact with one another have similar dimensions. For example, first top portion 222 of first lens layer 221 may have a substantially similar diameter and/or surface area as second bottom portion 276 of second lens layer 224; second top portion 225 of second lens layer 224 may have a substantially similar diameter and/or surface area as third bottom portion 278 of third lens layer 226; third top portion 227 of third lens layer 226 may have a substantially similar diameter and/or surface area as fourth bottom portion 280 of fourth lens layer 228; and fourth top portion 229 of fourth lens layer 228 may have a substantially similar diameter and/or surface area as fifth bottom portion 282 of fifth lens layer 230.

The thickness of lens layers of the lenticular lens structure 220 may vary in order to achieve desired optical effects. In the exemplary embodiment in FIGS. 2 and 3, each lens layer may have a thickness approximately in the range between 0.001 mm and 5 mm. The thickness of each layer may be selected according to factors including desired optical effects (such as desired index of refraction), as well as manufacturing considerations (such as the type of material used to print or otherwise create each lens layer).

In some embodiments, one or more lenses may be partially or fully colored or tinted. However, in an exemplary embodiment each lens layer of lenticular lens structure 220 may be transparent or translucent so that discrete coloring element 210 may be observed through each lens layer of lenticular lens structure 220.

Discrete coloring element 210 may vary in shape, size and color. In the exemplary embodiment in FIGS. 2 and 3, the shape of discrete coloring element 210 is a circular (round) dot. However, in other embodiments, the shape of discrete coloring element 210 includes, but is not limited to, a square, rectangle, triangle, pentagon, or any enclosed shape having more than five sides. In still other embodiments, discrete coloring element 210 could have any regular or irregular shape.

In different embodiments, the thickness of discrete coloring element 210 may vary. For example, in some embodiments, the thickness of discrete coloring element 210 may vary approximately in the range between 0.001 mm and 5 mm. The thickness of discrete coloring element 210 may be selected according to various factors including the type of material used to print or otherwise create discrete coloring element 210, as well as possibly other factors.

Additionally, in some embodiments, the diameter of discrete coloring element 210 may vary. In some embodiments, the diameter could vary between 0.001 mm and 5 mm. In still other embodiments, the diameter could be greater than 5 mm. The diameter of discrete coloring element 210 could be selected according to various factors, including the printing technology used in cases where discrete coloring element 210 is printed, as well as desired design or pattern effects (e.g., desiring larger or smaller dots in the resultant design). Moreover, it should be understood that in embodiments where discrete coloring element 210 may not be round, the dimensions (such as length and width) could also vary in any manner.

In at least some embodiments, the diameter of discrete coloring element 210 may be selected according to the diameter of the nearest lens of lenticular lens structure 210, or vice versa. In the exemplary embodiment, first lens layer 221 is the lens layer nearest in proximity to discrete coloring element 210. Further, first bottom portion 273 of first lens layer 221 is generally the bottom portion nearest in proximity to discrete coloring element 210. In some embodiments, the diameter of discrete coloring element 210 is larger than diameter of first bottom portion 273. In other embodiments, the diameter of discrete coloring element 210 is smaller than the diameter of first bottom portion 273. In the exemplary embodiment as shown in FIGS. 2 and 3, the diameter of discrete coloring element 210 and first bottom portion 273 are approximately identical. This configuration provides a distinct optical effect whereby the colors of discrete coloring element 210 are magnified in different amounts according to the viewing angle of the observer.

Figure 4:
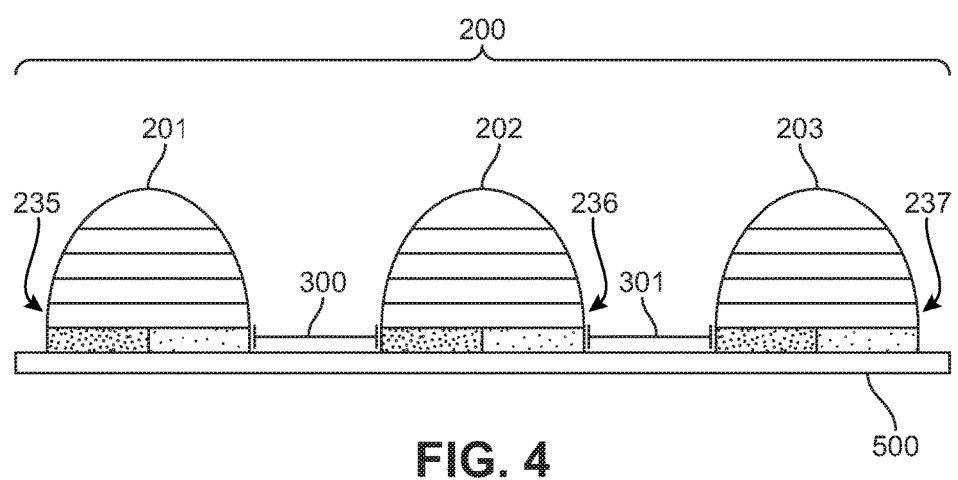
FIG. 4 is an embodiment of a base material element having several optical structures.

FIGS. 3 and 4 clearly illustrate how all portions of discrete coloring element 210 may be completely covered by first lens layer 221 of lenticular lens structure 220. Specifically, no portion of discrete coloring element 210 is disposed radially further from a central axis 550 of optical structure 220 than outer periphery 235 of first lens layer 221. For purposes of clarity, "outer periphery" as used throughout this detailed description and in the claims refers to the outermost perimeter of a bottom most lens layer that contacts a base material element. In other embodiments, at least some portions of discrete coloring element 210 could extend outside outer periphery 235 of lenticular lens structure 220 such that some portions of discrete coloring element 210 would not be covered by lenticular lens structure 220. Still, in other embodiments, all portions of discrete coloring elements 210 could lie well within outer periphery 235 of lenticular lens structure. In other words, the diameter of discrete coloring element 210 could be substantially less than the diameter of bottom portion 273 of first lens layer 221.

Optical structures 200 may vary in several ways in order to achieve desired optical effects. For example, discrete coloring element 210 could vary in diameter, thickness, and/or geometry in order to produce, for example, differences in color and/or appearance of discrete coloring element when observed through a lenticular lens structure. Additionally, any lens layer (or layers) of lenticular lens structure 220 could vary in diameter, thickness, and/or geometry in order to produce, for example, differences in color and/or appearance of a discrete coloring element when observed through lenticular lens structure.

Discrete coloring elements 210 may be divided into several regions. In FIGS. 2 and 3, discrete coloring element 210 is a circular dot divided into four regions. More specifically, discrete coloring element 210 is divided into four quadrants: first quadrant 211, second quadrant 212, third quadrant 213, and fourth quadrant 214. In the exemplary embodiment, first quadrant 211, second quadrant 212, third quadrant 213, and fourth quadrant 214 are substantially identical in surface area. However, in other embodiments, regions (including quadrants) may not be substantially identical.

In some embodiments, one or more quadrants of discrete coloring element 210 may be colored. The colors of discrete coloring element 210 may be of any combination. In some embodiments, the color may be the same for each region. In FIGS. 2 and 3, each quadrant is associated with a different color from the remaining quadrants.

Although the exemplary embodiment depicts a discrete coloring element 210 comprised of four regions of different colors, in other embodiments a discrete coloring element 210 could be comprised of any other number of regions. For example, in another embodiment, a discrete coloring element 210 could comprise just two regions of different colors. In still other embodiments, discrete coloring element 210 could comprise three, four, five or more than five distinct regions of different colors.

Referring to FIG. 2, discrete coloring element 210 has a top surface 215 displaying first quadrant 211, second quadrant 212, third quadrant 213, and fourth quadrant 214. Over top surface 215 of discrete coloring element 210 are the layers of lenticular lens structure 220. First lens layer 221 has a bottom surface (not shown) which contacts top surface of discrete coloring element. Second lens layer 224 has a bottom surface (not shown) which contacts top surface 222 of first lens layer 221. Remaining successive lens layers are stacked in a similar manner, that is, similar to first lens layer 221 and second lens layer 224, as shown in FIGS. 2 and 3. For lenticular lens structures having more than five lens layers, the stacking process is also similar. Generally, lenticular lens structure 220 is centered vertically over the center of discrete coloring element 210. In other embodiments, lenticular lens 220 may be offset from discrete coloring element 210.

As shown in FIGS. 3 and 4, optical structure 207 is placed on a base material element 500. Base material element 500 may be part of upper 102, or may be part of another article of apparel (discussed later). Base material element 500 could be made of, for example, fabric, cotton, wool, rubber, leather, synthetic materials, or a combination thereof. Base material element 500 could also be made from knitted or woven material. Multiple optical structures 200 may be placed on base material element 500, as shown in FIG. 4.

FIG. 4 illustrates a plurality of optical structures 200 spaced apart from one another. In some embodiments, adjacent or neighboring optical structures may overlap each other, in which case there is no spacing between adjacent optical structures. In other embodiments, adjacent optical structures may contact each other only at their respective outer peripheries. In FIG. 4, first outer periphery 235 of first optical structure 201 is spaced apart from second outer periphery 236 of second optical structure 202 (adjacent to first optical structure 201) at first distance 300. Further, second outer periphery 236 of second optical structure 202 is spaced apart from third outer periphery 237 of third optical structure 203 (adjacent to second optical structure 202) at second distance 301. In exemplary embodiment in FIG. 4, first distance 300 is approximately equal to second distance 301. In other embodiments, adjacent optical structures may not be evenly spaced apart. In other words, the first distance may not be equal to the second distance. In still other embodiments, adjacent optical structures may be approximately evenly spaced apart in some regions of base material element 500 and not evenly spaced apart in another region or regions.

Figure 5:
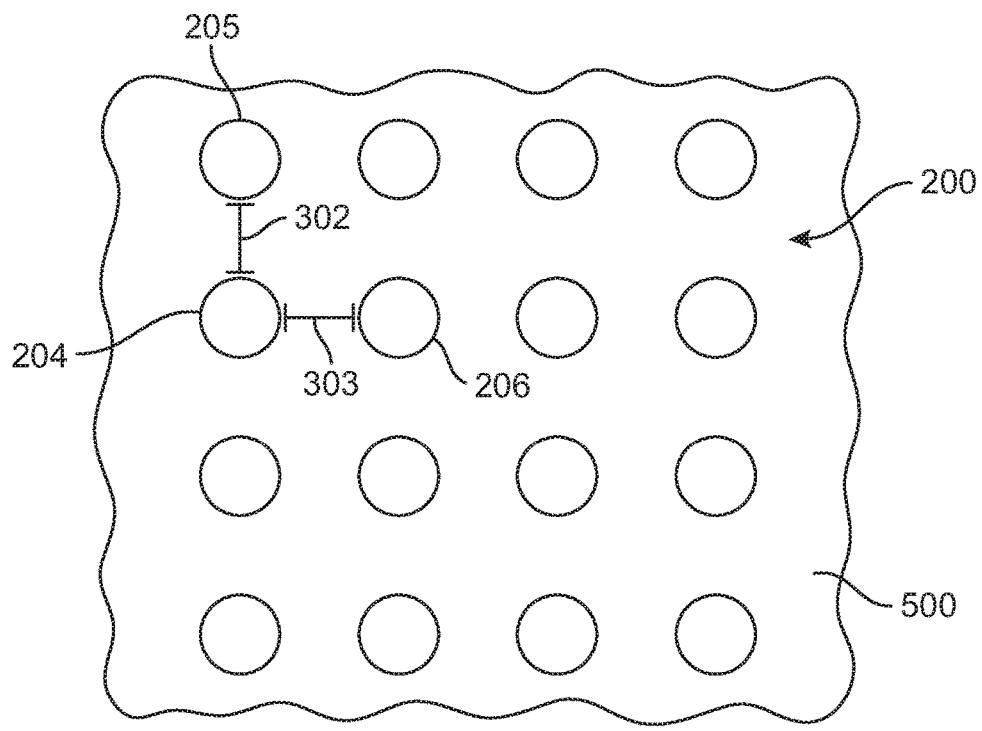
FIG. 5 is an embodiment of a base material element having columns and rows of optical structures.

FIG. 5 illustrates a schematic top down view of a section of base material element 500, including a plurality of optical structures 200. In the configuration shown in FIG. 5, plurality of optical structures 200 may be arranged into columns and rows. In this exemplary configuration, first optical structure 204 is separated by a spacing 302 from a second optical structure 205. Here, first optical structure 204 and second optical structure 205 are seen to belong to different rows. Additionally, first optical structure 204 is seen to be separated from a third optical structure 206 by a spacing 303. Here, third optical structure 206 is seen to belong to an adjacent column to first optical structure 204. In some embodiments, spacing 302 may be substantially equal to spacing 303. In other embodiments, spacing 302 may not be substantially equal spacing 303. In still other embodiments, spacing 302 may be substantially equal to spacing 303 in some regions on base material element 500, and spacing 302 may not be substantially equal spacing 303 in another region or region of base material element 500. Thus, it is clear from FIGS. 4 and 5 that each optical structure may be generally spaced apart from all adjacent optical structures.

Figure 6:
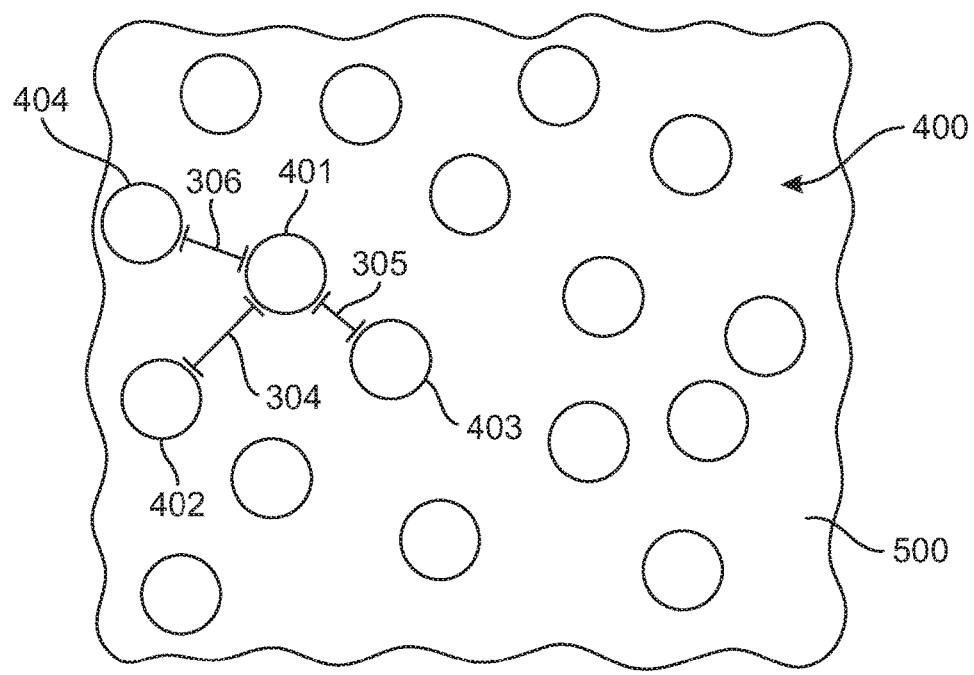
FIG. 6 is an embodiment of a base material element having optical structures, wherein the optical structures are not in distinct columns and/or rows.

In an alternative configuration, shown in FIG. 6, base material element 500 includes a plurality of optical structures 400. In contrast to the configuration shown in FIG. 5, optical structures 400 may not be arranged in a regular pattern. In such a configuration, each optical structure may still be spaced apart from any neighboring or adjacent optical structures. For example, a first optical structure 401 may be spaced apart from a second optical structure 402 by a spacing 304. First optical structure 401 may also be spaced apart from a third optical structure 403 by a spacing 305. First optical structure 401 may also be spaced apart from a fourth optical structure 404 by a spacing 306. While second optical structure 402, third optical structure 403, and fourth optical structure 404 may be considered adjacent to first optical structure 401, spacing 304, spacing 305, and spacing 306 may not be substantially equal. In other words, the plurality of optical structures 400 may not have consistent spacing between neighboring or adjacent optical structures.

The spacing of optical structures on the surface of an article as described and shown in the embodiments provides a unique visual effect whereby the appearance of each discrete coloring element is modified by a corresponding lenticular lens structure. In other words, each discrete coloring element, separated from its neighbors, is in one-to-one correspondence with an associated lenticular lens structure. This may be seen to be in contrast from some alternative lenticular designs, wherein multiple lenticular lenses are laid down over a single coloring element or other image. Thus, the exemplary configuration shown in the figures may provide for increased versatility in the patterns and/or designs that may be achieved along the surface of an article, since each discrete coloring element can be modified uniquely by a corresponding lenticular lens structure.

Figure 7:
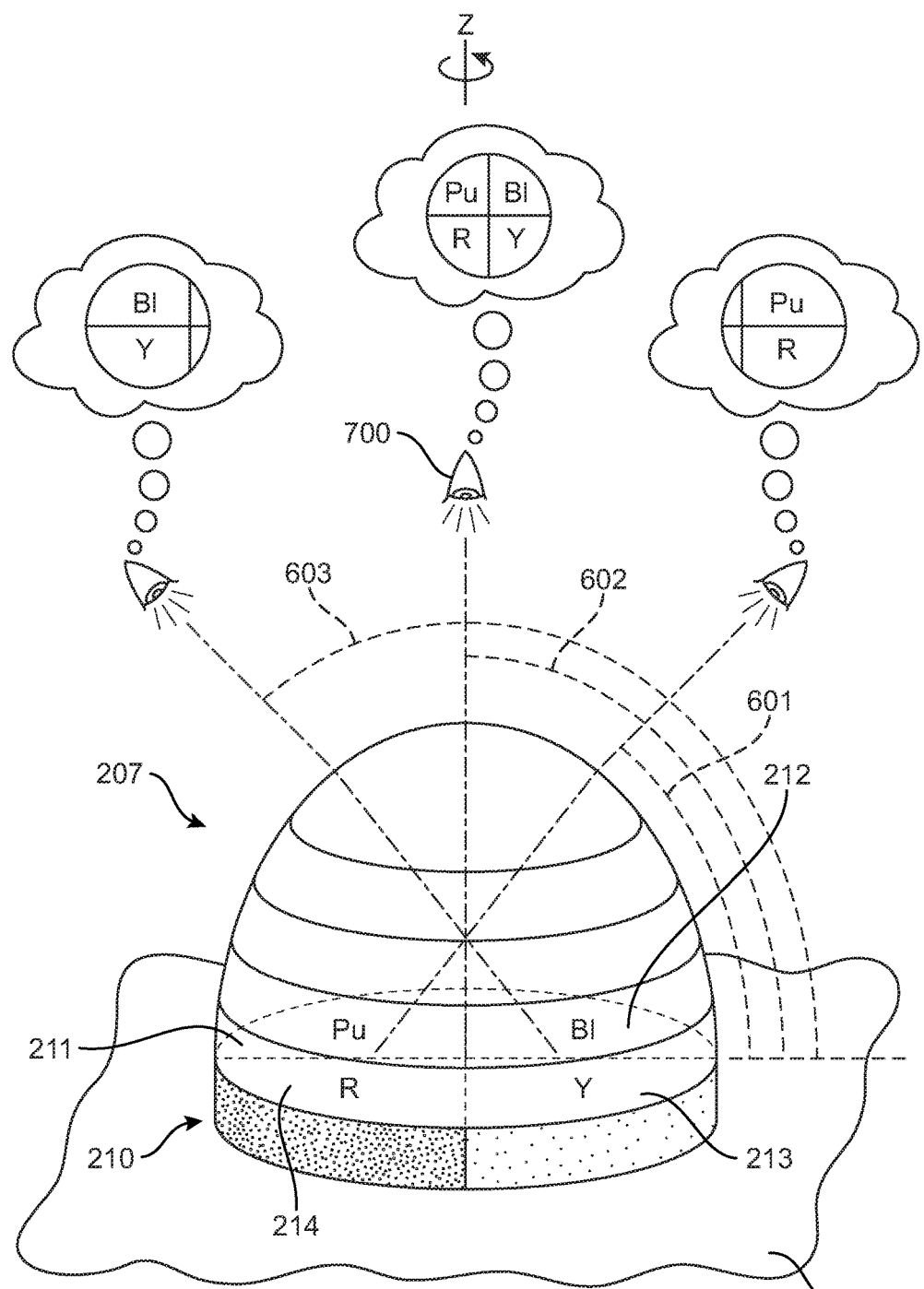
FIGS. 7-9 illustrate an observer viewing an optical structure from several distinct viewpoints, according to an embodiment.
Figure 8:
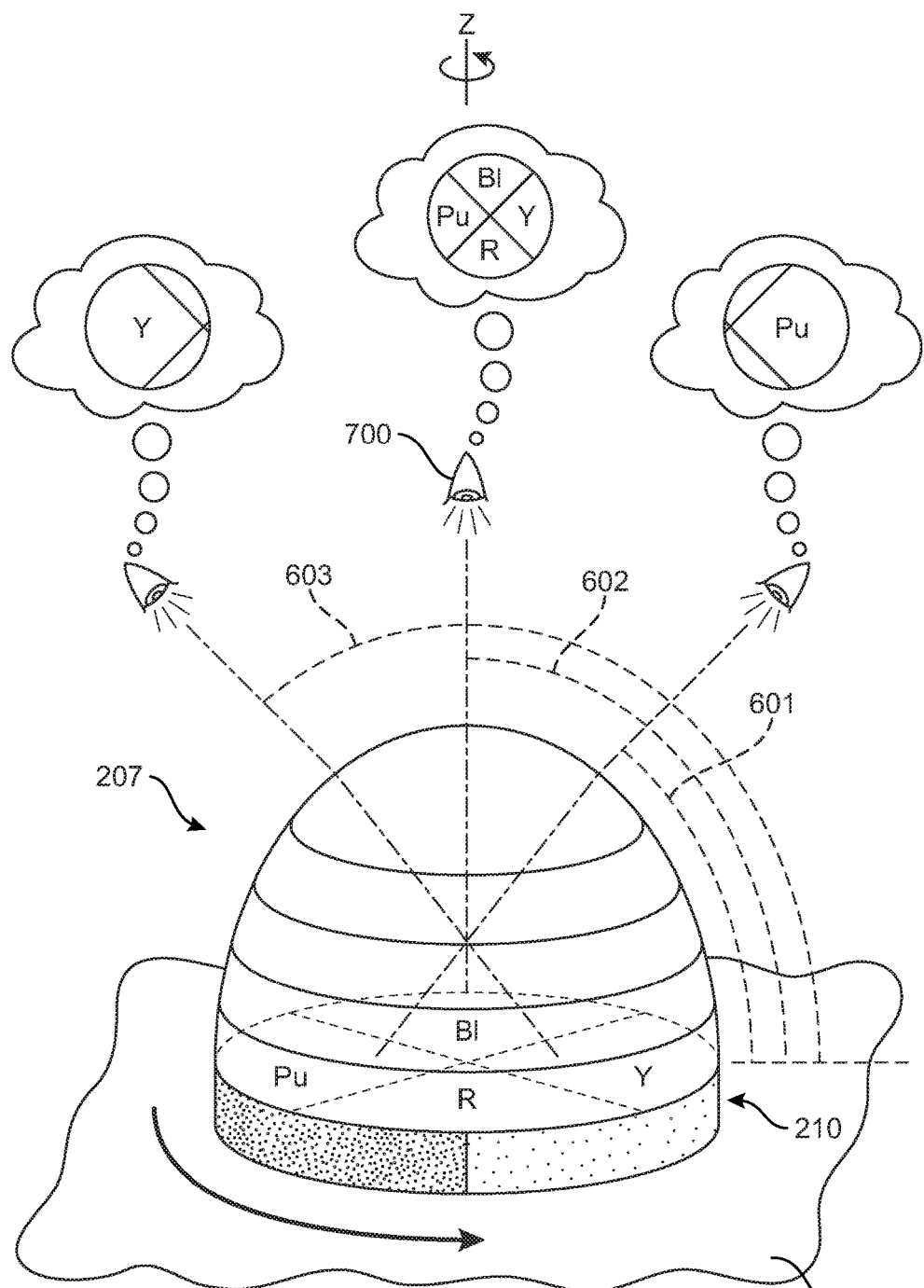
Figure 9:
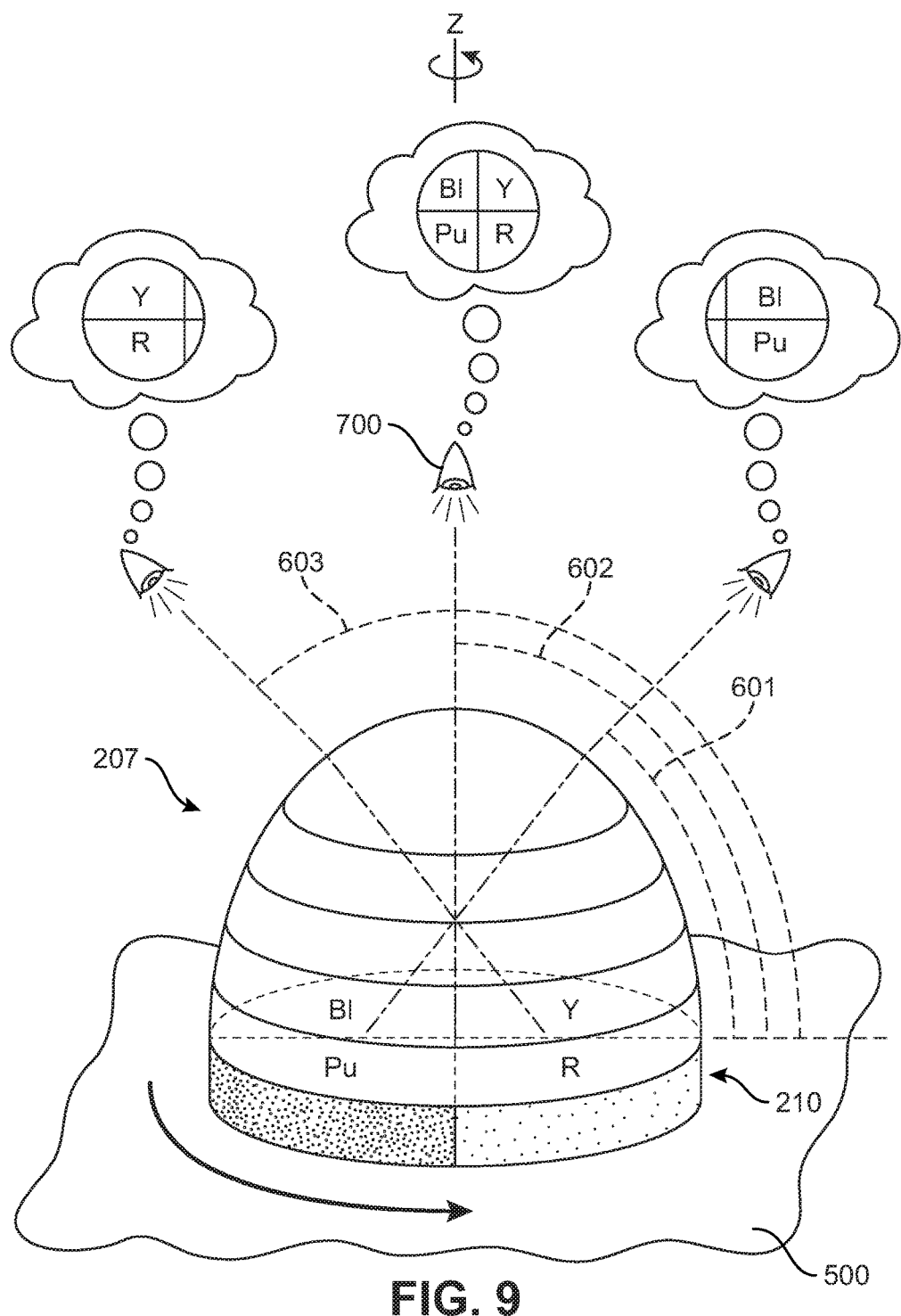

FIGS. 7-9 illustrate an observer 700 viewing the optical structure 207 at different viewing angles. In the exemplary embodiments of FIGS. 7-9, discrete coloring element 210 has four quadrants. First quadrant 211 is purple (Pu), second quadrant 212 is blue (Bl), third quadrant 213 is yellow (Y), and fourth quadrant 214 is red (R). In an exemplary embodiment, first quadrant 211, second quadrant 212, third quadrant 213, and fourth quadrant 214 may generally have the same surface area. Accordingly, the colors displaced on the quadrants are generally visible in similar proportions when the lenticular lens structure 220 is not present. However, with lenticular lens structure 220 placed over discrete coloring element 210, the appearance of discrete coloring element 210 may change when observer views discrete coloring element 210 through the lenticular lens structure 220 at various angles. For example, red may appear more visible than purple when viewing the optical structure 207 from an angle. In another example, blue and purple may appear more visible than red and yellow when viewing optical structure 207 from another angle.

Referring to FIG. 7, observer 700 viewing optical structure from a first viewing angle 601 sees primarily the colors red and purple from discrete coloring element 210. When observer views optical structure 207 from a second viewing angle 602, all four colors from discrete coloring element 210 are seen generally in similar proportions. When observer views optical structure 207 from a third viewing angle 603, the colors yellow and blue from discrete coloring element 210 are primarily seen.

FIG. 8 is the embodiment of optical structure in FIG. 8, with optical structure 207 rotated radially about the z-axis. Now, observer 700 viewing optical structure 207 from first viewing angle 601 sees primarily the color purple from discrete coloring element 210. When observer 700 views optical structure 207 from a second viewing angle 602, all four colors from discrete coloring element 210 are seen generally in similar proportions. When observer 700 views optical structure 207 from third viewing angle 603, the color yellow from discrete coloring element 210 is primarily seen.

FIG. 9 is the embodiment of the optical structure 207 in FIG. 8, with optical structure 207 further rotated by about the z-axis. Now, observer 700 viewing optical structure 207 from first viewing angle 601 sees primarily the colors blue and purple from discrete coloring element 210. When observer 700 views optical structure 207 from a second viewing angle 602, all four colors from discrete coloring element 210 are seen generally in similar proportions. When observer 700 viewing optical structure 207 from third viewing angle 603, the colors yellow and red from discrete coloring element 210 are primarily seen.

It will be understood that FIGS. 7-9 are only intended for purposes of illustration and are not intended to demarcate precise color schemes viewed at precise viewing angles. Observer 700 could view one of many color combinations when optical structure 207 is rotated about the z-axis and/or when observer 700 views the optical structure 207 at different viewing angles. Similarly, several color combinations in several other proportions not shown could also be viewed depending on the rotation of optical structure 207 about the z-axis and/or the viewing angle of the observer 700.

FIGS. 10 and 11 illustrate an embodiment of an article of footwear 100 shown at two different viewpoints. Article of footwear 100 includes a plurality of optical structures 200 on forefoot 10, midfoot 12, and heel portion 14 of upper 102. Optical structures 200 on upper 102 may be, for example, an embodiment shown in FIG. 3. Article 100 may appear to change when article is viewed at different viewpoints. For example in FIG. 10, when article 100 is arranged for viewing with forefoot 10 in the foreground, upper 102 has a first appearance 801. In FIG. 11, when article 100 is rotated such that heel portion 14 is in the foreground, upper 102 has a second appearance 802 different from the first appearance 801.

It will be understood that article 100 could have several different appearances from several different viewpoints. For example, upper 102 viewed from a particular viewpoint may appear to be completely red. From another viewpoint, upper 102 may appear to be any combination of, for example, red, yellow, blue, and/or purple. As shown in FIGS. 10 and 11 article of footwear is intended to be used with a left foot; however, it should be understood that the following description may equally apply to a mirror image of article of footwear 100 that is intended for use with a right foot (not shown).

Figure 12:
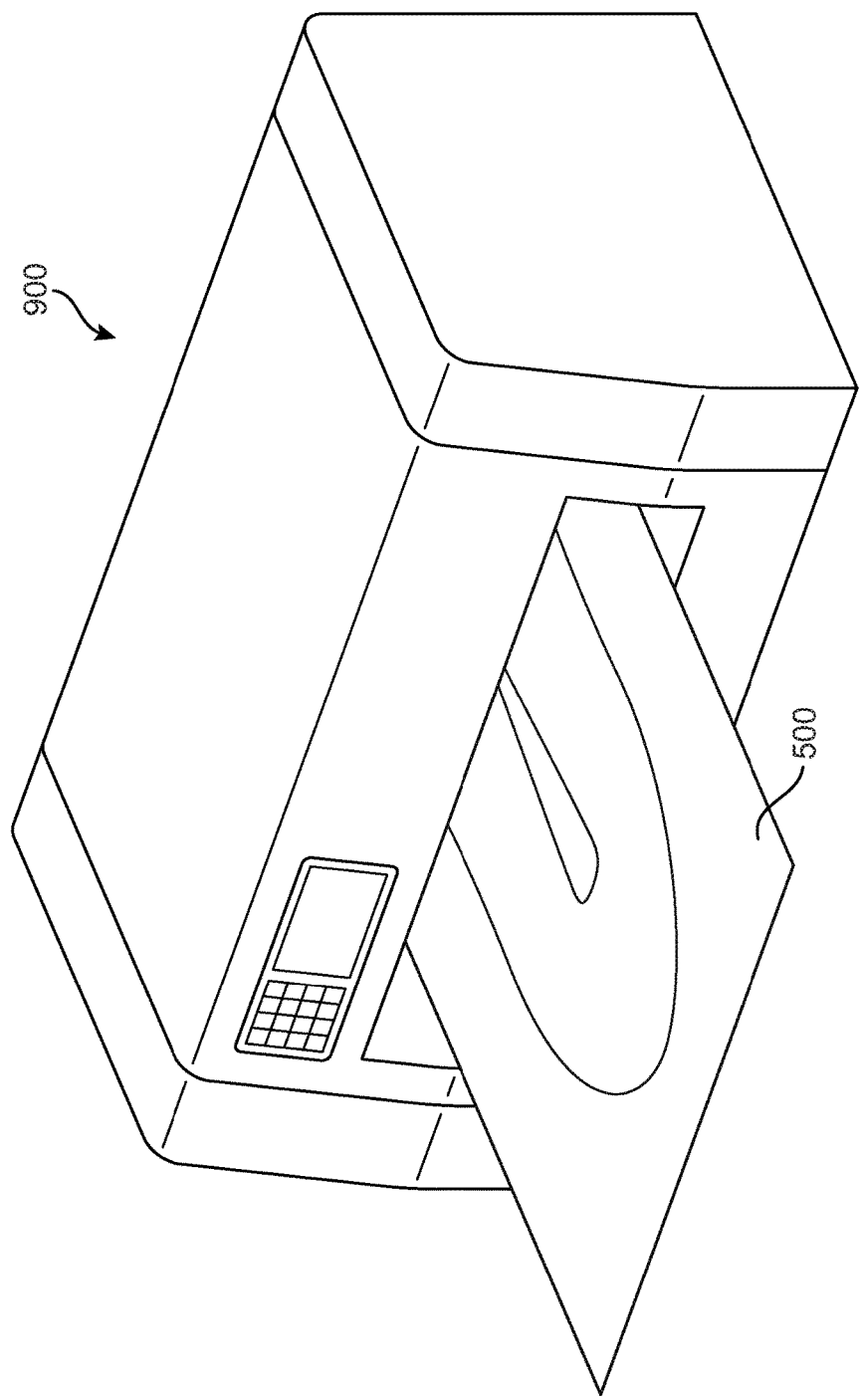
FIGS. 12 and 13 are isometric views of an embodiment of a printing apparatus used to print a discrete coloring element and lens layers of lenticular lens structure onto a base material element.

FIGS. 12-18 illustrate an exemplary process of disposing optical structures 200 on a base material element 500 in order to form an article (e.g. an article of footwear 100 or an article of apparel, shown later) with optical structures 200 on an exterior surface. Printing apparatus 900, shown in FIG. 12, is capable of printing discrete coloring elements 210 onto base material element 500 as well as printing successive lens layers of the lenticular lens structure 220. Printing apparatus 900 has a cable (not shown) connected to a power source (not shown) in order to provide power to printing apparatus 900. It will be understood that "printing successive lens layers" is intended to describe the printing apparatus 900 printing a successive lens layer over the prior lens layer.

The embodiments described throughout this detailed description have a first lens layer 221 with bottom surface having a diameter and/or surface area substantially identical to that of top surface 215 of discrete coloring element 210. Alternatively, in some other embodiments, first lens layer 221 has a bottom surface having diameter and surface area greater than that of top surface 215 of discrete coloring element 210, in which case printing apparatus 900 prints first lens layer 221 onto both discrete coloring element 210 and base material element 500. In still other embodiments, first lens layer 221 has a bottom surface having a diameter and surface area less than that of top surface 215 of discrete coloring element 210, in which case printing apparatus 900 prints first lens layer 221 onto only discrete coloring element 210.

In different embodiments, various printing techniques could be used to apply a coloring layer and/or lens layers to base material element 500. These printing techniques can include, but are not limited to: toner-based printing, liquid inkjet printing, solid ink printing, dye-sublimation printing, inkless printing (including thermal printing and UV printing), MEMS jet printing technologies as well as any other methods of printing. In some cases, printing apparatus 510 may make use of a combination of two or more different printing techniques. The type of printing technique used may vary according to factors including, but not limited to: material of the target article, size and/or geometry of the target article, desired properties of the printed image (such as durability, color, ink density, etc.) as well as printing speed, printing costs and maintenance requirements.

Figure 13:
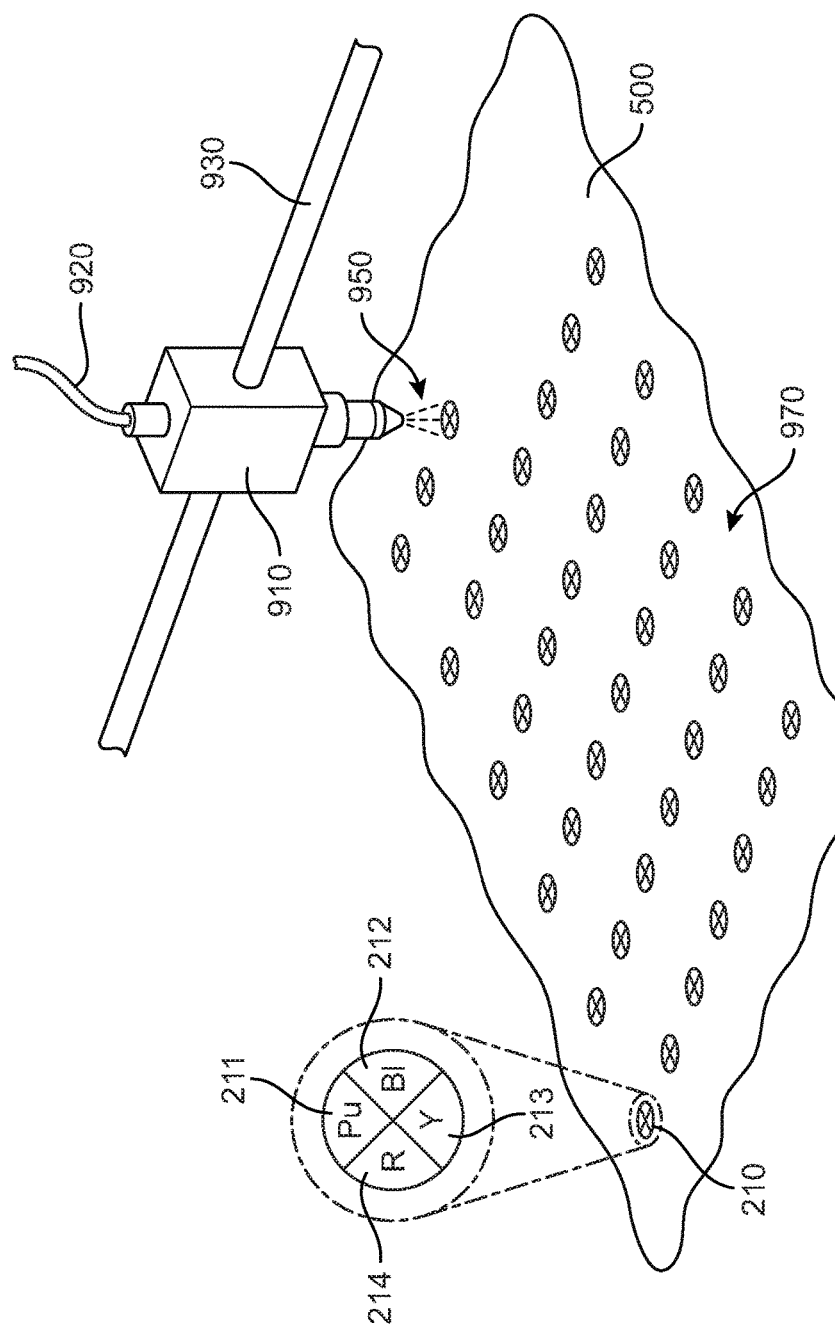

Referring to FIGS. 12 and 13, base material element 500 may be fed through printing apparatus 900. FIG. 13 illustrates print head 910 of printing apparatus 900 dispersing ink toner 950 to form a plurality of discrete coloring elements 970, also referred to simply as discrete coloring elements 970, onto base material element 500. As shown in FIG. 13, a cable 920 feeds ink toner 950 from printing apparatus 900 to print head 910. Print head 910 is connected to a rod element 930 capable of moving print head 910.

In FIG. 13, discrete coloring elements 970 are spaced evenly apart from each other throughout base material element 500 to form several rows and columns of discrete coloring elements 970. In other embodiments, print head 910 may print discrete coloring elements 970 that are not evenly spaced apart. FIG. 13 shows discrete coloring element 210 having four regions, or quadrants, with first quadrant 211 being purple (Pu), second quadrant 212 being blue (Bl), third quadrant 213 being yellow (Y), and fourth quadrant 214 being red (R). It will be understood that discrete coloring element 210 may have at least one of several colors, and the colors may be printed in various proportions. For example, in some embodiments, one half of discrete coloring element 210 may be colored in purple, one quarter of discrete coloring element 210 may be colored in red, and remaining quarter of discrete coloring element 210 may be colored in yellow. In an exemplary embodiment, each of the remaining discrete coloring elements 970 may have a similar coloring configuration to discrete coloring element 210.

For purposes of illustration, discrete coloring elements 970 are shown schematically, and in particular are substantially larger and further spaced apart than they may be in some embodiments. In other words, discrete coloring elements 970 shown in FIG. 13 are not necessarily shown to scale in terms of size/diameter of discrete coloring elements 970 and spacing between adjacent of discrete coloring elements 970.

Figure 14:
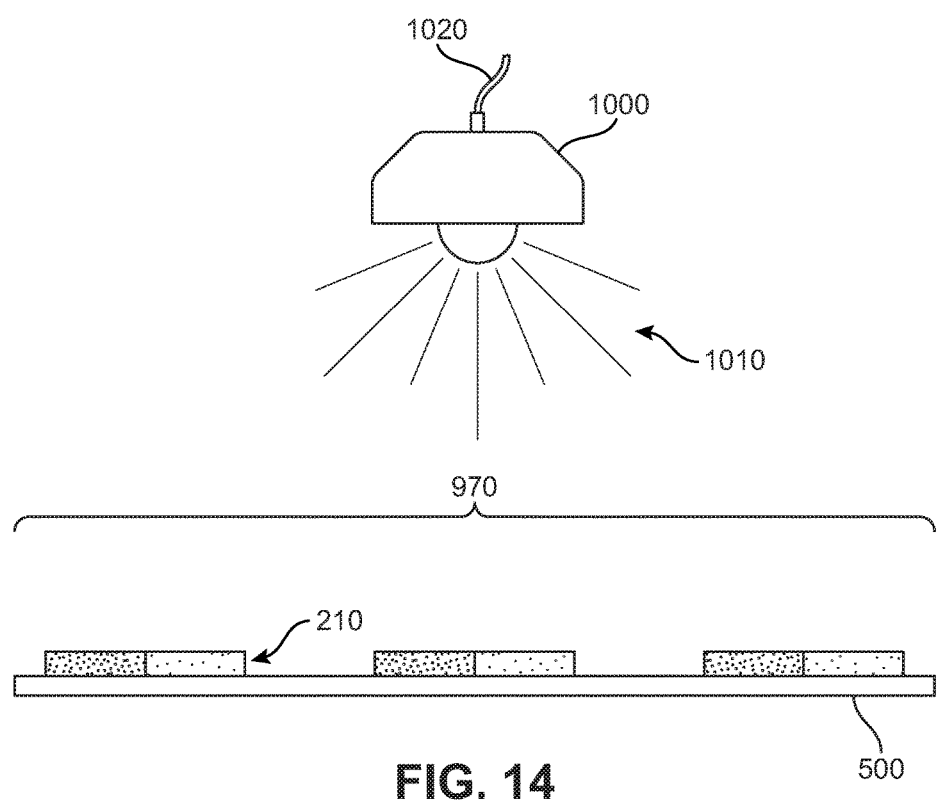
FIG. 14 is an embodiment of radiation source curing a discrete coloring element at a given radiation intensity.

FIG. 14 illustrates a radiation source 1000 capable of emitting radiation 1010 to discrete coloring elements 970. Radiation source 1000 has a cable 1020 connected to a power source (not shown) in order to provide power to radiation source 1000. Radiation source 1000 could be a light (for example, from a light bulb) or a heat lamp. Radiation source 1000 may provide any kind of electromagnetic radiation, including ultraviolet (UV) radiation. Radiation source 1000 is also capable of emitting radiation 1010 to each lens layer of a lenticular lens structure (shown later).

After print head 910 prints discrete coloring elements 970, radiation 1010 from radiation source 1000 is used to cure discrete coloring elements 970. The term "cure" or "curing" as used throughout this detailed description and in the claims refers to a process of treating and/or drying. Curing the discrete coloring elements 970 and/or the lens layers of the optical structures 200 may contribute to shaping optical structures 200 to achieve a desired shape. Both discrete coloring elements 970 and all lens layers of optical structures 200 may be cured by radiation 1010 from radiation source 1000. Curing time for discrete coloring element 970 and the corresponding lens layers may vary, but generally lasts approximately in the range between 0.1 seconds and 1 minute, in order to achieve desired visual effects.

Radiation source 1000 is capable of emitting radiation 1010 at various intensities. For purposes of characterizing a range of possible radiation intensities for radiation source 1000, reference is made to intensities as a percentage of a maximum radiation intensity that can be emitted by radiation source 1000. Thus, the possible intensities are described as ranging from 0% intensity (no radiation) to 100% intensity (maximum intensity). Here, the term maximum intensity may refer to either the maximum intensity achievable by the selected radiation source, or to a maximum desired intensity to achieve a particular curing effect. Thus, in some cases, the maximum intensity may not be the highest radiation setting of the selected radiation source. Accordingly, curing of discrete coloring elements 970 and the corresponding lens layers of optical structures 200 may be cured from radiation ranging from 0% intensity to 100% intensity.

Curing individual lens layers of each lenticular lens structure at a different intensity (relative to other lens layers) may cause differences in the resulting index of refraction of each layer. For example, optical structure 207 having first lens layer 221 cured at 5% intensity may have an index of refraction different from third lens layer 226 cured at 100% intensity. This curing technique may contribute to light rays propagating through first lens layer 221 in a different manner (such as a different angle) than through third lens layer 226. Further, this curing technique may also contribute to discrete coloring element 210 appearing different when viewing through lenticular lens structure 220 at different angles.

In some embodiments, radiation source 1000 is connected to printing apparatus 900, for example, via the print head 910 such that radiation source 1000 may be integrated within printing apparatus 900. In other embodiments, radiation source 1000 may be separate from, or external to, printing apparatus 900. In some embodiments, radiation source 1000 may be stationary. In other embodiments, radiation source 1000 may be configured to traverse in several directions such that radiation 1010 from radiation source 1000 may be emitted anywhere over base material element 500. Regardless of whether radiation source 1000 is stationary or capable of moving, radiation 1010 from radiation source 1000 may be delivered to any portion of base material element 500 with intensity ranging from 0% to 100%. In the exemplary embodiment shown in FIG. 14, radiation 1010 is emitted at 100% intensity to cure discrete coloring element 210.

After printing apparatus 900 prints several discrete coloring elements 970 onto base material element 500, radiation source 1000 may cure discrete coloring elements 970 either individually or cure several discrete coloring elements 970 simultaneously. In some methods of printing and curing, radiation source 1000 may cure all discrete coloring elements 970 simultaneously before printing apparatus 900 begins printing any lens layers over discrete coloring elements 970. In other methods of printing and curing, printing apparatus 900 may begin printing lens layers over some discrete coloring elements 970 that have been cured before radiation source 1000 cures the remaining (uncured) discrete coloring elements 970.

Figure 15:
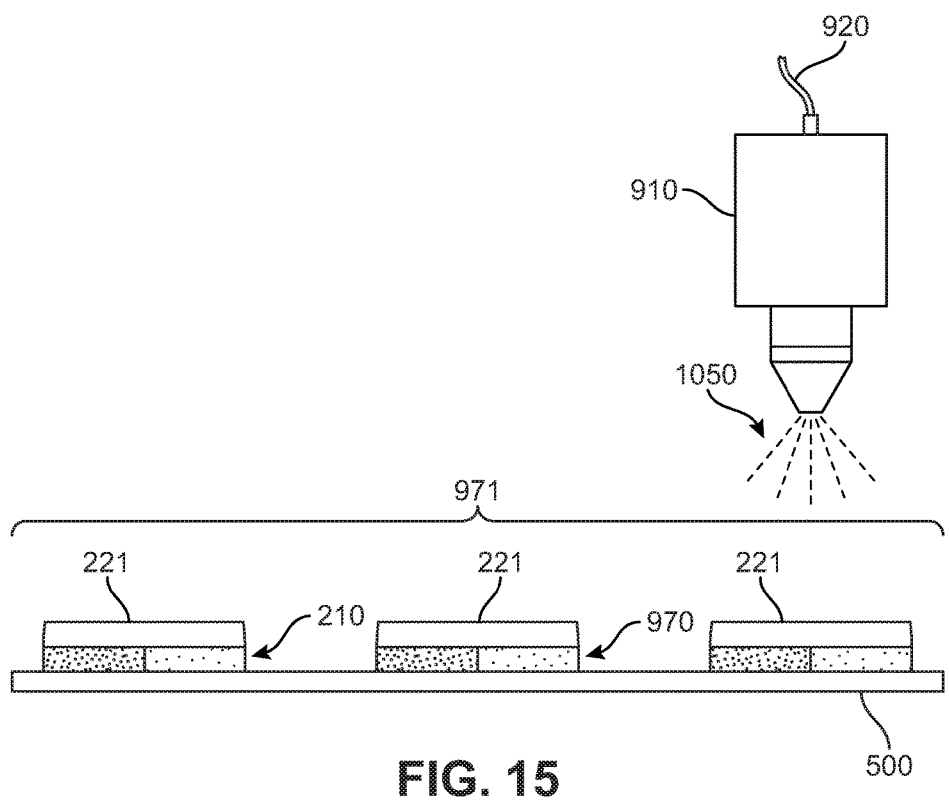
FIG. 15 illustrates a print head printing a first lens layer onto a discrete coloring element, according to an embodiment.
Figure 16:
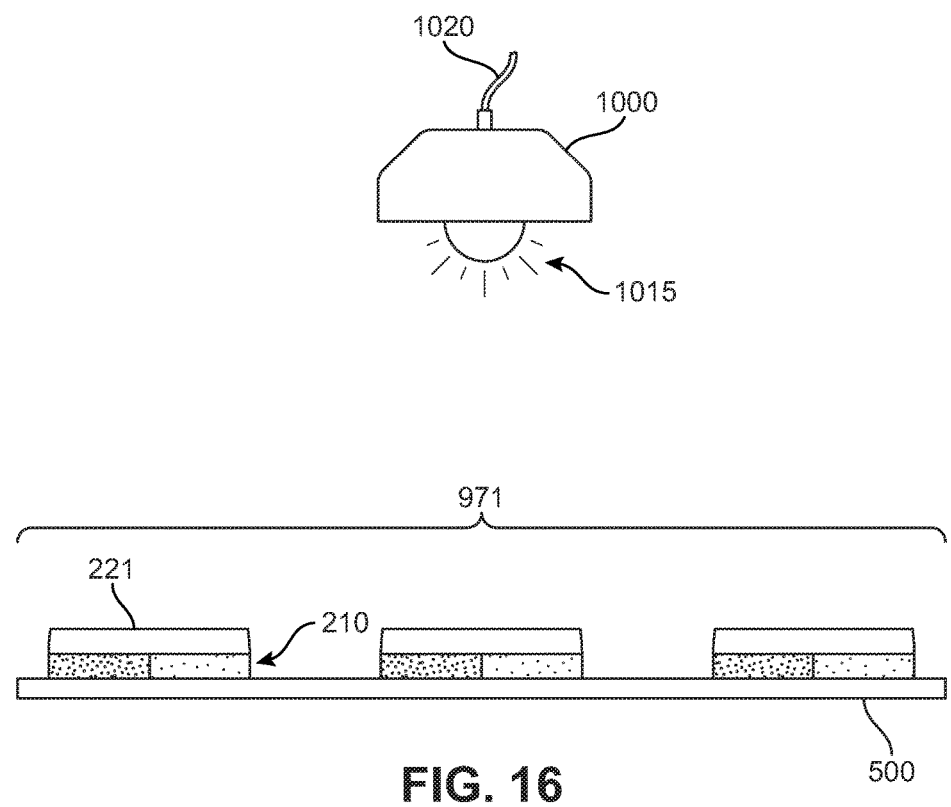
FIG. 16 is an embodiment of radiation source curing a first lens layer.

As shown in FIGS. 15 and 16, after discrete coloring elements 970 are cured, print head 910 prints first lens layers 971 on the top portions of discrete coloring elements 970. That is, each discrete coloring element of the plurality of discrete coloring elements 970 is covered with a first lens layer from the plurality of first lens layers 971. For example, first lens layer 221 may be printed onto discrete coloring element 210.

Generally, each lens layer is made of transparent or translucent toner 1050. However, each lens layer could have at least some color while at least maintaining some transparent or translucent properties. In some embodiments, printing apparatus 900 may use print head 910 to print both discrete coloring elements 970 and one or more of the lens layers. In other embodiments, printing apparatus 900 may use a different print head to print the lens layers.

FIG. 16 shows an exemplary curing process for first lens layers 971. Radiation 1015 from radiation source is again used to cure first lens layers 971 (such as first lens layer 221). In some embodiments (not shown), first lens layers 971 may be cured with radiation having an intensity greater than or equal to the intensity used to cure discrete coloring elements 970 in a previous step. In the exemplary embodiment in FIG. 16, radiation source 1000 emits radiation 1015 having 5% intensity (i.e., 5% of the maximum intensity or 5% of a predetermined intensity) to cure first lens layers 971.

Radiation source 1000 may cure lens layers individually or cure several lens layers simultaneously. In some methods of printing and curing, radiation source 1000 may cure all of first lens layers 971 (printed onto discrete coloring element 970) simultaneously before printing apparatus 900 prints second lens layers 972 (see FIG. 17). In other methods of printing and curing, printing apparatus 900 may begin printing second lens layers 972 over some lens layers of first lens layers 971 that have been cured before radiation source 1000 cures remaining (uncured) first lens layers 971. It will be understood that these methods printing and curing apply to successive lens layers of the final lenticular lens structures.

Figure 17:
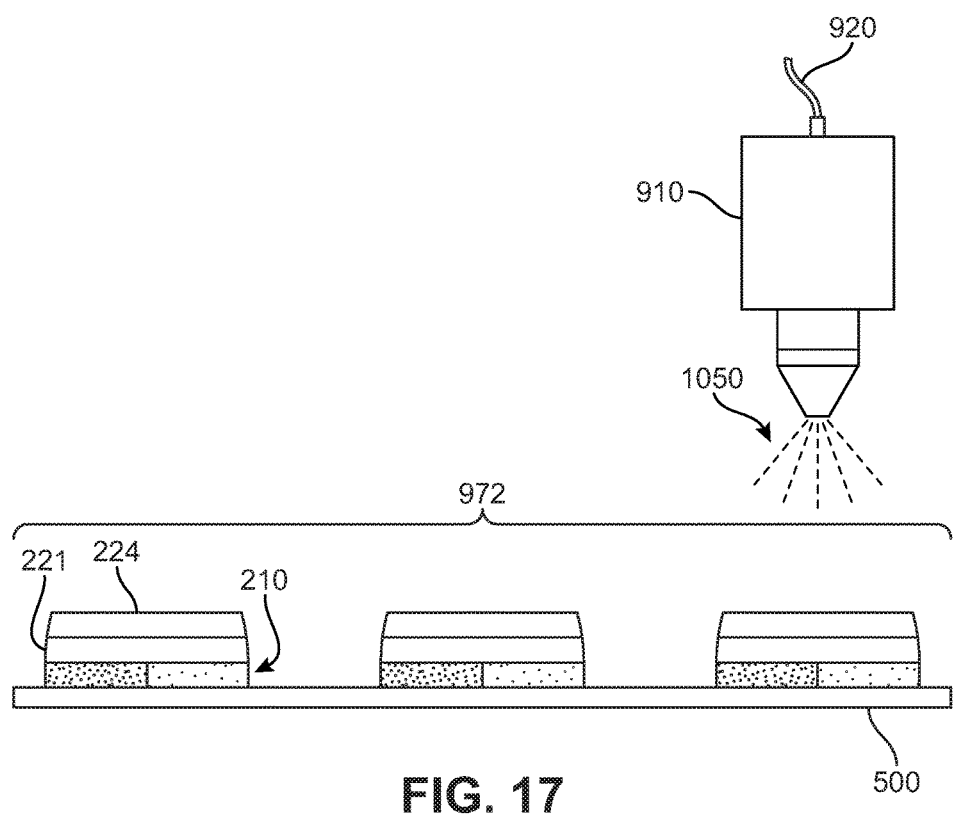
FIG. 17 illustrates an embodiment of a print head printing second lens layer onto second lens layer.
Figure 18:
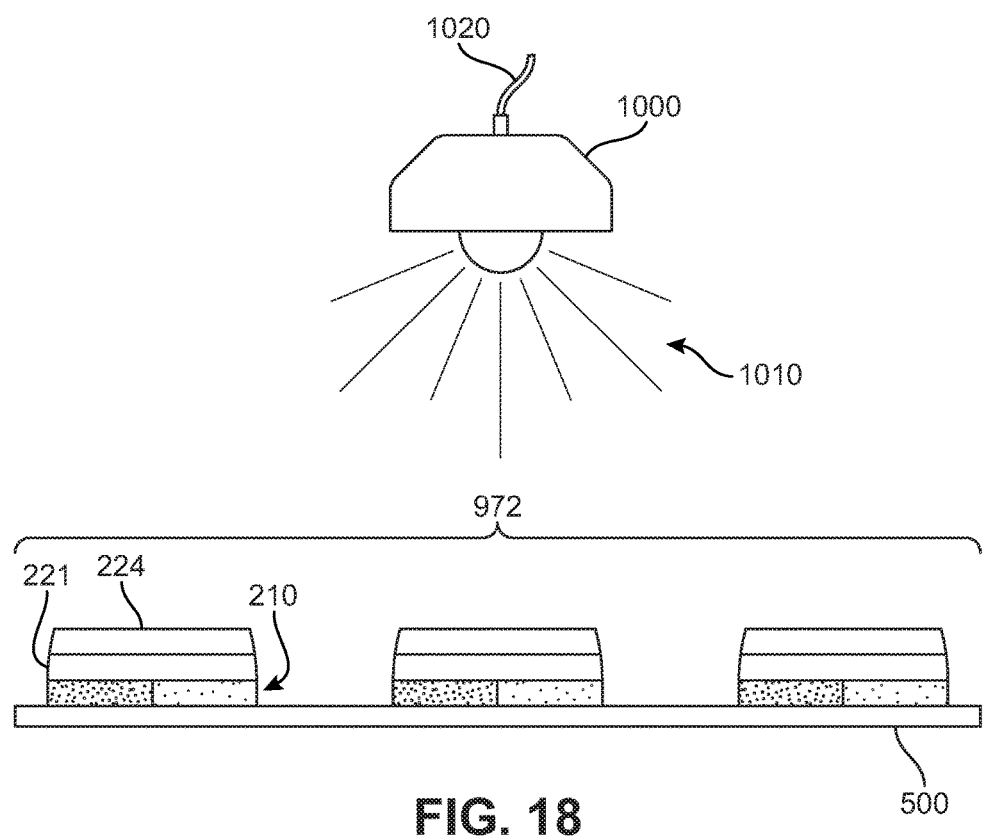
FIG. 18 is an embodiment of radiation source curing a second lens layer.

FIGS. 17 and 18 illustrate a side schematic view of the printing and curing of a plurality of second lens layers 972 of the lenticular lens structures. In FIG. 17, print head 910 prints second lens layers 972 over top surface (not shown) of first lens layers 971. In some embodiments (not shown), second lens layers 972 may have similar size and shape as first lens layers 971. In the exemplary embodiment shown in FIGS. 17 and 18, second lens layers 972 are smaller than first lens layers 971 and are also arched at the outer surfaces of first lens layers 971.

Collectively, printing apparatus 900 may print lens layers such that first lens layers 971, second lens layers 972, and successive lens layer form a dome like structure. However, it should be noted that in other embodiments, printing apparatus 900 may print lens layers such that the resulting lenticular lens structures resemble a parallelogram, a cube, a semi-cylindrical shape, a semi-spherical shape, or a semi-ellipsoid shape. Moreover, in some other embodiments, different lenticular lens structures could be formed to have substantially different geometries from one another.

FIG. 18 shows the curing process for second lens layers 972. In some embodiments (not shown), second lens layers 972 may be cured with radiation having an intensity less than or equal to the intensity used to cure first lens layers 971. In the exemplary embodiment in FIG. 19, radiation source 100 emits radiation 1010 having 100% intensity (e.g., the predetermined maximum intensity level) to cure second lens layers 972.

Figure 19:
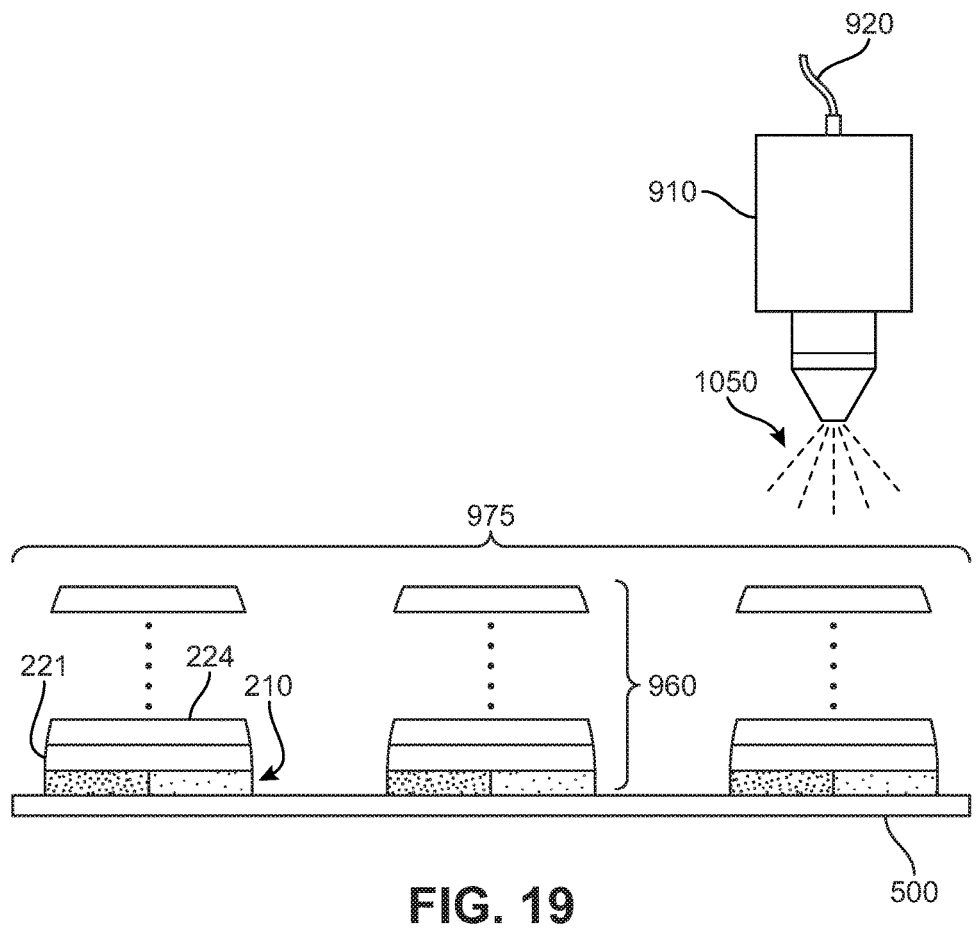
FIG. 19 is an embodiment of a print head printing multiple lens layers.

FIG. 19 illustrates a side view of print head 910 and the formation of "n" additional lens layers 975 of the lenticular lens structures 960. Although exemplary embodiments shown in FIGS. 7-9 show lenticular lens structures 960 having five lens layers, printing apparatus 900 is capable of printing more than five lens layers. Moreover, radiation source (not shown) is capable of curing lenticular lens structures 960 having more than five lens layers (for example, "n" layers 975) at any intensity previously disclosed in this detailed description.

Figure 20:
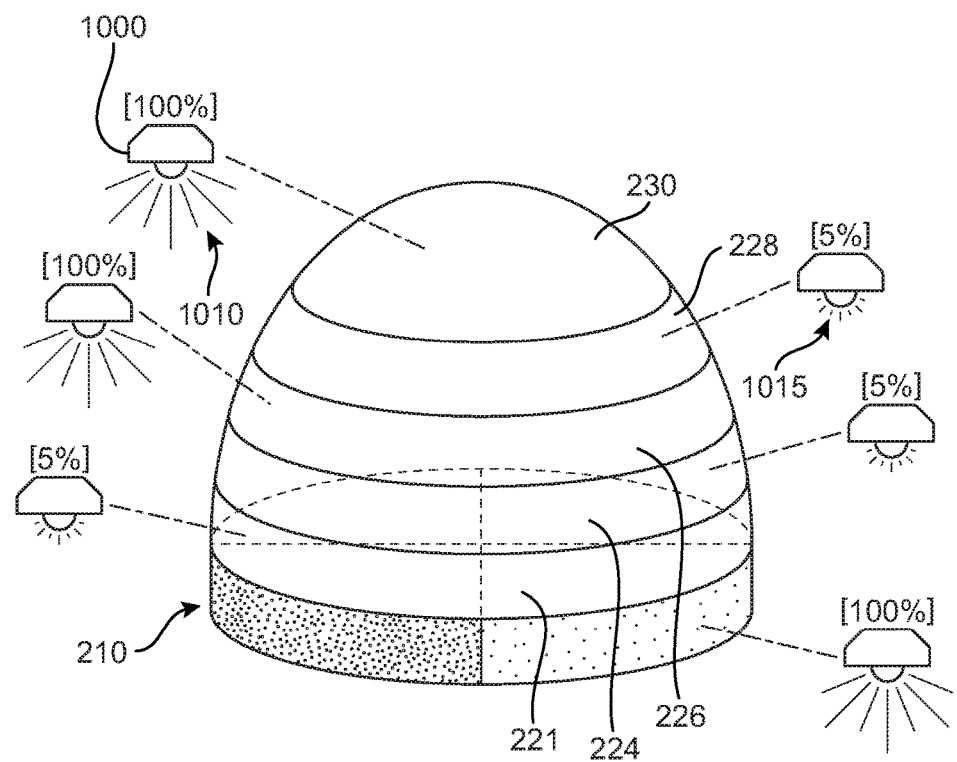
FIG. 20 is an isometric view of an embodiment of an optical structure having gone through a full printing and curing process.

FIG. 20 is an exemplary embodiment of optical structure 200 with both the discrete coloring element 210 and all lens layers of lenticular lens structure 220 having undergone a curing process from radiation source 1000. In this exemplary embodiment, discrete coloring element 210 is cured at 100% intensity, first lens layer 221 is cured at 5% intensity, second lens layer 224 is cured at 5% intensity, third lens layer 226 is cured at 100% intensity, fourth lens layer 228 is cured at 5% intensity, and fifth lens layer 230 is cured at 100% intensity. As stated earlier, in other embodiments, radiation intensity could vary for the discrete coloring element 210 as well as any of the lens layers of lenticular lens structure 220. In particular, the radiation intensity used to cure each lens layer can be selected to achieve desired optical effects, including desired indices of refraction for each layer to form a desired lenticular lens configuration.

Figure 22:
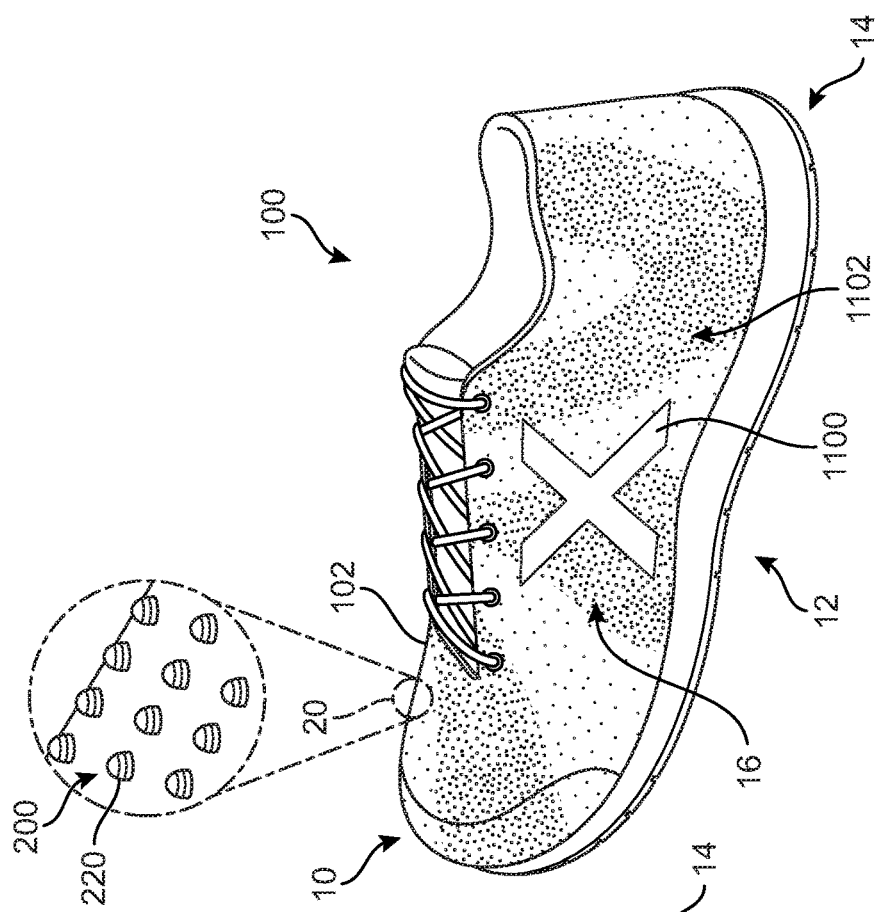
FIGS. 21 and 22 are isometric views of an article of footwear shown at different viewing angles, with FIG. 22 having an appearance of indicia on article of footwear.
Figure 21:
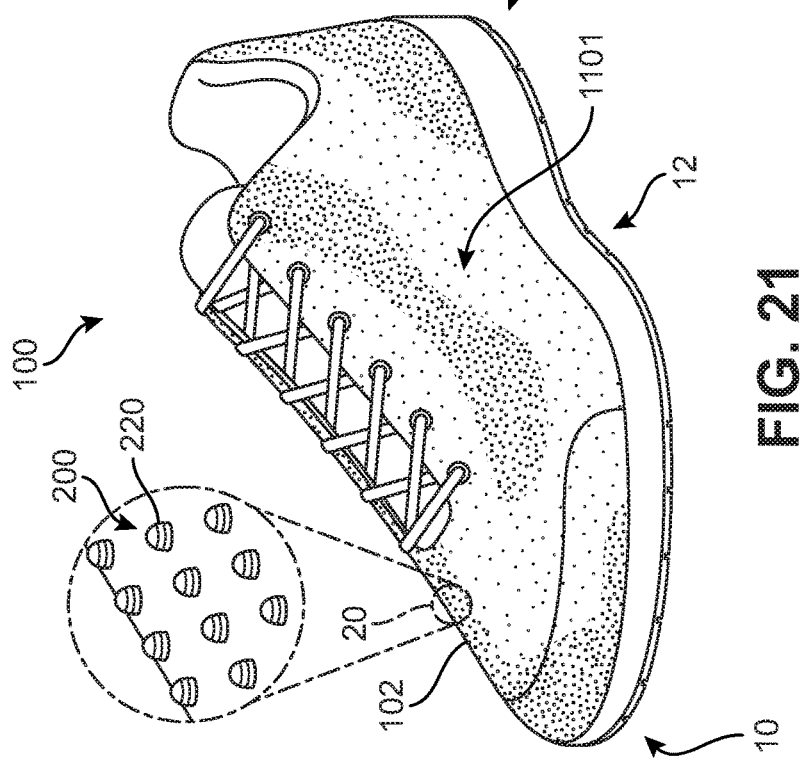

FIGS. 21 and 22 illustrate an embodiment of an article of footwear 100 shown at two different viewpoints, and having several optical structures 200 on forefoot 10, midfoot 12, and heel portion 14. In additional to an upper 102 having a difference appearance, in terms of color schemes, from different viewing angles, some embodiments of article 100 have optical structures 200 configured such that upper 102, when viewed from at least one viewpoint, has an appearance displaying an indicia. The term "indicia" as used throughout this detailed description and in the claims refers to letters, numbers, symbols and/or logos. For example in FIG. 21, optical structures 200 may be configured on upper 102 to give a first appearance 1101 of upper 102, as shown in FIG. 21. However, when viewed from second viewpoint, shown in FIG. 22 with heel portion 14 in the forefront, the same article of footwear 100 has an upper 102 not only with second appearance 1102 different from first appearance 1101 (in terms of color scheme), but second appearance 1102 also displays a logo 1100 on lateral side 16 of upper 102. It will be understood that indicia, such as a logo 1100 in FIG. 22, is only intended for purposes of description and is not intended to demarcate a precise logo at a precise location. Indicia could be displayed at a given viewpoint or viewpoints anywhere on the upper 102, including forefoot portion 10, midfoot portion 12, and/or heel portion 14. Also, indicia could be displayed on the lateral side 16 and/or medial side 18 of upper 102.

Figure 23:
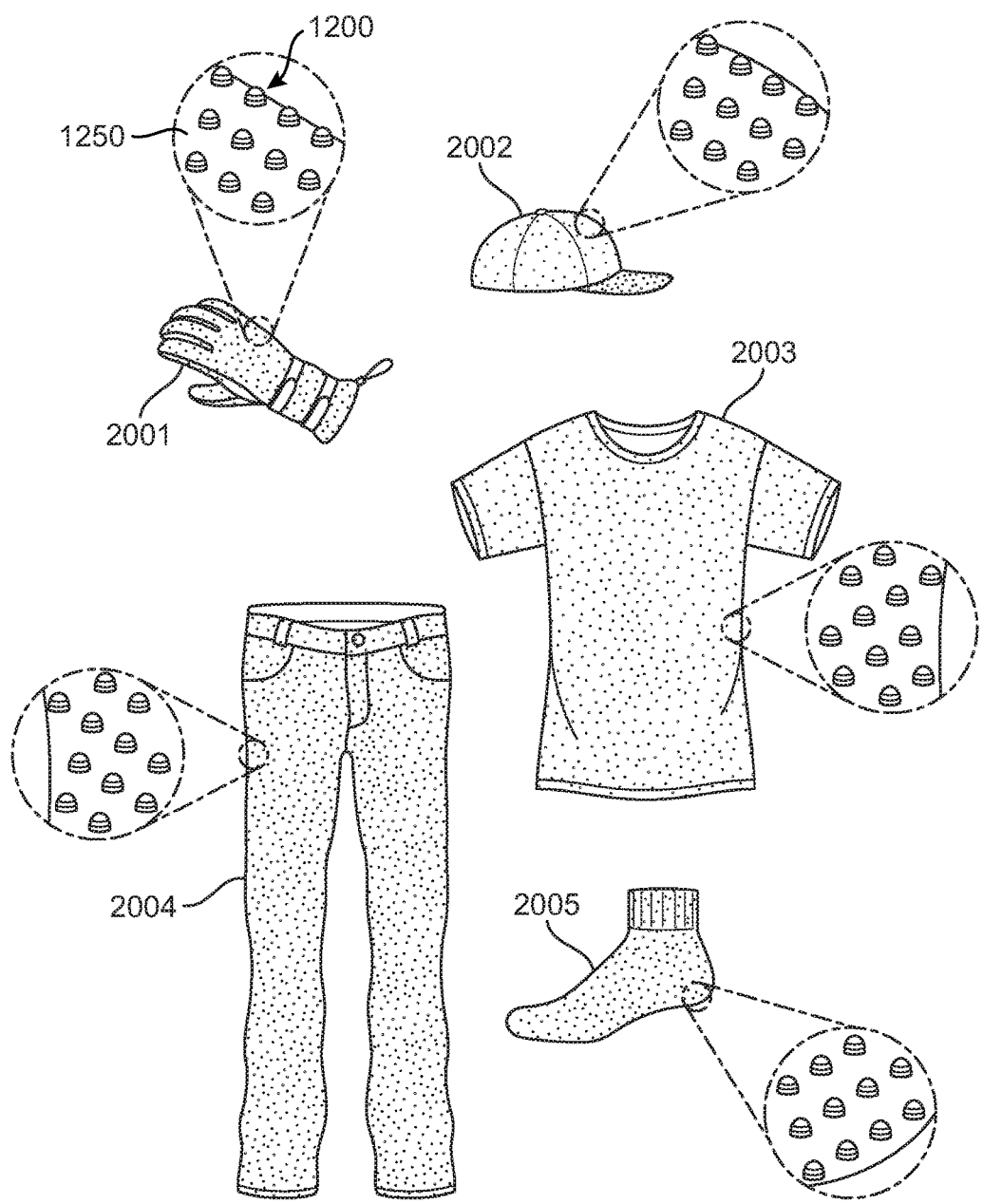
FIG. 23 illustrates an embodiment of several articles of apparel, each having a plurality of optical structures.

FIG. 23 illustrates several articles of apparel having base material elements with a plurality of optical structures. For example, glove 2001 is seen to be comprised of a base material element 1250 with a plurality of optical structures 1200. Optical structures 1200 on base material element 1250 are configured in a manner described above for article of footwear 100. This includes, for example, coloring schemes, appearances, indicia, and placement of optical structures on base material element. This also includes size, shape, and geometry of optical structure and its elements.

In a similar manner, optical structures can be arranged on various other articles of clothing or apparel such as hat 2002, shirt 2003, pants 2004, and sock 2005. Additional articles include, but are not limited to: stocking caps, jackets as well as bags, purses or other kinds of articles.

As noted above, a printed optical structure with bottom color layer and clear lens layers that provides various optical and aesthetic effects such as apparent color changes depending upon the viewing angle may have any type of planar and cross-sectional shape. As discussed above, the apparent color of the discrete coloring element changes when the discrete coloring element is viewed from different angles due to the index of refraction of the lens structure of the optical structure. In the embodiment shown in FIGS. 24 and 25, an optical structure 1107 may be attached to a base element or textile 1100, such as by printing in the manner discussed above. Textile 1100 may be any type of textile known in the art that is capable of receiving and supporting an optical structure. As will be recognized by those in the art, textile 1100 may be incorporated into any of the articles discussed above.

Figure 24:
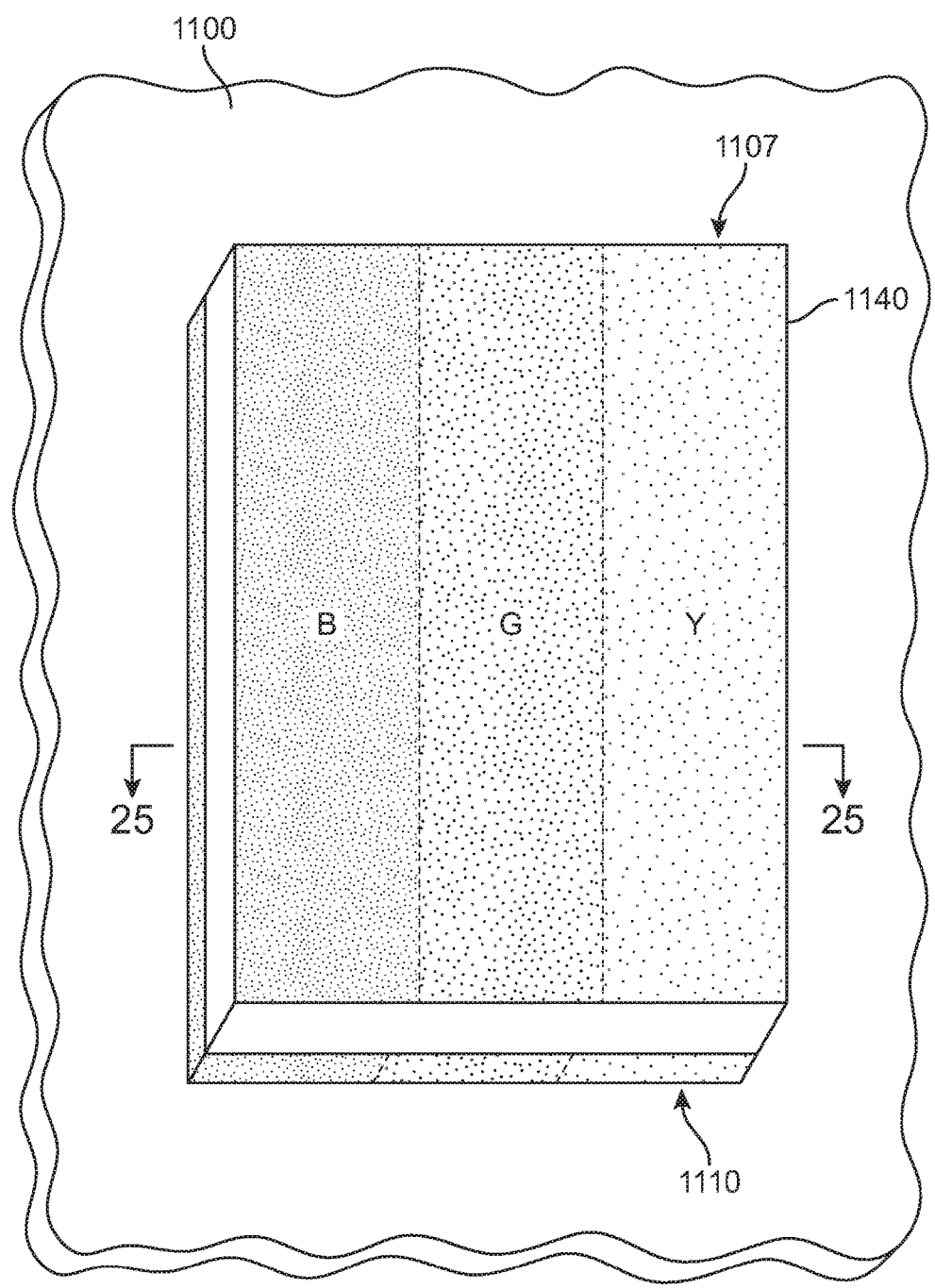
FIG. 24 is a perspective view of a non-circular embodiment of an optical structure, where the optical structure is a rectangular prism.
Figure 25:
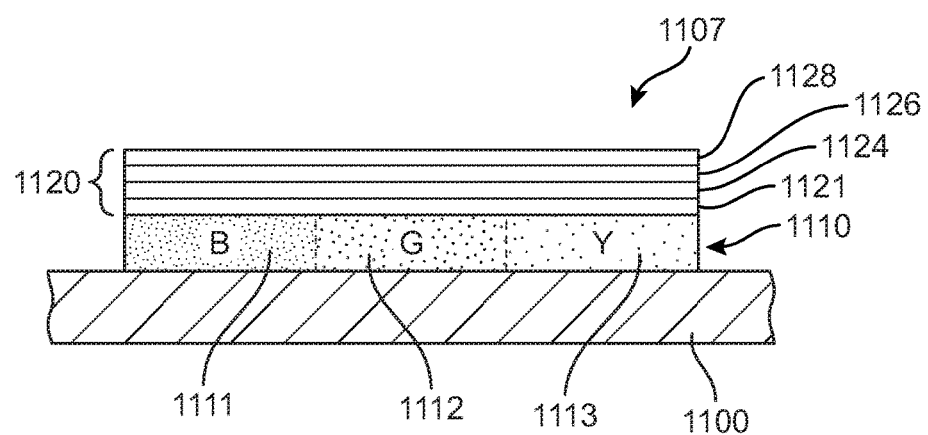
FIG. 25 is a plan cross-sectional view of the optical structure shown in FIG. 24, taken along line 25-25.

In this embodiment, optical structure 1107 is a rectangular prism having a rectangular planar shape as shown in FIG. 24 and defined by a rectangular perimeter 1140. Optical structure 1107 also has a rectangular cross-sectional shape as shown in FIG. 25. While only one rectangular prism is shown, a person of ordinary skill will recognize that a plurality of rectangular prisms may be provided in various patterns on textile 1100.

In this embodiment, optical structure 1107 includes a rectangular discrete coloring element 1110 and a multi-layer rectangular lens structure 1120. Rectangular discrete coloring element 1110 is similar to discrete coloring element 210, discussed above, where a first side of cured ink rectangular discrete coloring element 1110 is positioned adjacent to and in contact with textile 1100 while a second side of rectangular discrete coloring element 1110 is positioned adjacent to and in contact with lens structure 1120. Rectangular discrete coloring element 1110 includes three distinct color regions: a first color region 1111, a second color region 1112, and a third color region 1113. Each color region has a color that is different from the color of any other color region, and each color region includes only one color. In the embodiment shown in FIGS. 24 and 25, for example, first color region 1111 is blue, second color region 1112 is green, and third color region 1113 is yellow. In other embodiment, other colors may be used, or multiple colors may be provided in a single color region.

Lens structure 1120 is similar to the lens structures discussed above. Lens structure 1120 may include any number of cured toner layers having any thickness, where the thickness of the layers may be selected to provide a particular index of refraction. In some embodiments, the cured toner may be clear or transparent. In other embodiments, the cured toner may include some color but remain translucent.

In the embodiment shown in FIG. 25, lens structure 1120 includes four layers: a first or bottom most layer 1121, a second layer 1124, a third layer 1126, and a fourth or top layer 1128. In this embodiment, all of the layers have the same, uniform thickness, though in other embodiments, the thickness of any layer and/or the thickness of adjacent layers may vary. Because the layers may be printed on a pixel basis, any lens layer or each lens layer may be so that any particular pixel or set of pixels in the lens layer may have a different index of refraction. In this manner, a lens that has a straight top surface may yield a similar optical effect to the lenticular lens structure discussed above, where different viewing angles result in optically different aesthetic effects.

Similar to the embodiments discussed above, discrete coloring element 1110 is sized and shaped so that a bottom surface of the bottom most layer 1121 of lens structure 1120 has the non-circular shape of and is coextensive with the second side of the discrete coloring element. In this embodiment, all layers of lens structure have the same size and shape and are coextensive with each other and discrete coloring element 1110. In other embodiments, lens structure 1120 may have tapering layers so that the cross-section is a frustopyramidal shape or a frustopyramidal shape with a rounded top, as shown in other embodiments.

Optical structures in the shape of rectangular prisms for use in textiles and/or apparel may be beneficial in providing more surface area and continuous surface area coverage than rounded shapes like the domes discussed above. In embodiments where the optical structures are used to provide structural characteristics like abrasion resistance, the ability to more densely pack rectangular prisms than domes may provide more abrasion resistance.

Figure 26:
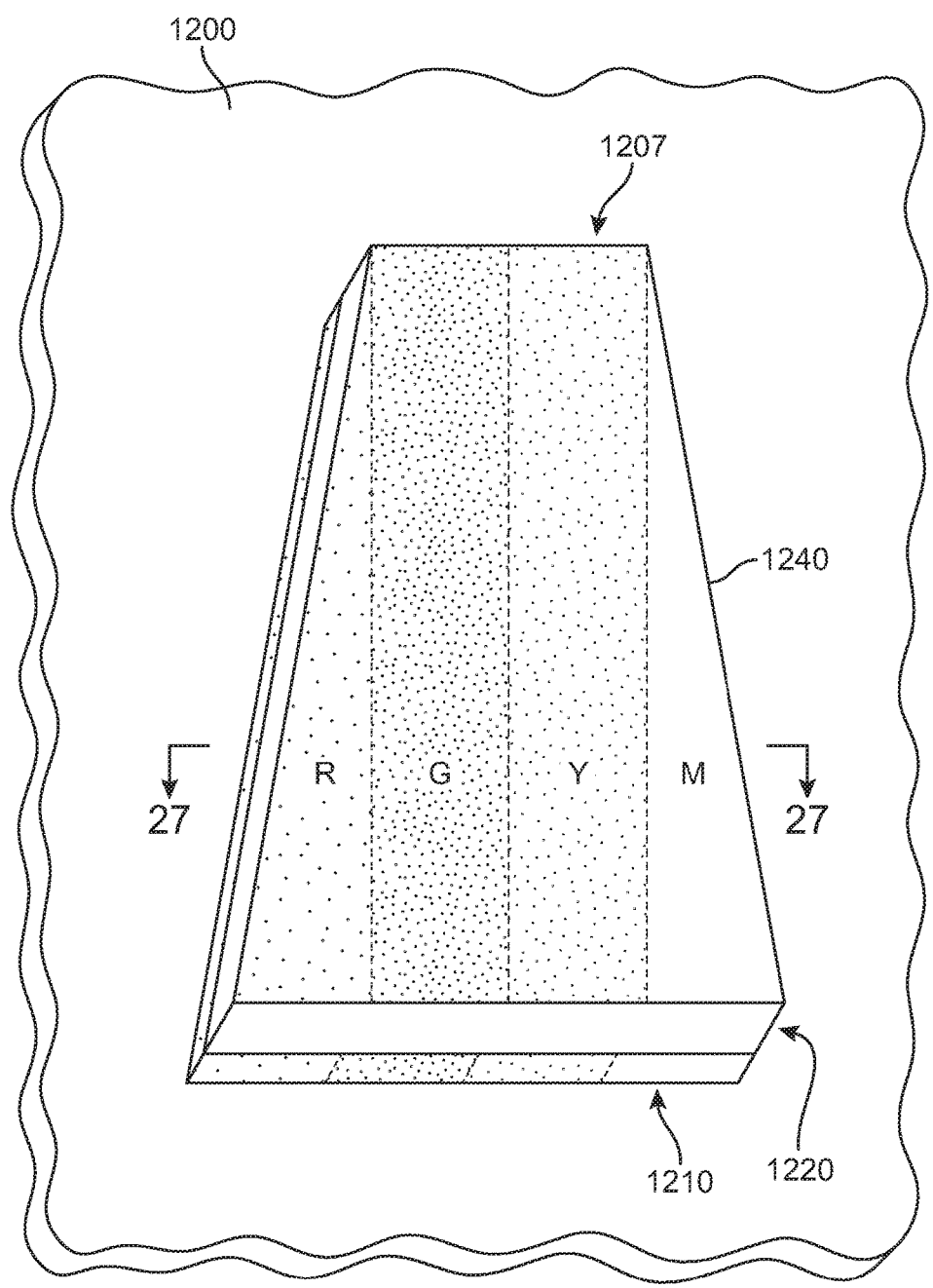
FIG. 26 is a perspective view of a non-circular embodiment of an optical structure, where the optical structure is a trapezoidal prism.
Figure 27:
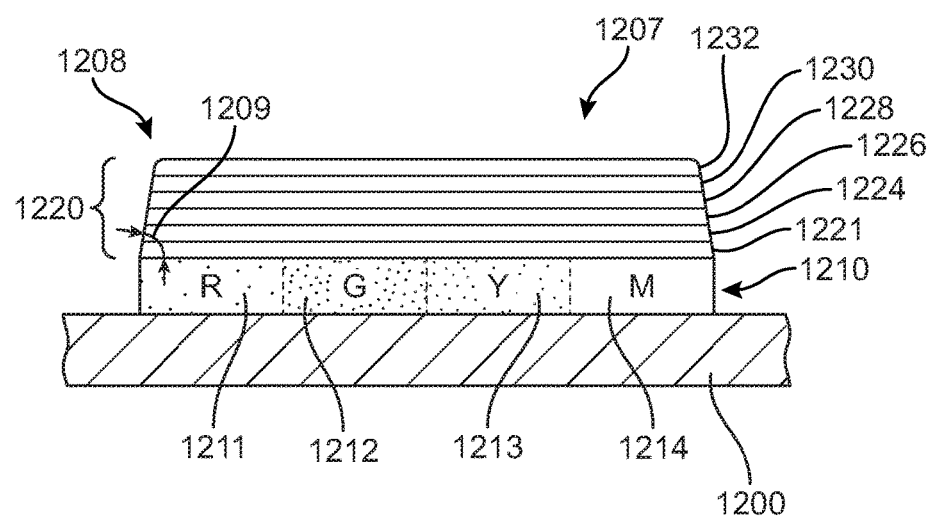
FIG. 27 is a plan cross-sectional view of the optical structure shown in FIG. 26, taken along line 27-27.

FIGS. 26-27 show another embodiment of a non-circular optical structure embodiment that provides various optical and aesthetic effects such as apparent color changes depending upon the viewing angle may have any type of planar and cross-sectional shape. As discussed above, the apparent color of the discrete coloring element changes when the discrete coloring element is viewed from different angles due to the index of refraction of the lens structure of the optical structure. For example, in the embodiment shown in FIGS. 24 and 25, a trapezoidal optical structure 1207 may be attached to a textile 1200, such as by printing in the manner discussed above. Textile 1200 may be any type of textile known in the art that is capable of receiving and supporting an optical structure. As will be recognized by those in the art, textile 1200 may be incorporated into any of the articles discussed above.

In this embodiment, optical structure 1207 is a trapezoidal prism having a trapezoidal planar shape as shown in FIG. 26 and defined by a trapezoidal perimeter 1240. Optical structure 1207 also has a trapezoidal cross-sectional shape as shown in FIG. 27. While only one trapezoidal prism is shown, a person of ordinary skill will recognize that a plurality of trapezoidal prisms may be provided in various patterns on textile 1200.

In this embodiment, optical structure 1207 includes a trapezoidal prism discrete coloring element 1210 and a multi-layer trapezoidal lens structure 1220. Trapezoidal discrete coloring element 1210 is similar to discrete coloring element 210, discussed above, where a first side of cured ink trapezoidal discrete coloring element 1210 is positioned adjacent to and in contact with textile 1200 while a second side of trapezoidal discrete coloring element 1210 is positioned adjacent to and in contact with lens structure 1220. Trapezoidal discrete coloring element 1210 includes four distinct color regions: a first color region 1211, a second color region 1212, a third color region 1213, and a fourth color region 1214. Each color region has a color that is different from the color of any other color region. In the embodiment shown in FIGS. 26 and 27, for example, first color region 1212 is red, second color region 1212 is green, third color region 1213 is yellow, and fourth color region 1214 is magenta. In other embodiments, the colors may be different, and/or multiple colors may be provided in a single color region.

Lens structure 1220 is similar to the lens structures discussed above. Lens structure 1220 may include any number of cured toner layers having any thickness, where the thickness of the layers may be selected to provide a particular index of refraction. Lens structure may be see-through; in some embodiments, the layers of lens structure 1220 may be clear or transparent. In other embodiments, the layers may include some color but remain translucent. In the embodiment shown in FIG. 26, lens structure 1220 includes six layers: a first or bottom most layer 1221, a second layer 1224, a third layer 1226, a fourth layer 1228, a fifth layer 1230, and a sixth or top most layer 1232. In this embodiment, all of the layers have the same, uniform thickness, though in other embodiments, the thickness of any layer and/or the thickness of adjacent layers may vary. Because the layers may be printed on a pixel basis, any lens layer or each lens layer may be so that any particular pixel or set of pixels in the lens layer may have a different index of refraction. In this manner, a lens that has a straight top surface may yield a similar optical effect to the lenticular lens structure discussed above, where different viewing angles result in optically different aesthetic effects.

Similar to the embodiments discussed above, discrete coloring element 1210 is sized and shaped so that a bottom surface of the bottom most layer 1221 of lens structure 1220 has the non-circular shape of and is coextensive with the second side of the discrete coloring element. In this embodiment, lens structure 1220 has tapering layers so that the cross-section is a frustopyramidal shape. The cross-sectional perimeter of lens structure 1220 extends away from discrete coloring element 1210 at an angle 1209. In other embodiments, lens structure 1220 may have a frustopyramidal shape with a rounded top surface. In this embodiment, the top corners 1208 of lens structure 1220 are rounded. In some embodiments, the top corners 1208 or free end corners of lens structure 1220 may be rounded like top corners 1208 to provide a smooth surface to inhibit snagging and potential delamination of the lens structure.

A trapezoidal prism may be beneficial in some embodiments to achieve particular optical aesthetic effects. Further, in some embodiments, the frustopyramidal shape of the trapezoidal prism may allow for dense packing of the optical structures while maintaining a high degree of relative motion due to the tapered edges.

As noted above, a printed optical structure with bottom color layer and clear lens layers that provides various optical and aesthetic effects such as apparent color changes depending upon the viewing angle may have any type of planar and cross-sectional shape. As discussed above, the apparent color of the discrete coloring element changes when the discrete coloring element is viewed from different angles due to the index of refraction of the lens structure of the optical structure. For example, in the embodiment shown in FIGS. 28 and 29, a Y-shaped optical structure 1307 may be attached to a textile 1300, such as by printing in the manner discussed above. Textile 1300 may be any type of textile known in the art that is capable of receiving and supporting an optical structure. As will be recognized by those in the art, textile 1300 may be incorporated into any of the articles discussed above.

Figure 28:
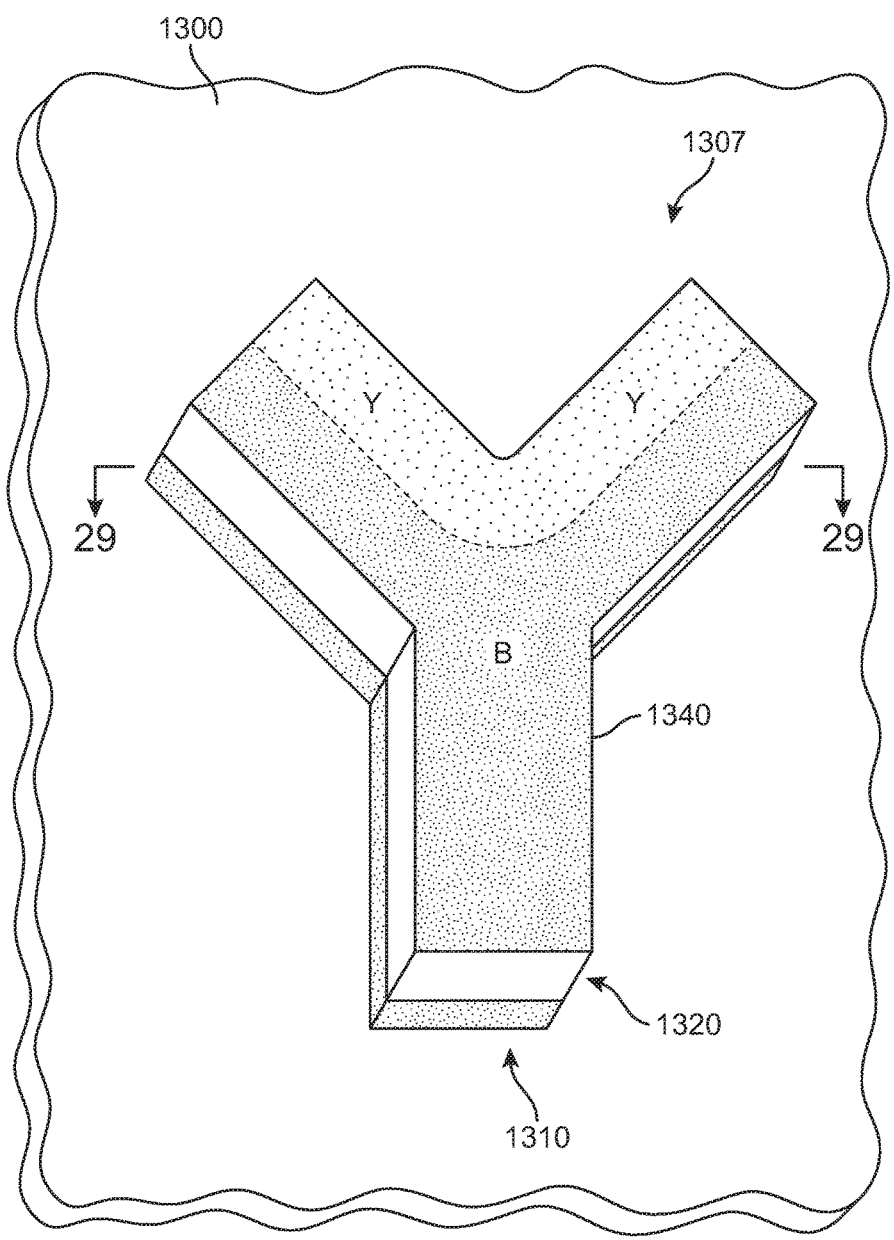
FIG. 28 is a perspective view of a non-circular embodiment of an optical structure, where the optical structure has a Y-shape.
Figure 29:
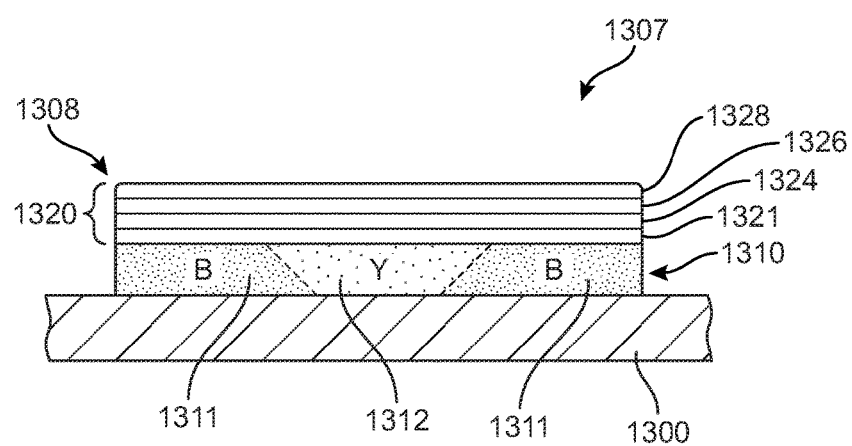
FIG. 29 is a plan cross-sectional view of the optical structure shown in FIG. 28, taken along line 29-29.

In this embodiment, optical structure 1307 is a Y-shaped prism having a Y-shaped planar shape as shown in FIG. 28 and defined by a Y-shaped perimeter 1340. Optical structure 1307 also has a rectangular cross-sectional shape as shown in FIG. 29. While only one Y-shaped prism is shown, a person of ordinary skill will recognize that a plurality of Y-shaped prisms may be provided in various patterns on textile 1300.

In this embodiment, optical structure 1307 includes a Y-shaped prism discrete coloring element 1310 and a multi-layer Y-shaped prism lens structure 1320. Y-shaped discrete coloring element 1310 is similar to discrete coloring element 210, discussed above, where a first side of cured ink Y-shaped discrete coloring element 1310 is positioned adjacent to and in contact with textile 1300 while a second side of Y-shaped discrete coloring element 1310 is positioned adjacent to and in contact with lens structure 1320. Y-shaped discrete coloring element 1310 includes two distinct color regions: a first color region 1311 and a second color region 1312. Each color region has a color that is different from the color of any other color region. In the embodiment shown in FIGS. 28 and 29, for example, first color region 1311 is blue and second color region 1312 is yellow.

Lens structure 1320 is similar to the lens structures discussed above. Lens structure 1320 may include any number of cured toner layers having any thickness, where the thickness of the layers may be selected to provide a particular index of refraction. In the embodiment shown in FIG. 29, lens structure 1320 includes four layers: a first or bottom most layer 1321, a second layer 1324, a third layer 1326, and a fourth or top most layer 1328. In this embodiment, all of the layers have the same, uniform thickness, though in other embodiments, the thickness of any layer and/or the thickness of adjacent layers may vary. Because the layers may be printed on a pixel basis, any lens layer or each lens layer may be so that any particular pixel or set of pixels in the lens layer may have a different index of refraction. In this manner, a lens that has a straight top surface may yield a similar optical effect to the lenticular lens structure discussed above, where different viewing angles result in optically different aesthetic effects.

Similar to the embodiments discussed above, discrete coloring element 1310 is sized and shaped so that a bottom surface of the bottom most layer 1321 of lens structure 1320 has the non-circular shape of and is coextensive with the second side of discrete coloring element 1310. In this embodiment, all layers of lens structure 1320 except top most layer 1328 are coextensive with each other and discrete coloring element 1310. In this embodiment, top most layer 1328 has a smaller top surface due to rounded top corners 1308. In this embodiment, the top corners 1308 of lens structure 1320 are rounded. In some embodiments, the top corners 1308 or free end corners of lens structure 1320 may be rounded to provide a smooth surface to inhibit snagging and potential delamination of the lens structure. In other embodiments, lens structure 1320 may have tapering layers so that the cross-section is a frustopyramidal shape or a frustopyramidal shape with a rounded top, as shown in other embodiments.

Y-shaped optical structures may provide unique optical and aesthetic characteristics. Additionally, as will be recognized by those in the art, optical structures may have the shapes of other letters, which would allow the optical structures to be used to form logos or other words with color-changing features depending on the viewing angle.

As noted above, a printed optical structure with bottom color layer and clear lens layers that provides various optical and aesthetic effects such as apparent color changes depending upon the viewing angle may have any type of planar and cross-sectional shape. As discussed above, the apparent color of the discrete coloring element changes when the discrete coloring element is viewed from different angles due to the index of refraction of the lens structure of the optical structure. For example, in the embodiment shown in FIGS. 30 and 31, a crescent-shaped optical structure 1407 may be attached to a textile 1400, such as by printing in the manner discussed above. Textile 1400 may be any type of textile known in the art that is capable of receiving and supporting an optical structure. As will be recognized by those in the art, textile 1400 may be incorporated into any of the articles discussed above.

Figure 30:
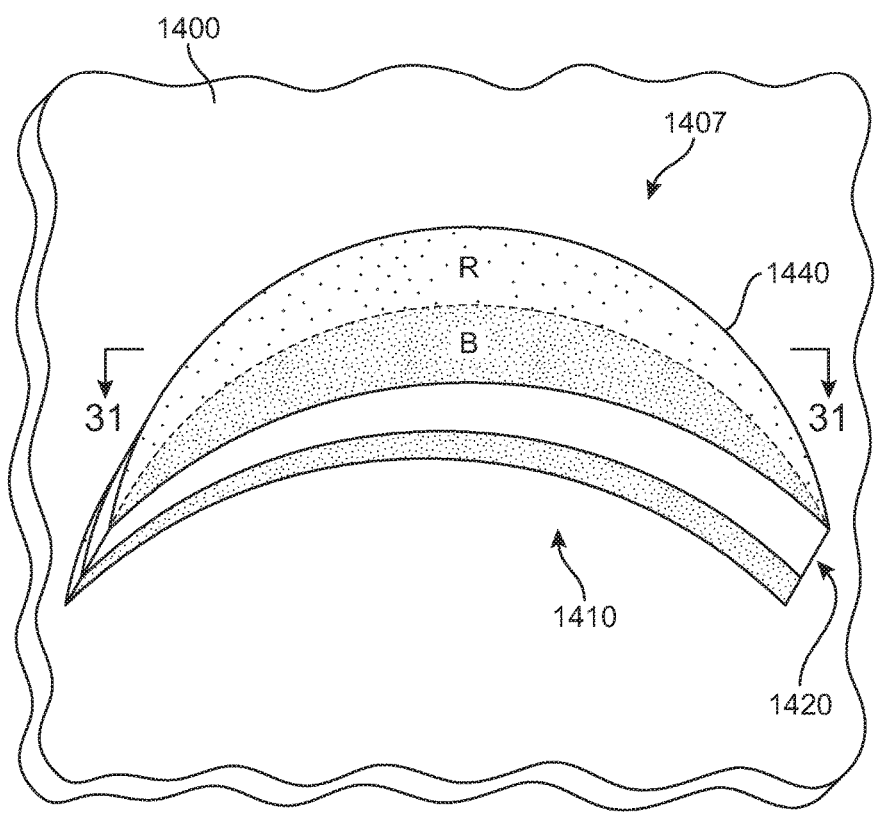
FIG. 30 is a perspective view of a non-circular embodiment of an optical structure, where the optical structure has a crescent moon shape.
Figure 31:
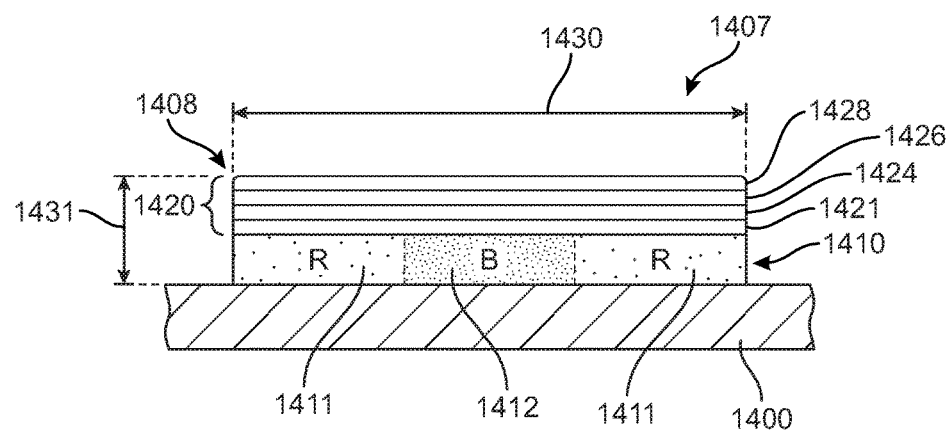
FIG. 31 is a plan cross-sectional view of the optical structure shown in FIG. 30, taken along line 31-31.

In this embodiment, optical structure 1407 is a crescent-shaped prism having a crescent-shaped planar shape as shown in FIG. 30 and defined by a crescent-shaped perimeter 1440. Optical structure 1407 also has a substantially rectangular cross-sectional shape as shown in FIG. 31. While only one crescent-shaped prism is shown, a person of ordinary skill will recognize that a plurality of crescent-shaped prisms may be provided in various patterns on textile 1400.

In this embodiment, optical structure 1407 includes a crescent-shaped discrete coloring element 1410 and a multi-layer crescent-shaped lens structure 1420. Crescent-shaped discrete coloring element 1410 is similar to discrete coloring element 210, discussed above, where a first side of cured ink crescent-shaped discrete coloring element 1410 is positioned adjacent to and in contact with textile 1400 while a second side of crescent-shaped discrete coloring element 1410 is positioned adjacent to and in contact with lens structure 1420. Crescent-shaped discrete coloring element 1410 includes two distinct color regions: a first color region 1411 and a second color region 1412. Each color region has a color that is different from the color of any other color region. In the embodiment shown in FIGS. 30 and 31, for example, first color region 1411 is red and second color region 1412 is blue.

Lens structure 1420 is similar to the lens structures discussed above. Lens structure 1420 may include any number of cured toner layers having any thickness, where the thickness of the layers may be selected to provide a particular index of refraction. In the embodiment shown in FIG. 31, lens structure 1420 includes four layers: a first or bottom most layer 1421, a second layer 1424, a third layer 1426, and a fourth or top most layer 1428. In this embodiment, all of the layers have the same, uniform thickness, though in other embodiments, the thickness of any layer and/or the thickness of adjacent layers may vary. Because the layers may be printed on a pixel basis, any lens layer or each lens layer may be so that any particular pixel or set of pixels in the lens layer may have a different index of refraction. In this manner, a lens that has a straight top surface may yield a similar optical effect to the lenticular lens structure discussed above, where different viewing angles result in optically different aesthetic effects.

Similar to the embodiments discussed above, discrete coloring element 1410 is sized and shaped so that a bottom surface of the bottom most layer 1421 of lens structure 1420 has the non-circular shape of and is coextensive with the second side of discrete coloring element 1410. In this embodiment, all layers of lens structure 1420 except top most layer 1428 are coextensive with each other and discrete coloring element 1410. In this embodiment, top most layer 1428 has a smaller top surface due to rounded top corners 1408. In this embodiment, the top corners 1408 of lens structure 1420 are rounded. In some embodiments, the top corners 1408 or free end corners of lens structure 1420 may be rounded to provide a smooth surface to inhibit snagging and potential delamination of the lens structure. In other embodiments, lens structure 1420 may have tapering layers so that the cross-section is a frustopyramidal shape or a frustopyramidal shape with a rounded top, as shown in other embodiments.

Crescent-shaped optical structures may provide unique optical and aesthetic characteristics as compared with optical structures with the shape of regular polygons. For example, the apparent color changing properties at the points of the crescent may differ from the apparent color changing properties of the other embodiments discussed herein.

As noted above, a printed optical structure with bottom color layer and clear lens layers that provides various optical and aesthetic effects such as apparent color changes depending upon the viewing angle may have any type of planar and cross-sectional shape. As discussed above, the apparent color of the discrete coloring element changes when the discrete coloring element is viewed from different angles due to the index of refraction of the lens structure of the optical structure. For example, in the embodiment shown in FIGS. 32-35, a plurality of rectangular pyramid-shaped optical structures 2450 may be attached to a textile 2400, such as by printing in the manner discussed above. Textile 2400 may be any type of textile known in the art that is capable of receiving and supporting an optical structure. As will be recognized by those in the art, textile 2400 may be incorporated into any of the articles discussed above.

Figure 32:
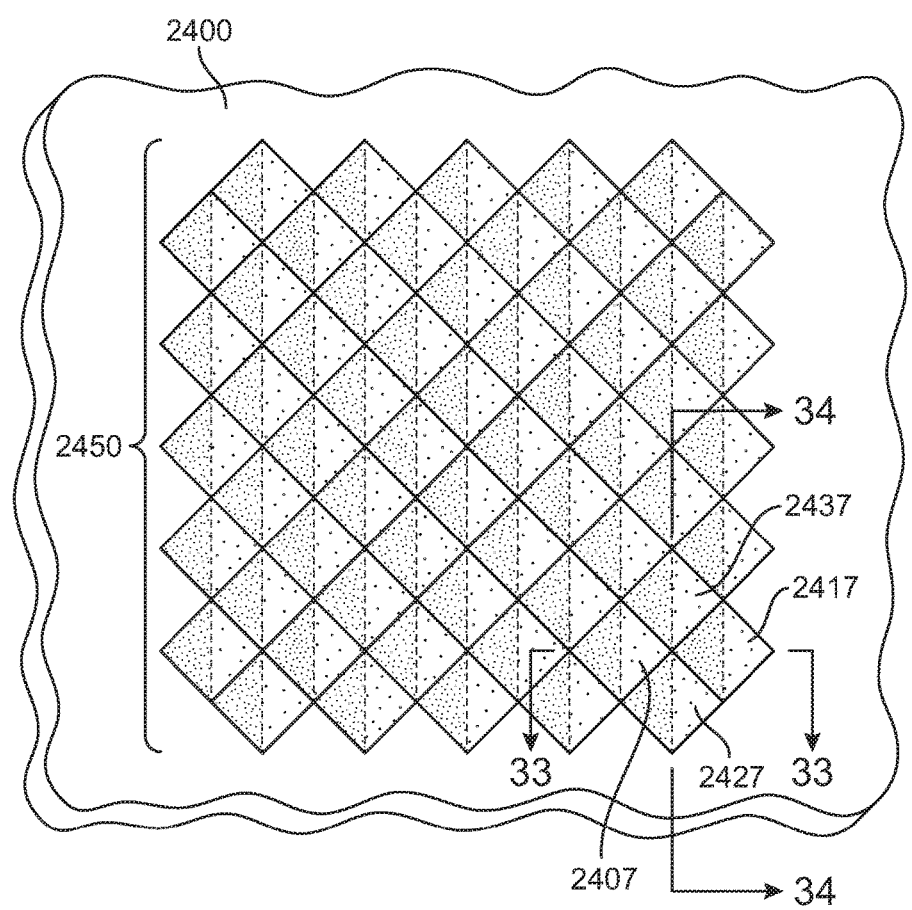
FIG. 32 is a plan view of an embodiment of a textile with a plurality of non-circular optical structures, where each optical structure has a diamond-shape.
Figure 33:
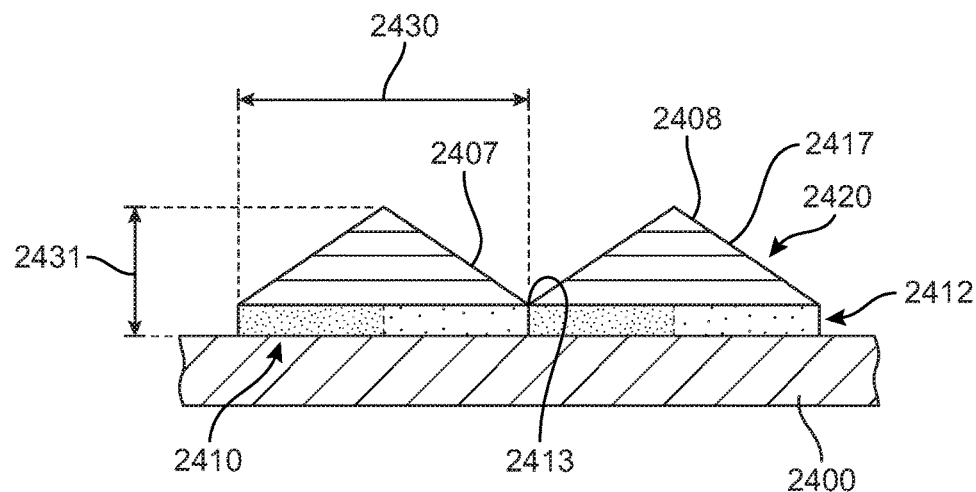
FIG. 33 is a cross-sectional view of a portion of the textile and two optical structures shown in FIG. 32, taken along line 33-33.
Figure 34:
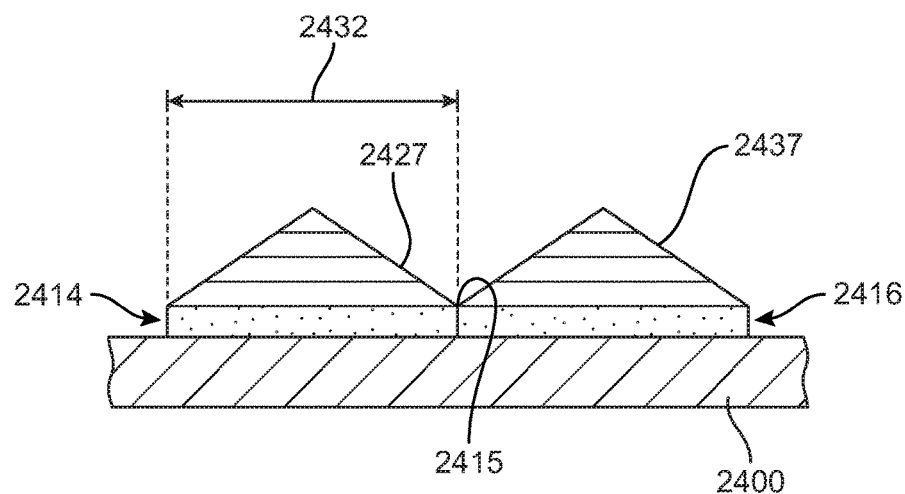
FIG. 34 is a cross-sectional view of another portion of the textile and two optical structures shown in FIG. 32, taken along line 34-34.
Figure 35:
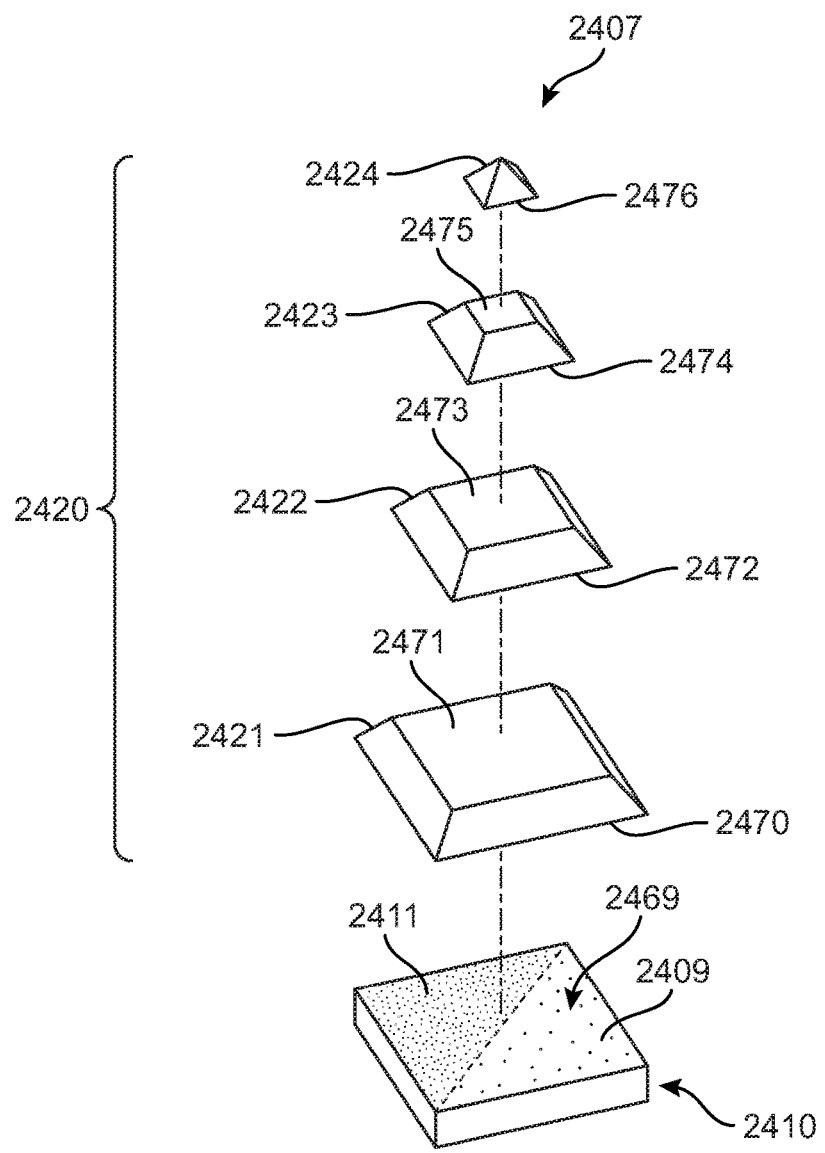
FIG. 35 is an exploded view of an optical structure shown in FIG. 32.

In this embodiment, each optical structure in the plurality of optical structures 2450 such as first structure 2407, second structure 2417, third structure 2427, and fourth structure 2437 is a square pyramid-shaped prism having a square planar shape as shown in FIG. 32. Optical structure 2407 also has a triangular cross-sectional shape as shown in FIGS. 33 and 34.

In this embodiment, each optical structure in plurality of optical structures 2450 includes a square prism discrete coloring element 2410 and a multi-layer square pyramid-shaped lens structure 2420. Square prism discrete coloring element 2410 is similar to discrete coloring element 210, discussed above, where a first side of cured ink square prism discrete coloring element 2410 is positioned adjacent to and in contact with textile 2400 while a second side of square prism discrete coloring element 2410 is positioned adjacent to and in contact with lens structure 2420. Square prism discrete coloring element 2410 includes two distinct color regions: a first color region 2409 and a second color region 2411. Each color region has a color that is different from the color of any other color region. In the embodiment shown in FIGS. 32 and 33, for example, first color region 2409 is red and second color region 2411 is green. In other embodiments, the color regions may have other colors. In the embodiment shown in FIGS. 32-35, each color region includes only one color. In other embodiments, a color region may include sub-regions of different colors to achieve a wider range of optical and aesthetic effects.

Lens structure 2420 is similar to the lens structures discussed above. Lens structure 2420 may include any number of transparent or translucent cured toner layers having any thickness, where the thickness of the layers may be selected to provide a particular index of refraction. In the embodiment shown in FIG. 35, lens structure 2420 includes four layers: a first or bottom most layer 2421, a second layer 2422, a third layer 2423, and a fourth or top most layer 2424. In this embodiment, all of the layers have the same, uniform thickness except for fourth layer 2424, though in other embodiments, the thickness of any layer and/or the thickness of adjacent layers may vary. Because the layers may be printed on a pixel basis, any lens layer or each lens layer may be so that any particular pixel or set of pixels in the lens layer may have a different index of refraction. In this embodiment, each lens layer has a slightly different shape from the other layers, as the pyramid tapers from a square to a point.

Similar to the embodiments discussed above, discrete coloring element 2410 is sized and shaped so that a bottom surface 2470 of the bottom most layer 2421 of lens structure 2420 has the non-circular shape of and is coextensive with a second side 2469 of discrete coloring element 2410. Because of the tapering shape of lens structure 2420, each layer has a similarly coordinated size with the adjacent layers. For example, in this embodiment, first layer 2421 includes a first upper surface 2471 that is the same size and shape of a second bottom surface 2472 of second layer 2422 so that first upper surface 2471 is coextensive with second bottom surface 2472. Similarly, a second top surface 2473 of second layer 2422 is the same size and shape as a third bottom surface 2474 of third layer 2423 so that second top surface 2473 is coextensive with third bottom surface 2474. Similarly, a third top surface 2475 of third layer 2423 is the same size and shape as a fourth bottom surface 2476 of fourth layer 2424 so that third top surface 2475 is coextensive with fourth bottom surface 2476. These matching and coextensive surfaces provide a smooth outer surface to lens structure 2420. In other embodiments, these mating surfaces may not be coextensive, which would yield a stepped outer surface for lens structure 2420.

Square pyramid prism-shaped optical structures may provide unique optical and aesthetic characteristics. For example, the lensing effect created by the pointed pyramid may provide sharper contrast in the color changing properties than in the flat surface optical structures discussed in FIGS. 24-25. Additionally, the square pyramid prism shaped optical structures may be densely packed on a textile as shown in FIG. 32, though each prism is separate and distinct from the other prisms in plurality of optical structures 2450. This may provide structural characteristics such as abrasion resistance and stiffness in selected degrees of motion while allowing freedom of movement and relative movement in other degrees of motion, which may be desirable for uses such as elbow protection. Finally, the points on square pyramid prisms may provide a unique topography and texture to the textile. Such a texture may assist in ball control on an article of footwear or may impart aerodynamic properties to an article of clothing.

As noted above, a printed optical structure with bottom color layer and clear lens layers that provides various optical and aesthetic effects such as apparent color changes depending upon the viewing angle may have any type of planar and cross-sectional shape. As discussed above, the apparent color of the discrete coloring element changes when the discrete coloring element is viewed from different angles due to the index of refraction of the lens structure of the optical structure. For example, in the embodiment shown in FIGS. 36-39, a plurality of arcuate optical structures 2850 may be attached to a textile 2800, such as by printing in the manner discussed above. Textile 2800 may be any type of textile known in the art that is capable of receiving and supporting an optical structure. As will be recognized by those in the art, textile 2800 may be incorporated into any of the articles discussed above.

Figure 36:
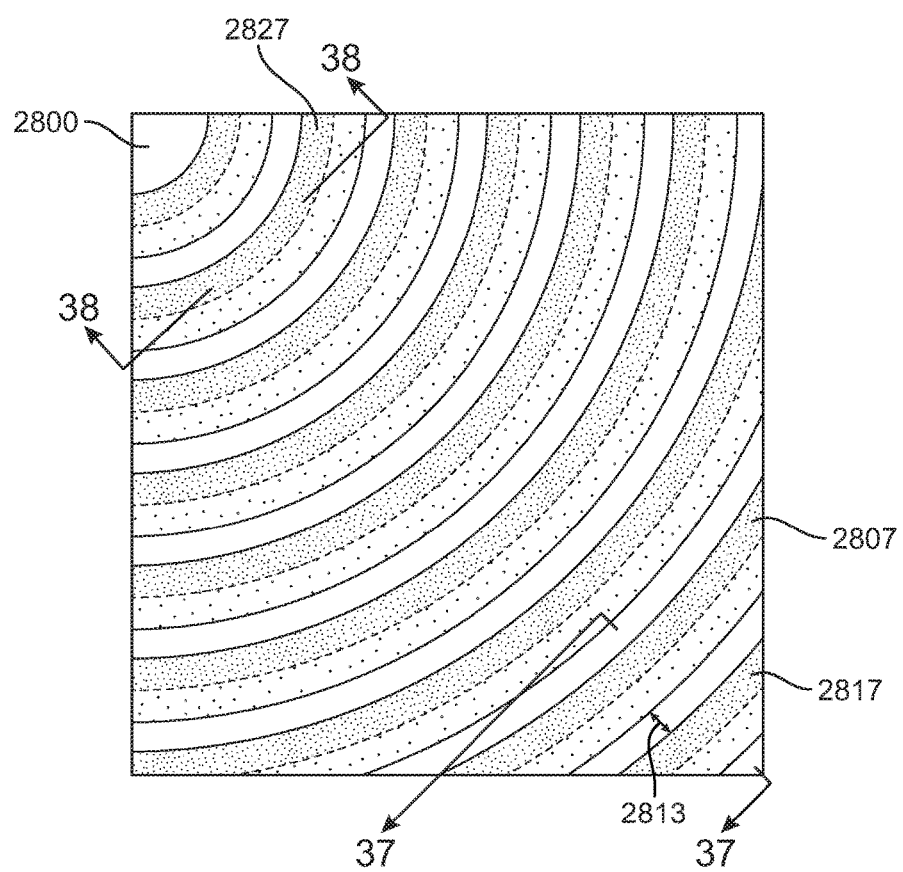
FIG. 36 is a plan view of an embodiment of a textile with a plurality of non-circular optical structures, where each optical structure has a arcuate shape.
Figure 37:
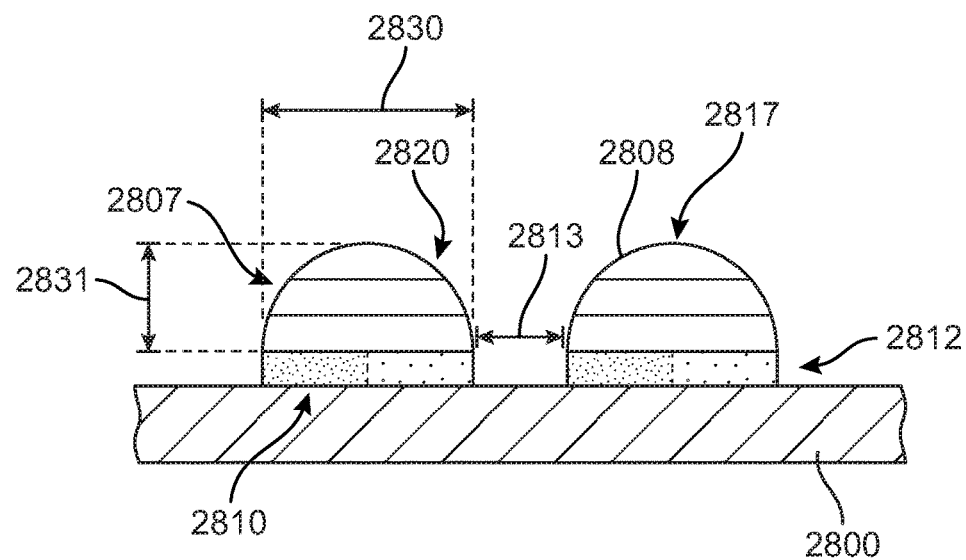
FIG. 37 is a cross-sectional view of a portion of the textile and two optical structures shown in FIG. 36, taken along line 37-37.

In this embodiment, each optical structure in the plurality of optical structures 2850 such as first structure 2807, second structure 2817, and third structure 2827 is an elongated elliptical prism having a arcuate planar shape as shown in FIG. 36. Optical structure 2807 also has a semi-elliptical or dome lateral cross-sectional shape as shown in FIG. 37 and an elongated semi-elliptical longitudinal cross-sectional shape and 38. In this embodiment, each arcuate optical structure is separated from a neighboring arcuate structure by a distance, such as a spacing distance 2813 between first optical structure 2807 and second optical structure 2817. In this embodiment, the spacing between optical structures is even, with spacing distance 2813 establishing a concentric arcuate pattern. In other embodiments, the spacing between any two neighboring optical structures may vary. Spacing distance 2813 may be selected based on any number of factors, such as aesthetics, imparted stiffness to textile 2800, permeability of textile 2800, and/or combinations of these and other aesthetic and performance considerations.

Figure 38:
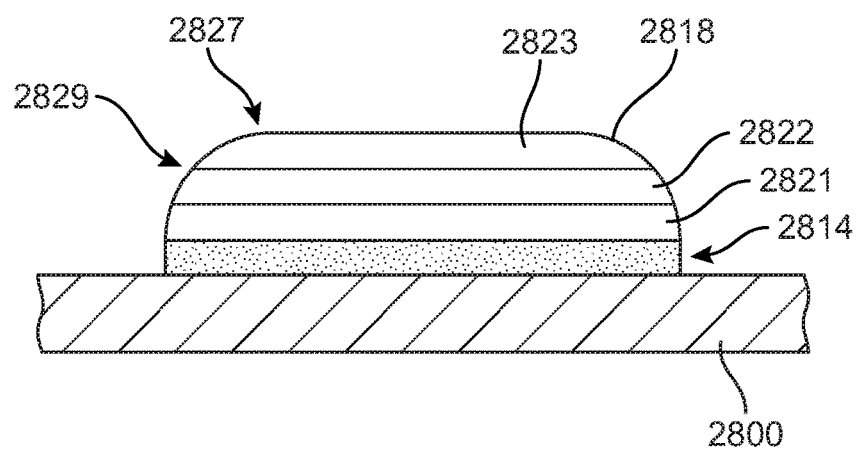
FIG. 38 is a cross-sectional view of a portion of the textile and two optical structures shown in FIG. 36, taken along line 38-38.
Figure 39:
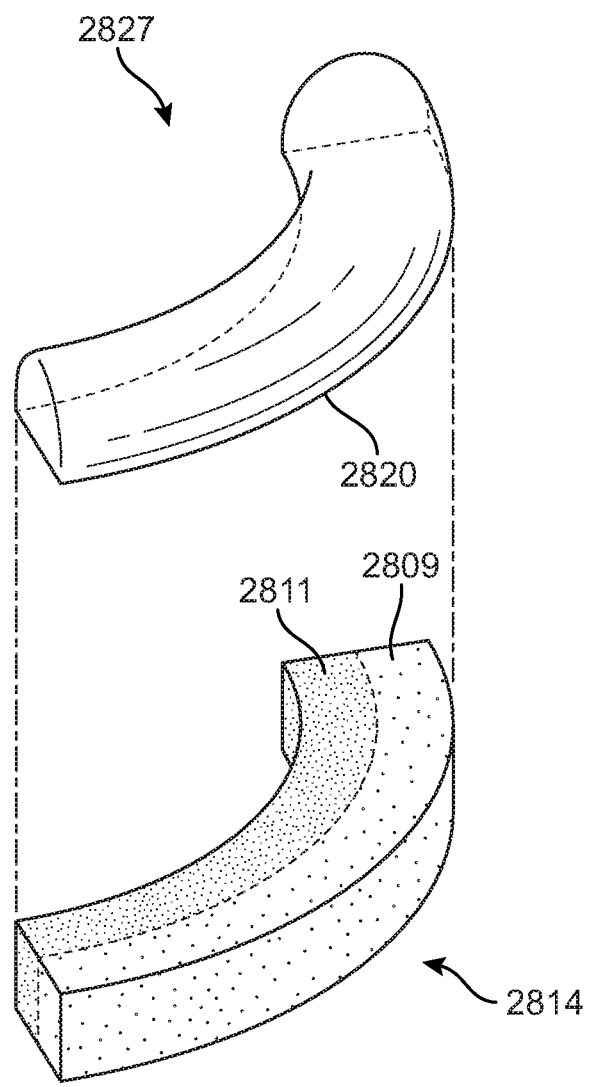
FIG. 39 is an exploded view of an optical structure shown in FIG. 36.

In this embodiment, each optical structure in plurality of optical structures 2850 includes an arcuate prism discrete coloring element such as first arcuate prism discrete coloring element 2810 associated with first structure 2807, second arcuate prism discrete coloring element 2812 associated with second structure 2817, and third arcuate prism discrete coloring element 2814 associated with third structure 2827. Each optical structure also includes a multi-layer semi-elliptical or dome-shaped lens structure like dome lens 2820 associated with first structure 2807. For example, as shown in FIG. 37, second optical structure 2817 has a lateral dome shape defined by perimeter 2808. As shown in FIG. 38, third optical structure 2827 has a longitudinal elongated dome shape defined by second perimeter 2818. Second perimeter 2818 has a flattened top but rounded edges like edge 2829.

Arcuate prism discrete coloring elements 2810, 2812, and 2814 are similar to discrete coloring element 210, discussed above, where a first side of cured ink arcuate prism discrete coloring element 2810 is positioned adjacent to and in contact with textile 2800 while a second side of arcuate prism discrete coloring element 2810 is positioned adjacent to and in contact with lens structure 2820. Arcuate prism discrete coloring element 2810 includes two distinct color regions: a first color region 2809 and a second color region 2811. Each color region has a color that is different from the color of any other color region. In the embodiment shown in FIGS. 36-39, for example, first color region 2809 is red and second color region 2811 is green (shown best in FIG. 39). In other embodiments, the color regions may have other colors. In the embodiment shown in FIGS. 36-39, each color region includes only one color. In other embodiments, a color region may include sub-regions of different colors to achieve a wider range of optical and aesthetic effects.

Lens structure 2820 is similar to the lens structures discussed above. Lens structure 2820 may include any number of transparent or translucent cured toner layers having any thickness, where the thickness of the layers may be selected to provide a particular index of refraction. In the embodiment shown in FIGS. 37 and 38, lens structure 2820 includes three layers: a first or bottom most layer 2821, a second layer 2822, and a third or top most layer 2823. In this embodiment, all of the layers have the same, uniform thickness except for fourth layer 2828, though in other embodiments, the thickness of any layer and/or the thickness of adjacent layers may vary. Because the layers may be printed on a pixel basis, any lens layer or each lens layer may be so that any particular pixel or set of pixels in the lens layer may have a different index of refraction. In this embodiment, each lens layer has a slightly different shape from the other layers, as the pyramid tapers from a square to a point.

Similar to the embodiments discussed above, discrete coloring element 2810 is sized and shaped so that a bottom surface of the bottom most layer 2821 of lens structure 2820 has the non-circular shape of and is coextensive with a second side of discrete coloring element 2810. Because of the tapering, domed shape of lens structure 2820 in lateral cross-section and the elongated tapering domed shape of lens structure 2820 in longitudinal cross-section, each layer has a similarly coordinated size with the adjacent layers. These matching and coextensive surfaces provide a smooth outer surface to lens structure 2820. In other embodiments, these mating surfaces may not be coextensive, which would yield a stepped outer surface for lens structure 2820.

In this embodiment, each arcuate optical structure has a lateral dome width 2830 and a structure dome height 2831. While lateral dome width 2830 and structure dome height 2831 may be any distance, in some embodiments, the ratio of lateral dome width 2830 and structure dome height 2831 may be constrained to being selected from the range of 1:2 to 2:1. Such a ratio range of width to height may maximize the optical effects of a lens structure 2820 and may minimize delamination of the optical structure or separation of the optical structures from textile 2800. This ratio may be used in any of the embodiments discussed herein for either the lateral width or longitudinal length of the optical structure to the height of the optical structure.

Arcuate prism-shaped optical structures may provide unique optical and aesthetic characteristics. For example, the continuous curvature of the arcuate structures may yield blending of the color changing properties. Additionally, the arcuate prism-shaped optical structures may be loosely packed on a textile as shown in FIG. 36. This may provide structural characteristics such as abrasion resistance and stiffness in selected degrees of motion while allowing freedom of movement and relative movement in other degrees of motion, which may be desirable for uses such as elbow or shoulder protection, where the article may stretch to accommodate a physiology but remain in place against the physiology while in use. Finally, the domed upper surfaces of the arcuate prisms may provide a unique topography and texture to the textile. Such a texture may impart aerodynamic properties to an article of clothing.

As noted above, a printed optical structure with bottom color layer and clear lens layers that provides various optical and aesthetic effects such as apparent color changes depending upon the viewing angle may have any type of planar and cross-sectional shape. As discussed above, the apparent color of the discrete coloring element changes when the discrete coloring element is viewed from different angles due to the index of refraction of the lens structure of the optical structure. For example, in the embodiment shown in FIGS. 40-42, a plurality of linear optical structures 3250 may be attached to a textile 3200 in the manner discussed above. Textile 3200 may be any type of textile known in the art that is capable of receiving and supporting an optical structure. As will be recognized by those in the art, textile 3200 may be incorporated into any of the articles discussed above.

Figure 40:
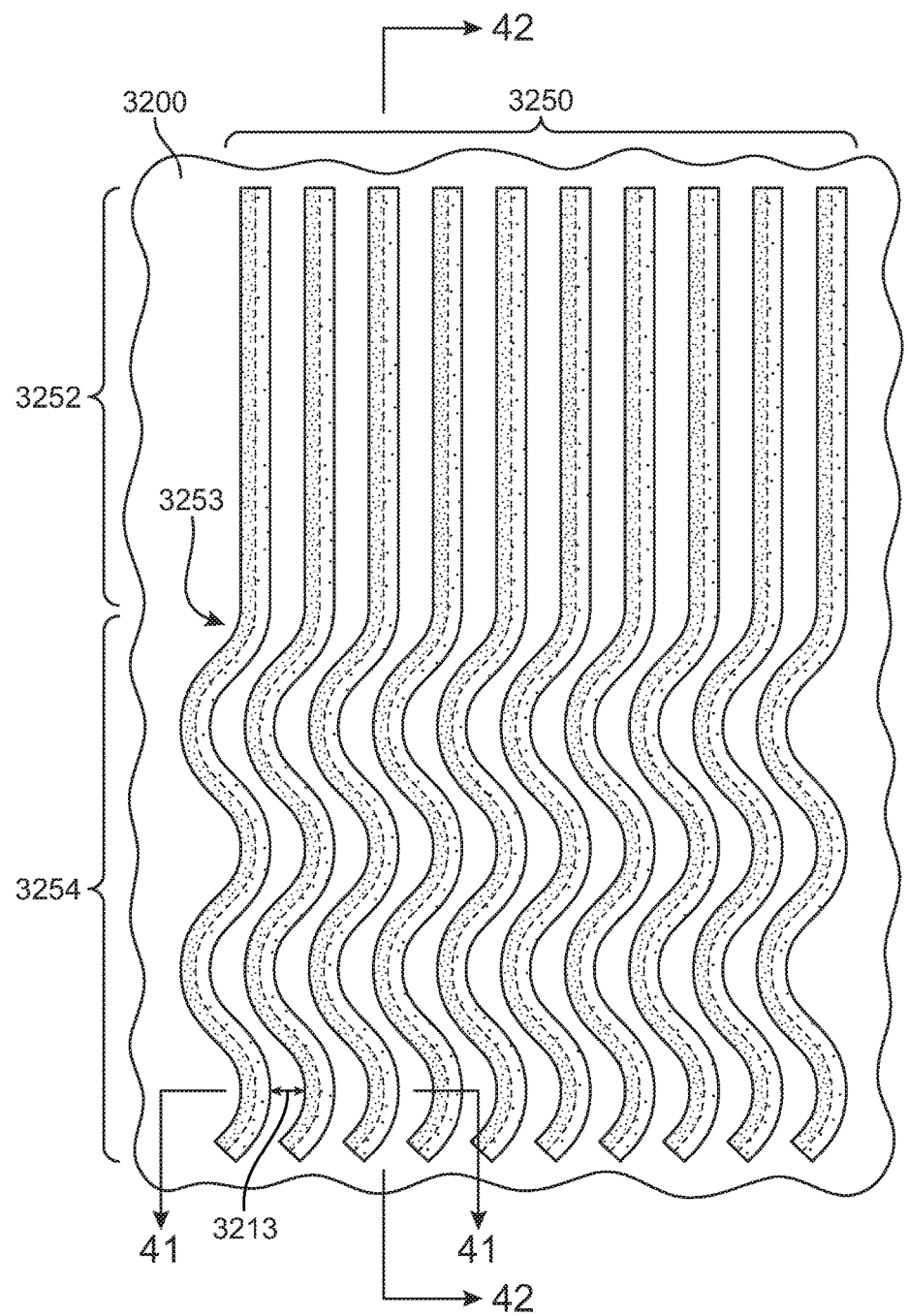
FIG. 40 is a plan view of an embodiment of a textile with a plurality of non-circular optical structures, where each optical structure has a linear shape, where part of the linear shape is straight and part of the linear shape is wavy.
Figure 41:
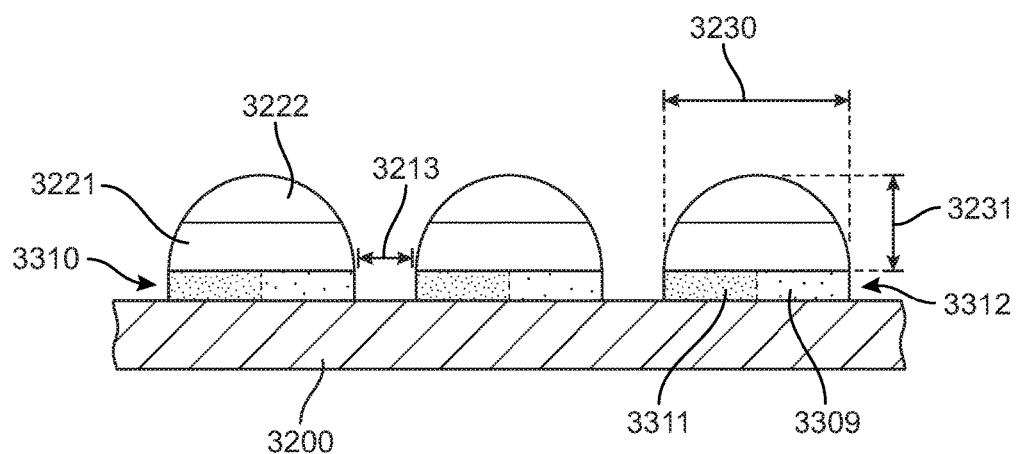
FIG. 41 is a cross-sectional view of a portion of the textile and three optical structures of FIG. 40 taken along line 41-41.
Figure 42:
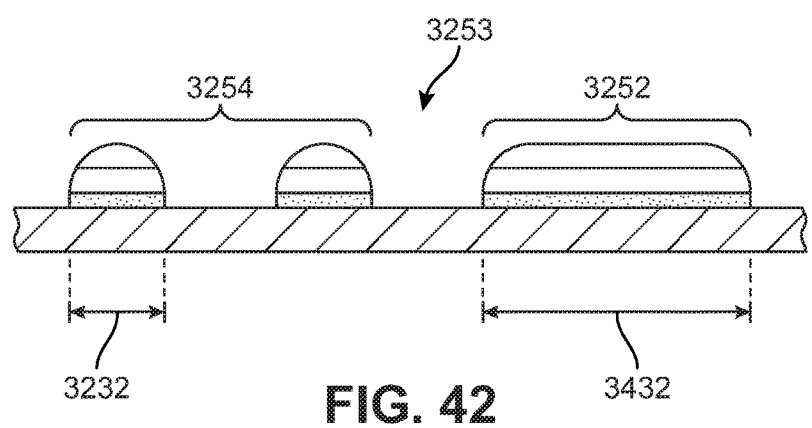
FIG. 42 is a cross-sectional view of another portion of the textile an one optical structure of FIG. 40, taken along line 42-42.

In this embodiment, each optical structure in the plurality of optical structures 3250, such as first linear structure 3207, second linear structure 3217, and third linear structure 3227, includes an elongated elliptical prism having a linear planar shape as shown in FIG. 40. The linear optical structures may include straight portions 3252 and wavy portions 3254. The linear optical structures may extend straight across textile 3200 then shift to a wavy line at point 3253. Each optical structure in the plurality of linear optical structures 3250 also has a semi-elliptical or dome lateral cross-sectional shape as shown in FIG. 41 and an elongated semi-elliptical longitudinal cross-sectional shape and 42. In this embodiment, each linear optical structure is separated from a neighboring linear structure by a distance, such as a spacing distance 3213. In this embodiment, the spacing between optical structures is even, with spacing distance 3213 establishing a parallel linear pattern with straight portions 3252 and a concentric pattern between wavy portions 3254. In other embodiments, the spacing between neighboring optical structures may vary. Spacing distance 3213 may be selected based on any number of factors, such as aesthetics, imparted stiffness to textile 3200, permeability of textile 3200, and/or combinations of these and other aesthetic and performance considerations.

In this embodiment, each optical structure in plurality of optical structures 3250 includes a linear prism discrete coloring element such as first linear prism discrete coloring element 3310 associated with first linear structure 3207 and second linear prism discrete coloring element 3312 associated with third structure 3227. Each optical structure also includes a multi-layer semi-elliptical or dome-shaped lens structure like dome lens 3220 associated with first linear structure 3207.

Linear prism discrete coloring elements 3310 and 3312 are similar to discrete coloring element 210, discussed above, where a first side of cured ink linear prism discrete coloring element 3310 is positioned adjacent to and in contact with textile 3200 while a second side of linear prism discrete coloring element 3310 is positioned adjacent to and in contact with lens structure 3220. Each linear prism discrete coloring element may include two distinct color regions: a first color region 3309 and a second color region 3311. Each color region has a color that is different from the color of any other color region. In the embodiment shown in FIGS. 40-42, for example, first color region 3309 is red and second color region 3311 is green (shown best in FIG. 41). In other embodiments, the color regions may have other colors. In the embodiment shown in FIGS. 40-42, each color region includes only one color. In other embodiments, a color region may include sub-regions of different colors to achieve a wider range of optical and aesthetic effects.

Lens structure 3220 is similar to the lens structures discussed above. Lens structure 3220 may include any number of transparent or translucent cured toner layers having any thickness, where the thickness of the layers may be selected to provide a particular index of refraction. In the embodiment shown in FIGS. 41 and 42, lens structure 3220 includes two layers: a first or bottom most layer 3321 and a second or top most layer 3322. In this embodiment, all of the layers have the same, uniform thickness, though in other embodiments, the thickness of any layer and/or the thickness of adjacent layers may vary. Because the layers may be printed on a pixel basis, any lens layer or each lens layer may be so that any particular pixel or set of pixels in the lens layer may have a different index of refraction. In this embodiment, each lens layer has a slightly different shape from the other layers, as the pyramid tapers from a square to a point.

Similar to the embodiments discussed above, discrete coloring element 3310 is sized and shaped so that a bottom surface of the bottom most layer 3321 of lens structure 3220 has the non-circular shape of and is coextensive with a second side of discrete coloring element 3310. Because of the tapering, domed shape of lens structure 3220 in lateral cross-section and the elongated tapering domed shape of lens structure 3220 in longitudinal cross-section, each layer has a similarly coordinated size with the adjacent layers. These matching and coextensive surfaces provide a smooth outer surface to lens structure 3220. In other embodiments, these mating surfaces may not be coextensive, which would yield a stepped outer surface for lens structure 3220.

In this embodiment, each linear optical structure has a lateral dome width 3230 and a structure dome height 3231. While lateral dome width 3230 and structure dome height 3231 may be any distance, in some embodiments, the ratio of lateral dome width 3230 and structure dome height 3231 may be constrained to being selected from the range of 1:2 to 2:1. Such a ratio range of width to height may maximize the optical effects of a lens structure 3220 and may minimize delamination of the optical structure or separation of the optical structures from textile 3200. This ratio may be used in any of the embodiments discussed herein for either the lateral width or longitudinal length of the optical structure to the height of the optical structure.

Linear prism optical structures may provide unique optical and aesthetic characteristics. For example, the change from straight to wavy lines may yield a greater number of possible viewing angles and corresponding color changes than would straight lines or wavy lines alone. Additionally, the linear prism optical structures may be loosely packed on a textile as shown in FIG. 40. This may provide structural characteristics such as abrasion resistance and stiffness in selected degrees of motion while allowing freedom of movement and relative movement in other degrees of motion. Additionally, the shift from straight lines to wavy lines may more finely tune the altered stiffness and/or abrasion resistance as the lines may extend across different regions of an article. For example, a chest area may benefit from straight lines while a shoulder area may benefit from wavy lines. Finally, the domed upper surfaces of the arcuate prisms may provide a unique topography and texture to the textile. Such a texture may impart aerodynamic properties to an article of clothing, which properties may shift when the lines change from straight lines to wavy lines.

Figure 43:
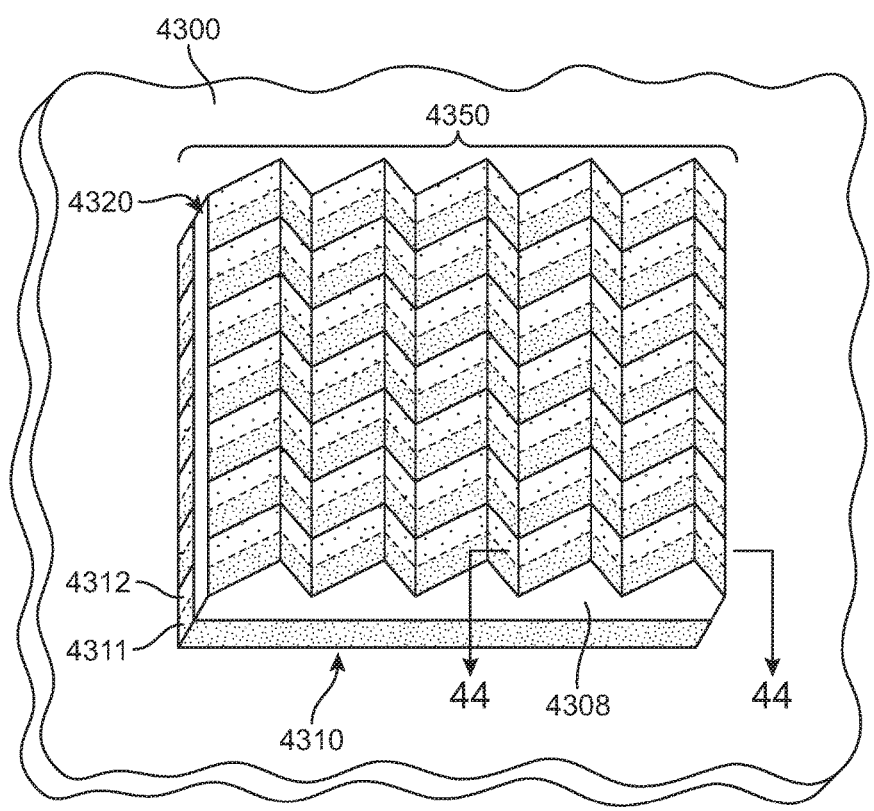
FIG. 43 is a perspective view of an embodiment of a textile with a non-circular optical structure, where the non-circular optical structure has a corrugated topography.
Figure 44:
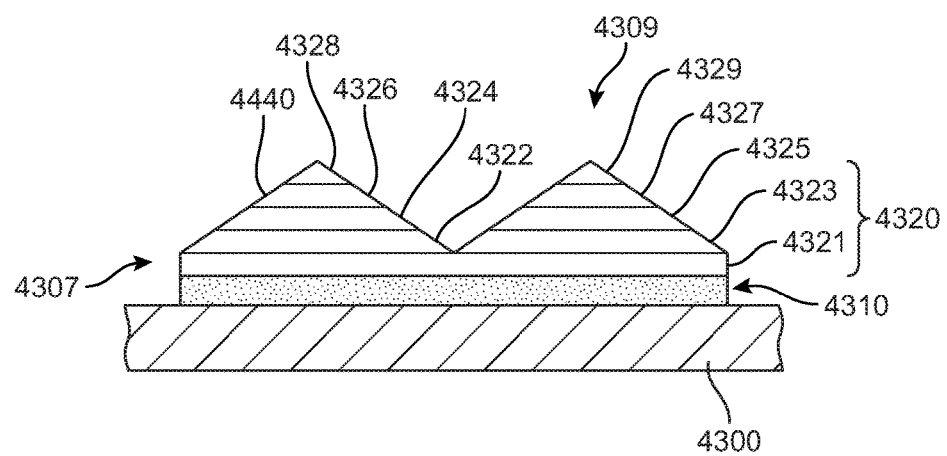
FIG. 44 is a cross-sectional view of a portion of the textile and optical structure shown in FIG. 43, taken along line 44-44.

As noted above, a printed optical structure with bottom color layer and clear lens layers that provides various optical and aesthetic effects such as apparent color changes depending upon the viewing angle may have any type of planar and cross-sectional shape. As discussed above, the apparent color of the discrete coloring element changes when the discrete coloring element is viewed from different angles due to the index of refraction of the lens structure of the optical structure. For example, in the embodiment shown in FIGS. 43-44, an optical structure 4308 including a corrugated upper surface 4350 may be attached to a textile 4300 in the manner discussed above. Textile 4300 may be any type of textile known in the art that is capable of receiving and supporting an optical structure. As will be recognized by those in the art, textile 4300 may be incorporated into any of the articles discussed above.

In this embodiment, optical structure 4308 includes a discrete coloring element 4310 and a corrugated lens structure 4320. The upper surface of corrugated lens structure 4320 may appear to be made from a plurality of individual optical structures. Optical structure 4308 with corrugated lens structure 4320 has a prismatic shape that is rectangular proximate discrete coloring element 4310 and corrugated distal from discrete coloring element 4310 to follow the topography of corrugated lens structure 4320. As a solid structure, optical structure 4308 may cover a relatively large area of textile 4300, such as an entire elbow or heel region, or a relatively small area of textile 4300, such as a few woven or knitted rows. If a relatively small area, then multiple corrugated optical structures may be provided adjacent to each other.

In this embodiment, optical structure 4308 includes a single rectangular prism discrete coloring element such as first rectangular prism discrete coloring element 4310 that extends entirely beneath corrugated lens structure 4320. Rectangular prism discrete coloring element 4310 is similar to discrete coloring element 210, discussed above, where a first side of cured ink rectangular prism discrete coloring element 4310 is positioned adjacent to and in contact with textile 4300 while a second side of rectangular prism discrete coloring element 4310 is positioned adjacent to and in contact with corrugated lens structure 4320. Rectangular prism discrete coloring element 4310 may include two distinct color regions that align with each corrugation of corrugated lens structure 4320: a first color region 4311 and a second color region 4312. This pattern of alternating color regions extends over the entirety of rectangular prism discrete coloring element 4310. Each color region has a color that is different from the color of any other color region. In the embodiment shown in FIGS. 43-44, for example, first color region 4311 is green and second color region 4312 is red (shown best in FIG. 41). In other embodiments, the color regions may have other colors. In the embodiment shown in FIGS. 43-44, each color region includes only one color. In other embodiments, a color region may include sub-regions of different colors to achieve a wider range of optical and aesthetic effects.

Lens structure 4320 is similar to the lens structures discussed above. Lens structure 4320 may include any number of transparent or translucent cured toner layers having any thickness, where the thickness of the layers may be selected to provide a particular index of refraction. In the embodiment shown in FIG. 43, lens structure 4320 includes five layers for each corrugation, such as first corrugation 4307 and second corrugation 4309. Lens structure 4320 includes a first or bottom most layer 4321 that is coextensive with discrete coloring element 4310 and is common to all corrugations. At a second layer or greater, the layers separate to form the individual corrugations, though all corrugations remain connected at first layer 431. For first corrugation 4307, a second layer 3422, a third layer 3424, a fourth layer 4326, and a fifth or top most layer 4328 are provided in a tapering, triangular cross-sectional fashion similar to optical structure 2407 as discussed above. For second corrugation 4309, a second layer 4323, a third layer 4325, a fourth layer 4327, and a fifth or top most layer 4329 in an identical or nearly identical fashion as for first corrugation 4307. In this embodiment, all of the layers have the same, uniform thickness, though in other embodiments, the thickness of any layer and/or the thickness of adjacent layers may vary. Because the layers may be printed on a pixel basis, any lens layer or each lens layer may be so that any particular pixel or set of pixels in the lens layer may have a different index of refraction. In this embodiment, each lens layer has a slightly different shape from the other layers, as the pyramid tapers from a square to a point.

Similar to the embodiments discussed above, discrete coloring element 4310 is sized and shaped so that a bottom surface of the bottom most layer 4321 of lens structure 4320 has the non-circular shape of and is coextensive with a second side of discrete coloring element 4310. Because of the tapering, triangular shape of lens structure 4320 in lateral cross-section as defined by perimeter 4440, each layer has a similarly coordinated size with the adjacent layers. These matching and coextensive surfaces provide a smooth outer surface to lens structure 4320. In other embodiments, these mating surfaces may not be coextensive, which would yield a stepped outer surface for lens structure 4320.

Corrugated optical structures like optical structure 4308 may provide unique optical effects with the plurality of corrugations providing many surface angle changes over a small area. As the color changing properties of the optical structure shift with viewing angle, the surface angle changes can enhance the viewing angle differences.

As noted above, a printed optical structure with bottom color layer and clear lens layers that provides various optical and aesthetic effects such as apparent color changes depending upon the viewing angle may have any type of planar and cross-sectional shape. As discussed above, the apparent color of the discrete coloring element changes when the discrete coloring element is viewed from different angles due to the index of refraction of the lens structure of the optical structure. For example, in the embodiment shown in FIGS. 45-46, a plurality of ellipsoid-shaped optical structures 4550 may be attached to a textile 4500, such as by printing in the manner discussed above. Textile 4500 may be any type of textile known in the art that is capable of receiving and supporting an optical structure. As will be recognized by those in the art, textile 4500 may be incorporated into any of the articles discussed above.

Figure 45:
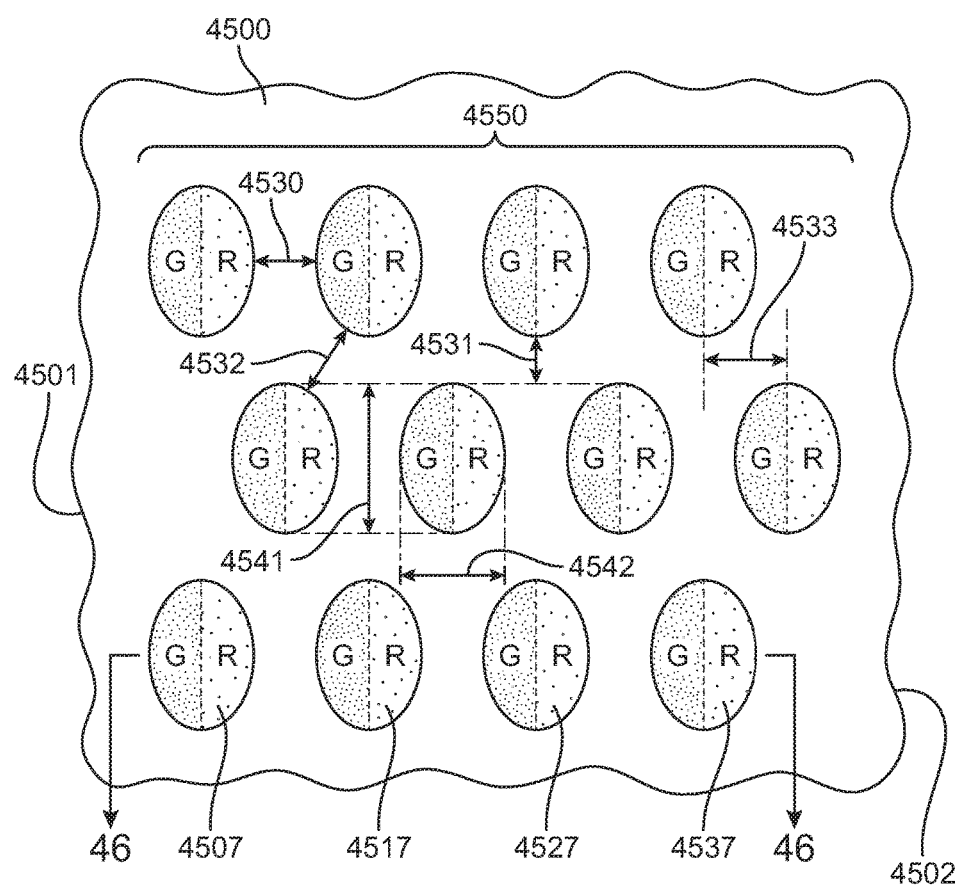
FIG. 45 is a plan view of an embodiment of a textile with a plurality of non-circular optical structures, where each optical structure has a semi-ellipsoid shape.
Figure 46:
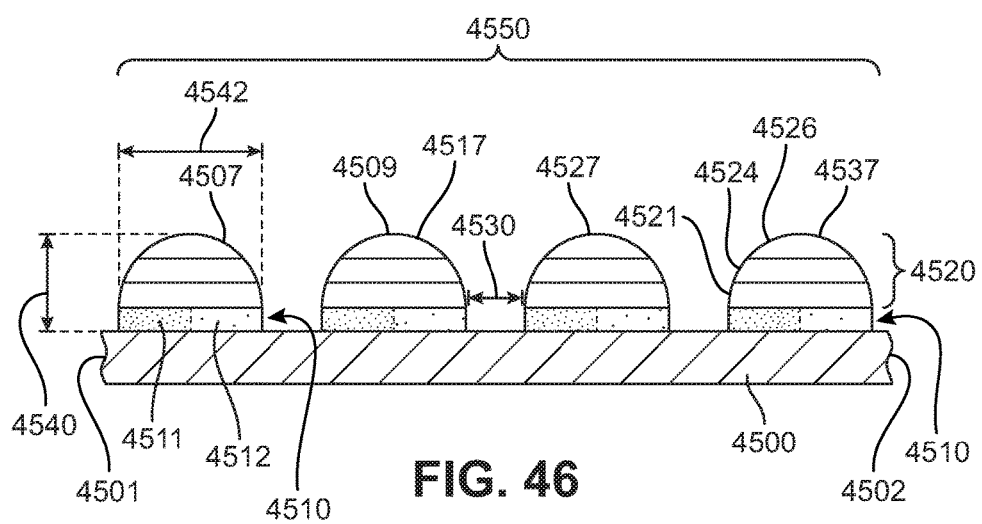
FIG. 46 is a cross-sectional view of a portion of the textile and four optical structures of FIG. 45, taken along line 46-46.

In this embodiment, each optical structure in the plurality of optical structures 4550 such as first ovoid structure 4507, second ovoid structure 4517, third ovoid structure 4527, and fourth ovoid structure 4537 is an ovoid-shaped prism having an oval planar shape as shown in FIG. 45. Each optical structure also has an ellipsoid or domed cross-sectional shape as shown in FIG. 46. Plurality of ovoid structures 4550 are arranged on textile 4500 in a pattern, such as the regular distribution of rows shown in FIG. 45. Neighboring structures within a row are separated by a first distance 4530. Rows are separated by a second distance 4531. The structures in adjacent rows may be offset from each other by an offset distance 4533 so that neighboring row structures are separated by a row distance 4532. Such an offset may allow for more dense packing of the ovoid structures than aligned rows.

In some embodiments, such as the embodiment shown in FIG. 45, plurality of optical structures 4550 extends entirely across textile 4500, from a first edge 4501 to a second edge 4502. In other embodiments only selected portions of textile 4500 may include plurality of optical structures 4550.

In this embodiment, each optical structure in plurality of optical structures 4550 includes an ellipsoidal prism discrete coloring element 4510 and a multi-layer square pyramid-shaped lens structure 4520. Ellipsoidal prism discrete coloring element 4510 is similar to discrete coloring element 210, discussed above, where a first side of cured ink ellipsoidal prism discrete coloring element 4510 is positioned adjacent to and in contact with textile 4500 while a second side of ellipsoidal prism discrete coloring element 4510 is positioned adjacent to and in contact with lens structure 4520. Ellipsoidal prism discrete coloring element 4510 includes two distinct color regions: a first color region 4509 and a second color region 4511. Each color region has a color that is different from the color of any other color region. In the embodiment shown in FIGS. 45 and 46, for example, first color region 4511 is green and second color region 4512 is red. In other embodiments, the color regions may have other colors. In the embodiment shown in FIGS. 45 and 46, each color region includes only one color. In other embodiments, a color region may include sub-regions of different colors to achieve a wider range of optical and aesthetic effects.

Lens structure 4520 is similar to the lens structures discussed above. Lens structure 4520 may include any number of transparent or translucent cured toner layers having any thickness, where the thickness of the layers may be selected to provide a particular index of refraction. In the embodiment shown in FIG. 35, lens structure 4520 includes three layers: a first or bottom most layer 4521, a second layer 4524, and a third or top most layer 4526. In this embodiment, all of the layers have the same, uniform thickness, though in other embodiments, the thickness of any layer and/or the thickness of adjacent layers may vary. Because the layers may be printed on a pixel basis, any lens layer or each lens layer may be so that any particular pixel or set of pixels in the lens layer may have a different index of refraction. In this embodiment, each lens layer has a slightly different shape from the other layers, as the pyramid tapers from a square to a point.

Similar to the embodiments discussed above, discrete coloring element 4510 is sized and shaped so that a bottom surface of bottom most layer 4521 of lens structure 4520 has the non-circular shape of and is coextensive with a second side of discrete coloring element 4510. Because of the tapering shape of lens structure 4520, each layer has a similarly coordinated size with the adjacent layers. These matching and coextensive surfaces provide a smooth outer surface to lens structure 4520. In other embodiments, these mating surfaces may not be coextensive, which would yield a stepped outer surface for lens structure 4520.

Ovoid-shaped optical structures may provide unique optical and aesthetic characteristics. The shape may provide an intense lensing effect, particularly at the poles of the shape. These optical structures may be densely packed on a textile as shown in FIG. 45, though each prism is separate and distinct from the other prisms in plurality of optical structures 4550. This may provide structural characteristics such as abrasion resistance and stiffness in selected degrees of motion while allowing freedom of movement and relative movement in other degrees of motion, which may be desirable for uses such as elbow or knee protection. Finally, the smooth, rounded surfaces of the optical structures may provide a unique topography and texture to the textile. Such a texture may impart aerodynamic properties to an article of clothing.

In this embodiment, each ovoid optical structure has a dome width 4542, a dome length 4541, and a structure dome height 4540. While dome width 4542, dome length 4531, and structure dome height 4540 may be any distance, in some embodiments, the ratio of dome width 4542 and/or dome length 4531 to structure dome height 4540 may be constrained to being selected from the range of 1:2 to 2:1. Such a ratio range of width to height may maximize the optical effects of lens structure 4520 and may minimize delamination of the optical structure or separation of the optical structures from textile 4500. This ratio may be used in any of the embodiments discussed herein for either the lateral width or longitudinal length of the optical structure to the height of the optical structure.

As noted above, a printed optical structure with bottom color layer and clear lens layers that provides various optical and aesthetic effects such as apparent color changes depending upon the viewing angle may have any type of planar and cross-sectional shape. As discussed above, the apparent color of the discrete coloring element changes when the discrete coloring element is viewed from different angles due to the index of refraction of the lens structure of the optical structure. For example, in the embodiment shown in FIGS. 47-48, a plurality of triangular prism-shaped optical structures 4750 may be attached to a textile 4700, such as by printing in the manner discussed above. Textile 4700 may be any type of textile known in the art that is capable of receiving and supporting an optical structure. As will be recognized by those in the art, textile 4700 may be incorporated into any of the articles discussed above.

Figure 47:
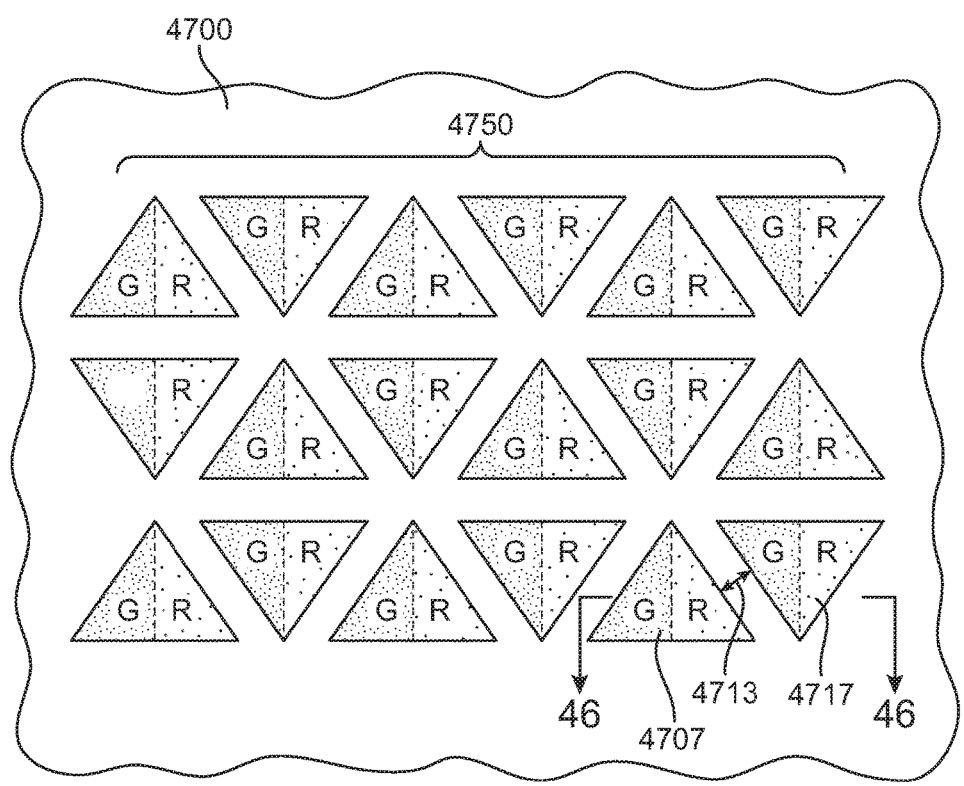
FIG. 47 is a plan view of an embodiment of a textile with a plurality of non-circular optical structures, where each optical structure has a triangular pyramid shape.
Figure 48:
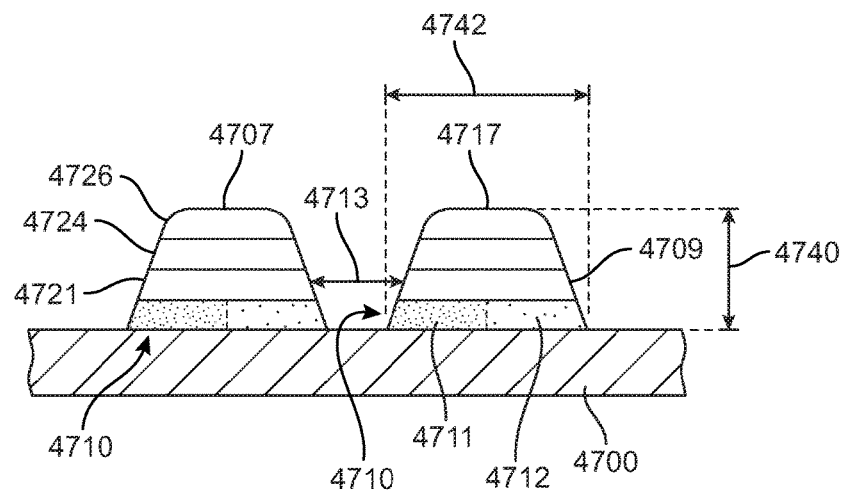
FIG. 48 is a cross-sectional view of a portion of the textile and two optical structures of FIG. 47, taken along line 48-48.

In this embodiment, each optical structure in the plurality of optical structures 4750 such as first triangular prism structure 4707 and second triangular prism structure 4717 is a triangular prism having a triangle planar shape as shown in FIG. 47. Each optical structure also has a frustopyramidal cross-sectional shape as shown in FIG. 48 and defined by perimeter 4709. Plurality of triangular prism structures 4750 are arranged on textile 4700 in a pattern, such as the regular distribution of rows shown in FIG. 47. Neighboring structures within a row are positioned so that the points of the triangular shapes alternate for more uniform coverage of the surface of textile 4700. Neighboring structures are separated by a distance 4713.

In some embodiments, such as the embodiment shown in FIG. 47, plurality of optical structures 4750 may extend entirely across textile 4700. In other embodiments only selected portions of textile 4700 may include plurality of optical structures 4750.

In this embodiment, each optical structure in plurality of optical structures 4750 includes a frustopyramidal prism discrete coloring element 4710 and a multi-layer square pyramid-shaped lens structure 4720. Frustopyramidal prism discrete coloring element 4710 is similar to discrete coloring element 210, discussed above, where a first side of cured ink frustopyramidal prism discrete coloring element 4710 is positioned adjacent to and in contact with textile 4700 while a second side of frustopyramidal prism discrete coloring element 4710 is positioned adjacent to and in contact with lens structure 4720. Frustopyramidal prism discrete coloring element 4710 includes two distinct color regions: a first color region 4711 and a second color region 4712. Each color region has a color that is different from the color of any other color region. In the embodiment shown in FIGS. 47 and 48, for example, first color region 4711 is green and second color region 4712 is red. In other embodiments, the color regions may have other colors. In the embodiment shown in FIGS. 47 and 48, each color region includes only one color. In other embodiments, a color region may include sub-regions of different colors to achieve a wider range of optical and aesthetic effects.

Lens structure 4720 is similar to the lens structures discussed above. Lens structure 4720 may include any number of transparent or translucent cured toner layers having any thickness, where the thickness of the layers may be selected to provide a particular index of refraction. In the embodiment shown in FIG. 48, lens structure 4720 includes three layers: a first or bottom most layer 4721, a second layer 4724, and a third or top most layer 4726. In this embodiment, all of the layers have the same, uniform thickness, though in other embodiments, the thickness of any layer and/or the thickness of adjacent layers may vary. Because the layers may be printed on a pixel basis, any lens layer or each lens layer may be so that any particular pixel or set of pixels in the lens layer may have a different index of refraction. In this embodiment, each lens layer has a slightly different shape from the other layers, as the pyramid tapers from a square to a point.

Similar to the embodiments discussed above, discrete coloring element 4710 is sized and shaped so that a bottom surface of bottom most layer 4721 of lens structure 4720 has the non-circular shape of and is coextensive with a second side of discrete coloring element 4710. Because of the tapering shape of lens structure 4720, each layer has a similarly coordinated size with the adjacent layers. These matching and coextensive surfaces provide a smooth outer surface to lens structure 4720. In other embodiments, these mating surfaces may not be coextensive, which would yield a stepped outer surface for lens structure 4720.

Triangular prism-shaped optical structures may provide unique optical and aesthetic characteristics. The shape may provide an intense lensing effect, particularly at the poles of the shape. These optical structures may be densely packed on a textile as shown in FIG. 47, though each prism is separate and distinct from the other prisms in plurality of optical structures 4750. This may provide structural characteristics such as abrasion resistance and stiffness in selected degrees of motion while allowing freedom of movement and relative movement in other degrees of motion, which may be desirable for uses such as elbow or knee protection. Finally, the flat surfaces with rounded corners of the optical structures may provide a unique topography and texture to the textile. Such a texture may impart aerodynamic and/or abrasion resistance properties to an article of clothing.

In this embodiment, each triangular prism optical structure has a prism width 4742 and a prism height 4740. While prism width 4742 and prism height 4740 may be any length, in some embodiments, the ratio of prism width 4742 to prism height 4740 may be constrained to being selected from the range of 1:2 to 2:1. Such a ratio range of width to height may maximize the optical effects of lens structure 4720 and may minimize delamination of the optical structure or separation of the optical structures from textile 4700. This ratio may be used in any of the embodiments discussed herein for either the width or length of the optical structure to the height of the optical structure.

As noted above, a printed optical structure with bottom color layer and clear lens layers that provides various optical and aesthetic effects such as apparent color changes depending upon the viewing angle may have any type of planar and cross-sectional shape. For example, in the embodiment shown in FIGS. 49-50, a plurality of squircle prism-shaped optical structures 4950 may be attached to a textile 4900, such as by printing in the manner discussed above. Textile 4900 may be any type of textile known in the art that is capable of receiving and supporting an optical structure. As will be recognized by those in the art, textile 4900 may be incorporated into any of the articles discussed above.

Figure 49:
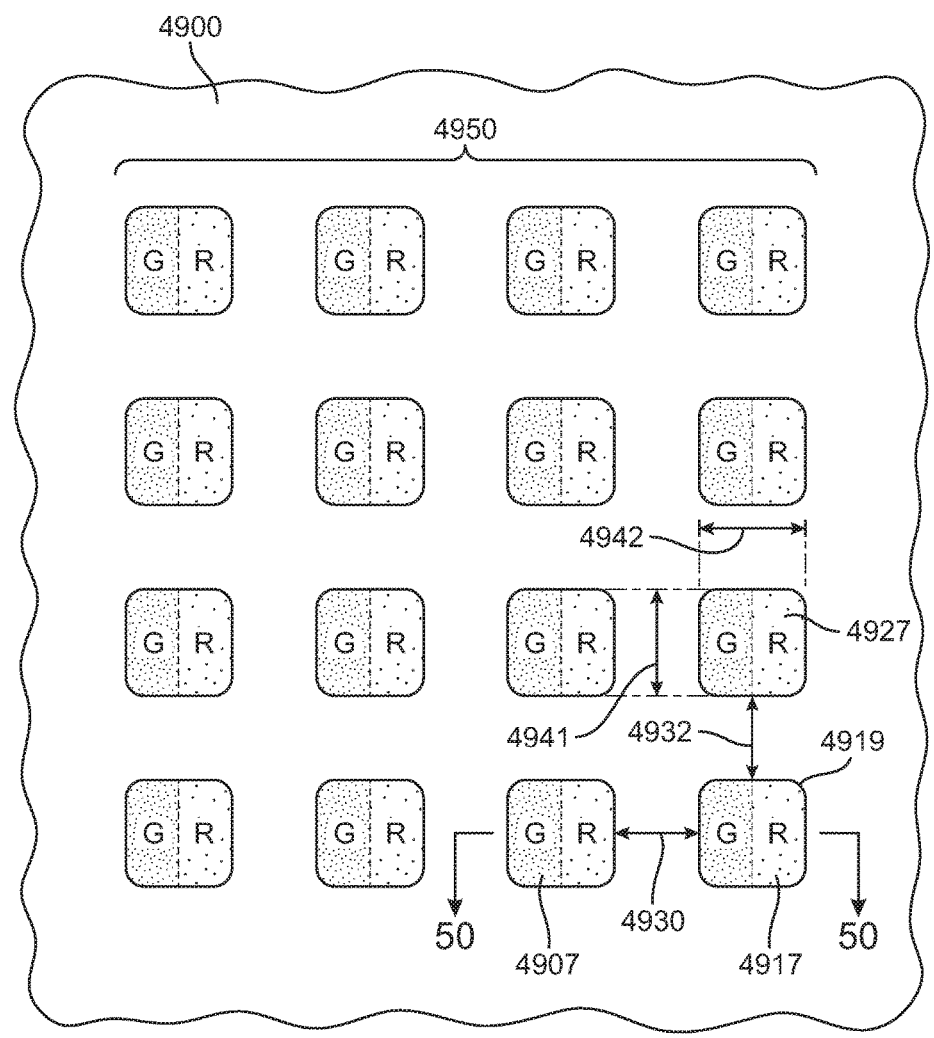
FIG. 49 is a plan view of an embodiment of a textile with a plurality of non-circular optical structures, where each optical structure has a non-circular dome shape.
Figure 50:
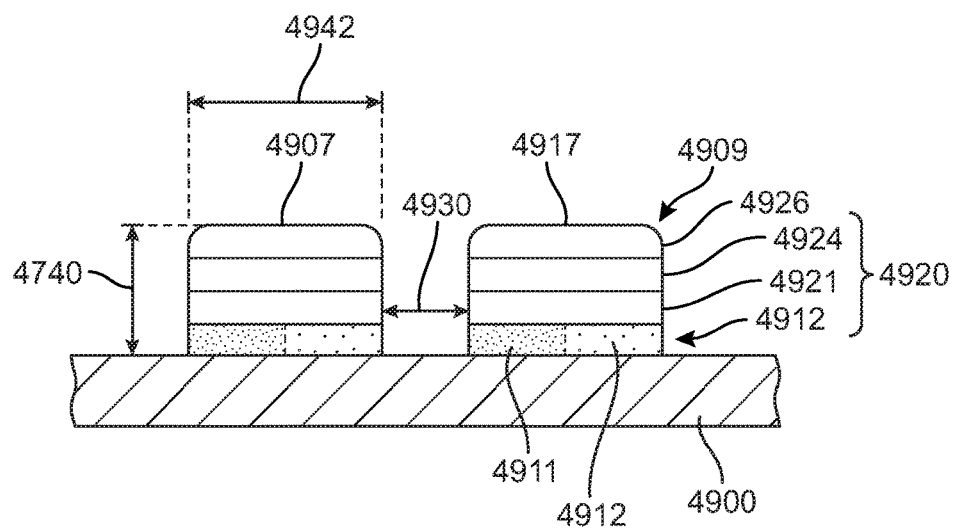
FIG. 50 is a cross-sectional view of a portion of the textile and two optical structures of FIG. 49, taken along line 50-50.

In this embodiment, each optical structure in the plurality of optical structures 4950 such as first squircle prism structure 4907 and second squircle prism structure 4917 is a squircle prism having a planar shape as shown in FIG. 49. Each optical structure also has a rectangular cross-sectional shape with rounded corners like corner 4909 as shown in FIG. 50 and defined by perimeter 4909. Plurality of squircle prism structures 4950 are arranged on textile 4900 in a pattern, such as the regular distribution of rows shown in FIG. 49. Neighboring structures within a row are positioned so that the points of the triangular shapes alternate for more uniform coverage of the surface of textile 4900. Neighboring structures are separated by a distance 4930. Neighboring rows are separated by a second distance 4932.

In some embodiments, such as the embodiment shown in FIG. 49, plurality of optical structures 4950 may extend entirely across textile 4900. In other embodiments only selected portions of textile 4900 may include plurality of optical structures 4950.

In this embodiment, each optical structure in plurality of optical structures 4950 includes a rectangular prism discrete coloring element 4912 and a multi-layer square pyramid-shaped lens structure 4920. Rectangular prism discrete coloring element 4912 is similar to discrete coloring element 210, discussed above, where a first side of cured ink rectangular prism discrete coloring element 4912 is positioned adjacent to and in contact with textile 4900 while a second side of rectangular prism discrete coloring element 4912 is positioned adjacent to and in contact with lens structure 4920. Rectangular prism discrete coloring element 4912 includes two distinct color regions: a first color region 4911 and a second color region 4912. Each color region has a color that is different from the color of any other color region. In the embodiment shown in FIGS. 49 and 50, for example, first color region 4911 is green and second color region 4912 is red. In other embodiments, the color regions may have other colors. In the embodiment shown in FIGS. 49 and 50, each color region includes only one color. In other embodiments, a color region may include sub-regions of different colors to achieve a wider range of optical and aesthetic effects.

Lens structure 4920 is similar to the lens structures discussed above. Lens structure 4920 may include any number of transparent or translucent layers having any thickness, where the thickness of the layers may be selected to provide a particular index of refraction. In the embodiment shown in FIG. 50, lens structure 4920 includes three layers: a first or bottom most layer 4921, a second layer 4924, and a third or top most layer 4926. In this embodiment, all of the layers have the same, uniform thickness, though in other embodiments, the thickness of any layer and/or the thickness of adjacent layers may vary. Because the layers may be printed on a pixel basis, any lens layer or each lens layer may be so that any particular pixel or set of pixels in the lens layer may have a different index of refraction. In this embodiment, each lens layer has a slightly different shape from the other layers, as the pyramid tapers from a square to a point.

Similar to the embodiments discussed above, discrete coloring element 4912 is sized and shaped so that a bottom surface of bottom most layer 4921 of lens structure 4920 has the non-circular shape of and is coextensive with a second side of discrete coloring element 4912. Because of the tapering shape of lens structure 4920, each layer has a similarly coordinated size with the adjacent layers. These matching and coextensive surfaces provide a smooth outer surface to lens structure 4920. In other embodiments, these mating surfaces may not be coextensive, which would yield a stepped outer surface for lens structure 4920.

Squircle prism-shaped optical structures may provide unique optical and aesthetic characteristics. These optical structures may be densely packed on a textile as shown in FIG. 49, though each prism is separate and distinct from the other prisms in plurality of optical structures 4950. This may provide structural characteristics such as abrasion resistance and stiffness in selected degrees of motion while allowing freedom of movement and relative movement in other degrees of motion, which may be desirable for uses such as elbow or knee protection. Finally, the flat surfaces with rounded corners of the optical structures may provide a unique topography and texture to the textile. Such a texture may impart aerodynamic and/or abrasion resistance properties to an article of clothing.

In this embodiment, each squircle prism optical structure has a prism width 4942 and a prism height 4940. While prism width 4942 and prism height 4940 may be any length, in some embodiments, the ratio of prism width 4942 to prism height 4940 may be constrained to being selected from the range of 1:2 to 2:1. Such a ratio range of width to height may maximize the optical effects of lens structure 4920 and may minimize delamination of the optical structure or separation of the optical structures from textile 4900. This ratio may be used in any of the embodiments discussed herein for either the width or length of the optical structure to the height of the optical structure.

Figure 51:
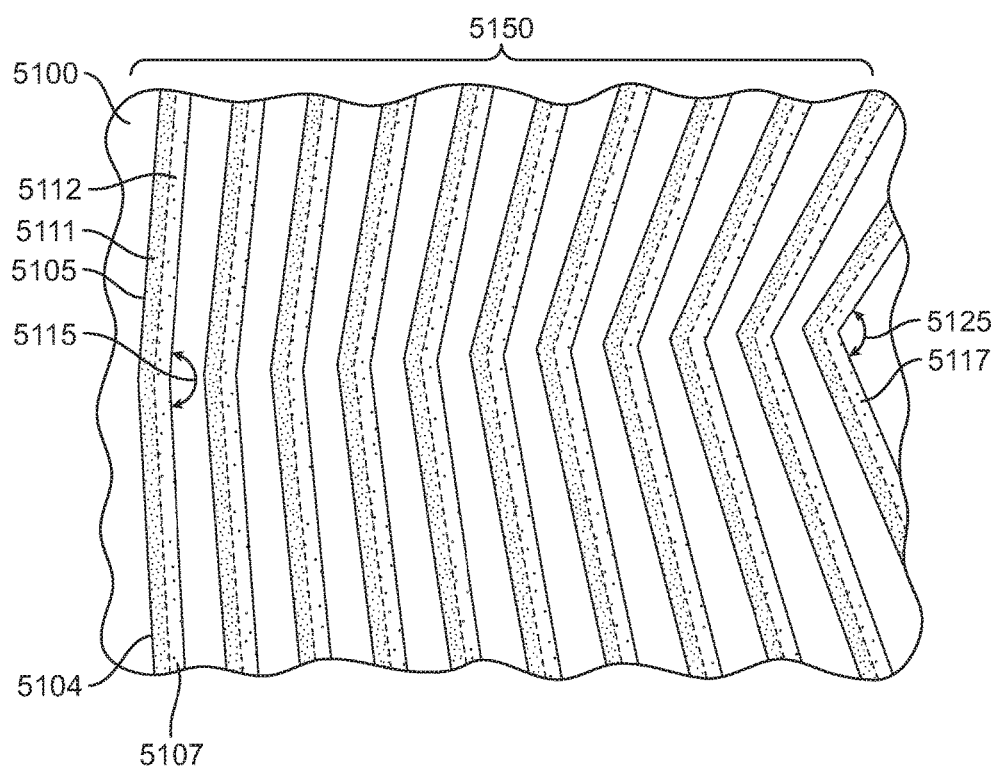
FIG. 51 is a plan view of an embodiment of a textile with a plurality of linear optical structures, where each optical structure includes a bend.

FIG. 51 shows another linear prism embodiment. Similar in most respects to the embodiment shown above with respect to FIGS. 40-42, second plurality of linear optical structures 5150 contain only straight portions. Second plurality of linear optical structures 5150 may be printed onto a textile 5100 that is similar to any textile described herein. Each optical structure may include two or more color regions such as first region 5111 and second region 5112. The cross-section of any linear structure may be the same as or similar to the triangular cross-section shown in FIG. 33 or the semi-ellipsoid cross-section shown in FIG. 41.

In this embodiment, each linear optical structure in the plurality of linear optical structures 5150 includes a bend. For example, a first angled linear structure 5107 may include a first portion 5104, a second portion 5105, and a bend at a first angle 5115 between first portion 5104 and second portion 5105. While in some embodiments the bend in the linear optical structures may be the same along textile 5100, in the embodiment shown in FIG. 51, the angle of the bend may vary along textile 5100. For example, a second angled linear structure 5117 bends at a second angle 5125. While first angle 5115 may be any angle capable of being printed, in some embodiments, first angle 5115 may be a relatively low angle, such as an angle less than 10 degrees. While second angle 5125 may be any angle capable of being printed, in some embodiments, second angle 5125 may be a high angle, such as an angle greater than 45 degrees. All of the linear optical structures between first angled linear structure 5107 and second angled linear structure 5117 may have an angle between first angle 5115 and second angle 5125. The angles of the linear structures gradually change from first angle 5115 to second angle 5125.

This type of linear optical structure may produce optical and color changing effects that may be different from the effects achieved by the other linear embodiments discussed above due to the straight linear portions and the varying angles of the bends.

Figure 52:
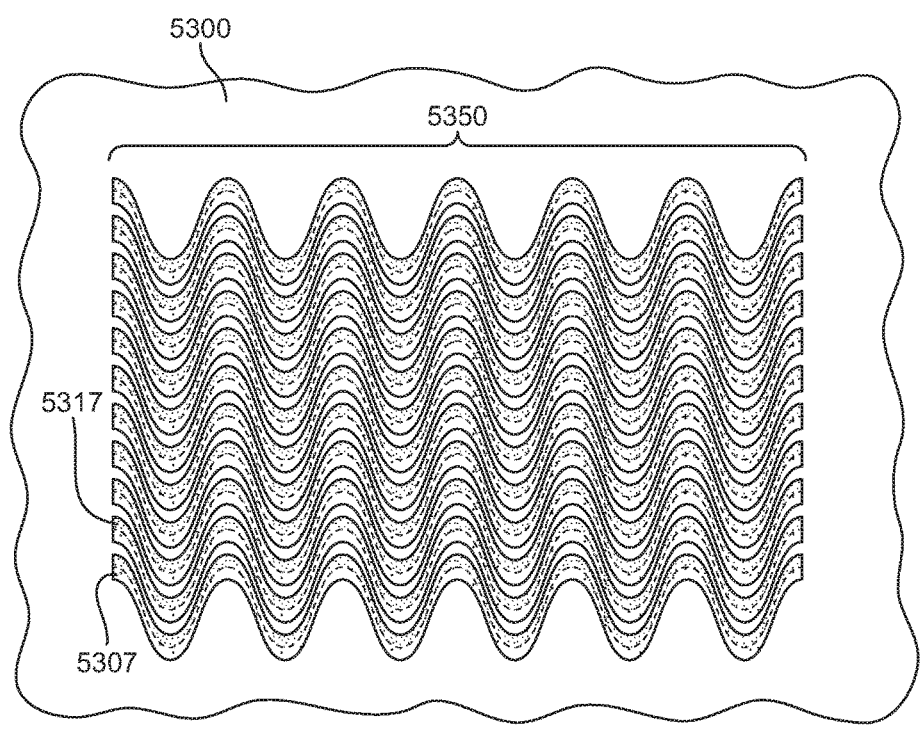
FIG. 52 is a plan view of an embodiment of a textile with a plurality of optical structures, where each optical structure is a wavy line.

FIG. 52 shows another type of linear optical structure with a plurality of wavy or sinusoidal optical structures 5350 printed onto a textile 5300. This embodiment is similar to the wavy portions of the embodiment shown in FIGS. 40-42 and discussed above. Each optical structure may include two or more color regions. The cross-section of any linear structure may be the same as or similar to the triangular cross-section shown in FIG. 33 or the semi-ellipsoid cross-section shown in FIG. 41.

In this embodiment, the optical effect of the sinusoidal waves are increased as the number of peaks and troughs are greater and are closer together than in the embodiment shown above. In this embodiment, each structure is parallel to an adjacent structure. For example, first sinusoidal optical structure 5307 is parallel to second sinusoidal optical structure 5317, so the peaks and troughs align and no lines cross.

Figure 53:
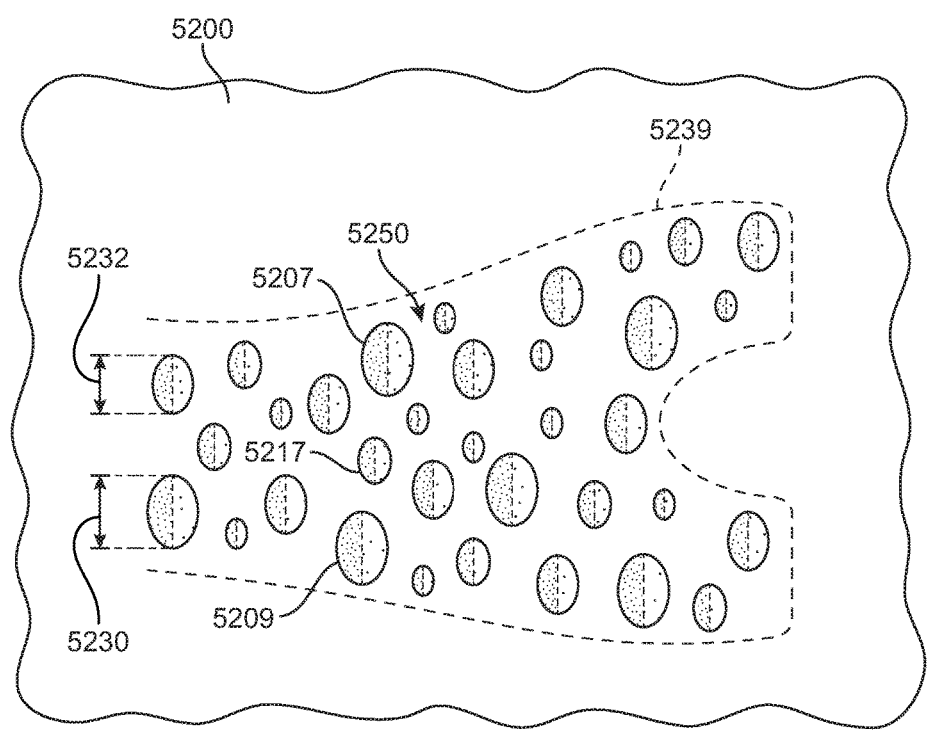
FIG. 53 is a plan view of an embodiment of a textile with a plurality of semi-ellipsoid optical structures of different sizes, where the plurality of optical structures are positioned on the textile in a pattern.

FIG. 53 shows another ovoid prism embodiment. Similar in most respects to the embodiment shown above with respect to FIGS. 45-46, the optical structures in second plurality of ovoid optical structures 5250 have varying sizes. Second plurality of ovoid optical structures 5250 may be printed onto a textile 5100 that is similar to any textile described herein. Each optical structure may include two or more color regions. The cross-section of any ovoid structure may be the same as or similar to the cross-section shown in FIG. 46.

Second plurality of ovoid optical structures 5250 are printed onto textile 5200 in a pattern. In this embodiment, the pattern may be a random distribution of different sizes that form an overall shape 5239. Shape 5239 may be irregular or amorphous such as shown in FIG. 53. In other embodiments, shape 5239 may be in the shape of one or more alphanumeric characters, logos, polygons, circles or other round shapes, or any other type of shape.

As noted above, the optical structures in second plurality of ovoid optical structures 5250 have varying sizes. For example, a first structure 5207 may have a different size from a second structure 5217 but the same size as a third structure 5209. The sizes may be a relatively large long axis 5230 or a relatively small long axis 5232. The actual sizes may be any known in the art, and the sizes may be selected depending upon the intended use of the textile. For example, the sizes may be smaller for use in footwear than for apparel like a shirt or pants. The different sizes may be selected to increase the density of packing of second plurality of ovoid optical structures 5250, as smaller structures may be used to fill in the gaps between larger structures. This type of arrangement may allow a designer to more finely control the stiffness and permeability of the resultant textile.

The description provided above is intended to illustrate some possible combinations of various features associated with an article of footwear and other apparel. Those skilled in the art will understand, however, that within each embodiment, some features may be optional. Moreover, different features discussed in different embodiments could be combined in still other embodiments and would still fall within the scope of the attached claims. Some features could be used independently in some embodiments, while still other features could be combined in various different ways in still other embodiments.

While various embodiments have been described, the description is intended to be exemplary, rather than limiting and it will be apparent to those of ordinary skill in the art that many more embodiments and implementations are possible that are within the scope of the embodiments. Accordingly, the embodiments are not to be restricted except in light of the attached claims and their equivalents. Also, various modifications and changes may be made within the scope of the attached claims.

The invention claimed is:

1. A wearable article comprising:
   a base material; and
   an optical feature coupled to the base material, wherein the optical feature comprises:
   a discrete coloring element, wherein the discrete coloring element has a first side disposed against the base material and a second side disposed opposite of the first side, and wherein the second side of the discrete coloring element includes at least two regions having different coloring relative to each other; and
   a lenticular lens structure, wherein a bottom surface of the lenticular lens structure is disposed against the second side of the discrete coloring element and the discrete coloring element is partially or fully covered by the bottom surface of the lens structure;
   wherein an upper surface of the lenticular lens structure is one or both of convex and multi-faceted, such that a first appearance of the optical feature when the wearable article is viewed from a first viewing angle is different from a second appearance of the optical feature when the wearable article is viewed from a second viewing angle; and
   wherein the bottom surface of the lenticular lens structure has a perimeter that is surrounded by one or both of an exposed surface of the base material and an exposed surface of the discrete coloring element.

2. The wearable article of claim 1, wherein the wearable article comprises an article of footwear.

3. The wearable article of claim 1, wherein the wearable article comprises an article of apparel.

4. The wearable article of claim 1, wherein the lenticular lens structure comprises a plurality of lens layers.

5. The wearable article of claim 1, wherein the lenticular lens structure comprises only one lens layer.

6. The wearable article of claim 1, wherein the bottom surface of the lenticular lens structure is coextensive with the second side of the discrete coloring element.

7. The wearable article of claim 1, wherein the upper surface of the lenticular lens structure comprises an apex point that is a greater distance from the discrete coloring element than any other point on the lenticular lens structure.

8. The wearable article of claim 1, further comprising one or more additional lenticular lens structures adjacent to the lenticular lens structure.

9. The wearable article of claim 1, wherein the second side of the discrete coloring element is non-circular.

10. The wearable article of claim 1, wherein the second side of the discrete coloring element includes three or more colors.

11. The wearable article of claim 1, wherein the at least two regions having different coloring relative to each other comprise three regions having different coloring relative to each other.

12. The wearable article of claim 1, wherein the discrete coloring element comprises a three-dimensional image.

13. A textile comprising:
    a base material; and
    an optical feature coupled to the base material, wherein the optical feature comprises:
    a discrete coloring element, wherein the discrete coloring element has a first side disposed against the base material and a second side disposed opposite of the first side, and wherein the second side of the discrete coloring element includes at least two regions having different coloring relative to each other; and
    a lenticular lens structure, wherein a bottom surface of the lenticular lens structure is disposed against the second side of the discrete coloring element and the discrete coloring element is partially or fully covered by the bottom surface of the lenticular lens structure;
    wherein an upper surface of the lenticular lens structure is one or both of convex and multi-faceted, such that a first appearance of the optical feature when the textile is viewed from a first viewing angle is different from a second appearance of the optical feature when the textile is viewed from a second viewing angle; and
    wherein the bottom surface of the lenticular lens structure has a perimeter that is surrounded by one or both of an exposed surface of the base material and an exposed surface of the discrete coloring element.

14. The textile of claim 13, wherein the base material comprises a fabric.

15. The textile of claim 13, wherein the base material comprises a material other than fabric.

16. The textile of claim 13, wherein the lenticular lens structure comprises a only one lens layer.

17. The textile of claim 13, wherein the second side of discrete coloring element is non-circular.

18. The textile of claim 13, wherein a third appearance of the optical feature when the textile is viewed from a third viewing angle is different from the first appearance and the second appearance.

19. The textile of claim 13, wherein the bottom surface of the lenticular lens structure is spaced apart from other lenticular lens structures.

20. The textile of claim 13, wherein the discrete coloring element comprises a three-dimensional image.

* * * * *

UNITED STATES PATENT AND TRADEMARK OFFICE
CERTIFICATE OF CORRECTION

PATENT NO. : 9,971,070 B2  
APPLICATION NO. : 15/798101  
DATED : May 15, 2018  
INVENTOR(S) : Liles et al.

Page 1 of 1

It is certified that error appears in the above-identified patent and that said Letters Patent is hereby corrected as shown below:

In the Claims

Column 36, Line 41, "comprises a only one" should read --comprises only one--

Column 36, Lines 42-43, "of discrete" should read --of the discrete--

Signed and Sealed this
Sixth Day of November, 2018

Andrei Iancu
*Director of the United States Patent and Trademark Office*